US012657448B2

(12) United States Patent
Khosravani

(10) Patent No.: US 12,657,448 B2
(45) Date of Patent: Jun. 16, 2026

(54) NEUROMORPHIC ARCHITECTURES, ACTUATORS, AND RELATED METHODS

(71) Applicant: The Boeing Company, Chicago, IL (US)

(72) Inventor: Shahriar Khosravani, Everett, WA (US)

(73) Assignee: The Boeing Company, Arlington, VA (US)

( * ) Notice: Subject to any disclaimer, the term of this patent is extended or adjusted under 35 U.S.C. 154(b) by 1230 days.

(21) Appl. No.: 17/542,159

(22) Filed: Dec. 3, 2021

(65) Prior Publication Data

US 2022/0215240 A1     Jul. 7, 2022

Related U.S. Application Data

(60) Provisional application No. 63/133,675, filed on Jan. 4, 2021.

(51) Int. Cl.
*G06N 3/065*         (2023.01)
*G06N 3/04*          (2023.01)

(52) U.S. Cl.
CPC .............. *G06N 3/065* (2023.01); *G06N 3/04* (2013.01)

(58) Field of Classification Search
CPC ...................................................... G06N 3/065
See application file for complete search history.

(56) References Cited

U.S. PATENT DOCUMENTS

| | | | | |
|---|---|---|---|---|
| 5,084,006 A * | 1/1992 | Lew | ..................... | A61N 1/0448 |
| | | | | 604/20 |
| 10,686,214 B2 * | 6/2020 | Liu | ......................... | H01M 4/134 |
| 2003/0116678 A1 * | 6/2003 | Gardner | ................... | B64C 1/40 |
| | | | | 244/117 A |
| 2004/0048022 A1 * | 3/2004 | Pratt | ...................... | A63C 5/126 |
| | | | | 473/319 |
| 2010/0043954 A1 * | 2/2010 | Shimoda | ............. | H01M 4/8605 |
| | | | | 156/182 |
| 2011/0250511 A1 * | 10/2011 | Samukawa | ....... | H01M 8/04186 |
| | | | | 429/401 |
| 2012/0129047 A1 * | 5/2012 | Matsuyama | .......... | H01M 4/668 |
| | | | | 427/78 |

(Continued)

*Primary Examiner* — Douglas King
(74) *Attorney, Agent, or Firm* — Kolitch Romano Dascenzo Gates LLP

(57) ABSTRACT

A neuromorphic architecture is formed from a laminate of non-woven carbon fiber reinforced polymer layers arranged in a plurality of different directions. A plurality of distributed nodes are formed through the laminate via transverse voids, and an encapsulant encapsulates an electrochemical fluid or gel such that the electrochemical fluid or gel may flow within the nodes and around the laminate. Electrical current flowing through the architecture creates reversible metal deposits at various nodes, depending on the path developed through the architecture, with a complexity sufficient for neuromorphic processing, and providing a writable and erasable memory. A neuromorphic actuator may be formed by combining shape memory materials with such a neuromorphic architecture, which may provide desired surface contours and/or actuations based on current in the neuromorphic architecture. Such neuromorphic architectures and actuators may be trained according to various methods, using feed-forward and/or feedback techniques.

16 Claims, 29 Drawing Sheets

(56) References Cited

U.S. PATENT DOCUMENTS

| | | | |
|---|---|---|---|
| 2012/0168632 A1* | 7/2012 | Yagi | G01T 1/20 |
| | | | 250/366 |
| 2015/0118550 A1* | 4/2015 | Shon | H01M 4/8875 |
| | | | 264/29.1 |
| 2017/0200570 A1* | 7/2017 | Ciocanel | H01G 11/40 |
| 2018/0124518 A1* | 5/2018 | Di | B32B 37/10 |
| 2018/0311891 A1* | 11/2018 | Duty | B29C 64/106 |
| 2019/0181452 A1* | 6/2019 | Linde | H01M 4/523 |
| 2020/0317341 A1* | 10/2020 | Blanco Varela | H01M 10/48 |
| 2021/0249595 A1* | 8/2021 | Itoh | H10N 70/061 |

* cited by examiner $$W = (M+1) \cdot D \ \& \ W = (M+1) \cdot D$$

NEUROMORPHIC ARCHITECTURES, ACTUATORS, AND RELATED METHODS

RELATED APPLICATION

The present application is a non-provisional of and claims priority to U.S. Provisional Patent Application No. 63/133,675, filed on Jan. 4, 2021, entitled "NEUROMORPHIC ARCHITECTURES, ACTUATORS, AND RELATED METHODS," the complete disclosure of which is incorporated by reference.

FIELD

The present disclosure relates generally to neuromorphic technology, and more particularly to neuromorphic architectures, neuromorphic actuators, and related methods.

BACKGROUND

Artificial intelligence and central processing systems are utilized in a wide variety of applications. However, centralized processing units may require dedicated input/output lines and data buses. Bus bandwidth limits may limit the extent to which such systems may be implemented. Furthermore, such systems are vulnerable to circuit interruption. For example, artificial intelligence systems utilized in remote vehicle operations (e.g., drones, etc.) operate via processing over connections to the cloud because such conventional processing units are too large and/or too heavy for such applications. However, if the signal or connection to the cloud is lost, then the ability for processing also is lost, thereby rendering such remote automated vehicles unable to function.

SUMMARY

Presently disclosed neuromorphic architectures may be formed utilizing existing materials in a given structure, such as a carbon fiber reinforced polymer (CFRP) materials, to decentralize processing unit to multiple nodes within the CFRP materials. Such neuromorphic architectures may be configured to provide local processing, and may increase robustness and/or functionality as compared to prior art cloud-based processing technologies. Some examples may combine such a neuromorphic architecture with shape memory alloys to create neuromorphic actuators. A set of distributed nodes, each based on a pair of vertical fiber connectivity layers within an encapsulated reversible electrochemical solution/gel, provides connectivity and complexity for neuromorphic processing. In some examples, systems may be configured to evaluate the local deflection around the nodes in order to change its weight with its neural network pathways. This in turn, may change the current distribution at end terminals which consequently may change the circuit current feed to change the shape memory alloy network's overall shape. Accumulated memory may be known as fiber interfaces because deposited metal is proportional to the local time integral of electrical current passing through that node. This process may be reversible such that the memory may be modifiable and/or erasable. A surface with embedded neuromorphic intelligence thus may be trained and dynamically respond to environmental changes without the need for an external central processing unit.

In a particular example, a neuromorphic architecture according to the present disclosure may include a laminate formed of a plurality of layers of non-woven CFRP material, a plurality of distributed nodes formed through the laminate, an electrochemical fluid comprising a plurality of metal ions, and an encapsulant configured to encapsulate at least a portion of the laminate, the plurality of distributed nodes, and the electrochemical fluid such that the electrochemical fluid is free to flow within the encapsulant and into the plurality of distributed nodes. Each layer of the plurality of layers may be formed of substantially unidirectional fibers, and a respective orientation of the unidirectional fibers of each respective layer of the plurality of layers may be different from each other respective orientation of the unidirectional fibers of adjacent respective layers of the plurality of layers. Among the plurality of layers of CFRP material may be an uppermost layer of CFRP material forming an upper surface of the laminate, a lowermost layer of CFRP material forming a lower surface of the laminate, and one or more intermediary layers of CFRP material sandwiched between the uppermost layer of CFRP material and the lowermost layer of CFRP material. Each distributed node may be, or include, a void that extends transversely from the upper surface to the lower surface of the laminate. Such a neuromorphic architecture may be configured to perform neuromorphic processing, distributed amongst the nodes, rather than centrally located.

An example of a neuromorphic actuator according to the present disclosure may include a first neuromorphic architecture, a second neuromorphic architecture, a dielectric insulation layer positioned between the first neuromorphic architecture and the second neuromorphic architecture, a first shape memory alloy (SMA) layer coupled to a first upper surface of the first neuromorphic architecture, and a second SMA layer coupled to a second lower surface of the second neuromorphic architecture. The first neuromorphic architecture may include a first laminate formed of a first plurality of layers of non-woven CFRP material, the first laminate having the first upper surface and a first lower surface, and a first plurality of distributed nodes formed through the first laminate. Each node of the first plurality of distributed nodes may be, or include, a void that extends transversely from the first upper surface to the first lower surface. The second neuromorphic architecture may include a second laminate formed of a second plurality of layers of non-woven CFRP material, the second laminate having a second upper surface and the second lower surface, and a second plurality of distributed nodes formed through the second laminate. Each node of the second plurality of distributed nodes may be, or include, a void that extends transversely from the second upper surface to the second lower surface. An electrochemical fluid having a plurality of metal ions may be free to flow into the voids of the first plurality of distributed nodes and into the voids of the second plurality of distributed nodes. The dielectric insulation layer may separate the first lower surface of the first laminate from the second upper surface of the second laminate, and may be configured to electrically insulate the first neuromorphic architecture from the second neuromorphic architecture.

Presently disclosed methods of performing local, hardware-based processing via a neuromorphic architecture may include creating intersections of fibers modulated by residual memory created by electroplating at the intersections, wherein the intersections have a complexity sufficient to perform as a neural network, and recycling signals among a plurality of layers of a laminate of the neuromorphic architecture such that each intersection is configured to serve as a plurality of different connection points within the neuromorphic architecture. In some methods, recycling signals may involve recycling signals along at least four different signal paths through the neuromorphic architecture and/or feeding an output signal from a first layer of the laminate into a second layer of the laminate.

Presently disclosed methods of training a neuromorphic architecture may include providing the neuromorphic architecture, flowing a computer-controlled input current through the electrochemical fluid in a predetermined pattern relative to the laminate, and controlling an output of the neuromorphic architecture, thereby creating corresponding connections within some of the plurality of distributed nodes such that the neuromorphic architecture is trained via a feed-forward scheme. The neuromorphic architecture may be configured to encapsulate an electrochemical fluid within a plurality of nodes distributed across a laminate, and the laminate may include a plurality of layers of non-woven CFRP material, with each layer of the plurality of layers being formed of substantially unidirectional fibers. A respective orientation of the unidirectional fibers of each respective layer of the plurality of layers may be different from each other respective orientation of the unidirectional fibers of adjacent respective layers of the plurality of layers.

Other presently disclosed methods may include actuating and/or shaping a surface by applying an electrical current to a neuromorphic actuator, varying the electrical current to obtain a desired contour and/or a desired movement in the surface, and evaluating local deflection around one or more nodes of the plurality of distributed nodes. The local deflection around a respective node of the plurality of distributed nodes may change its respective weight with respect to neural network pathways and/or may change a current distribution at fibers ends within the respective node.

DESCRIPTION

Figure 1:
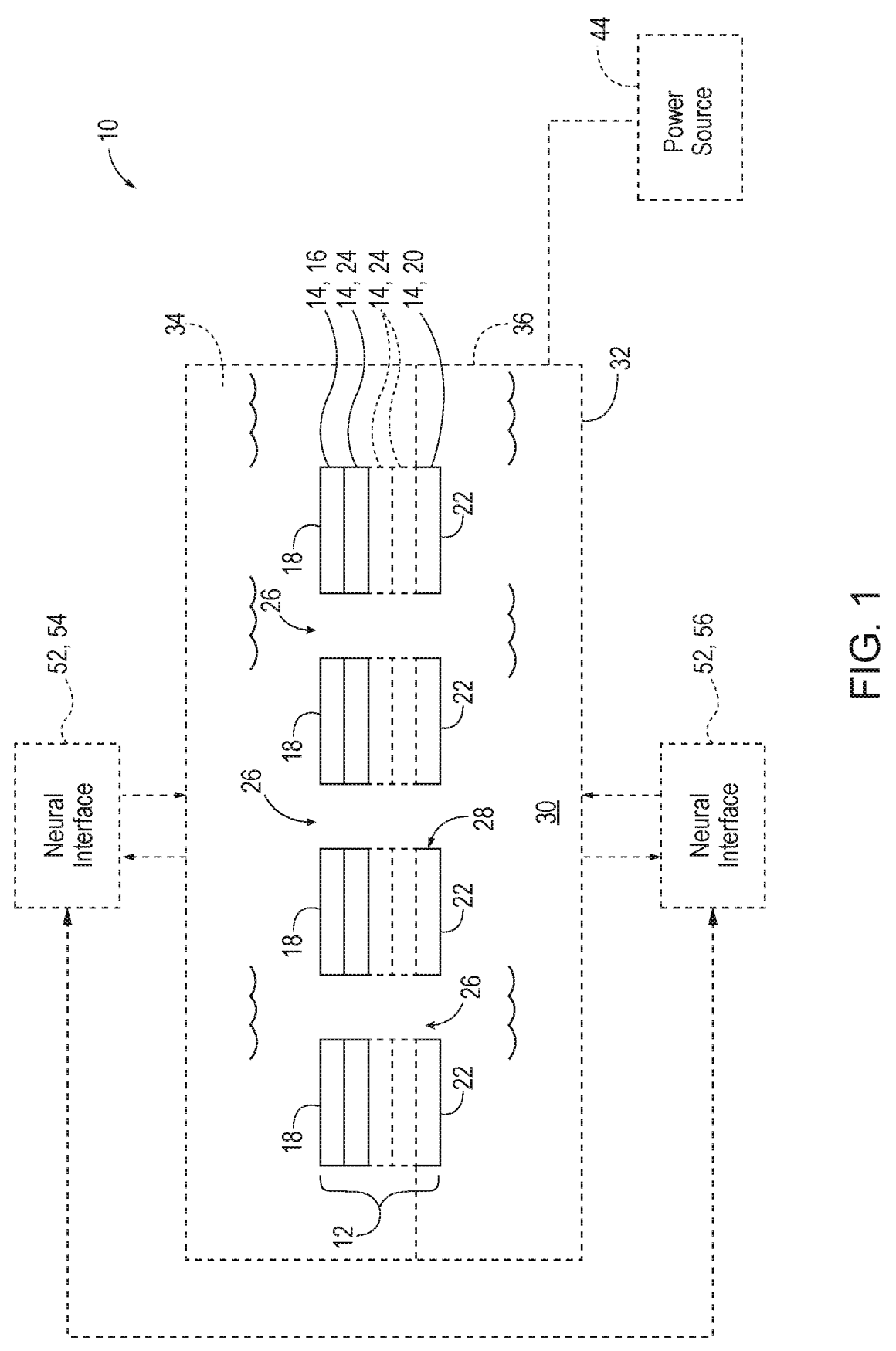
FIG. 1 is a schematic, cross-sectional representation of non-exclusive examples of neuromorphic architectures according to the present disclosure.

FIGS. 1-18, 20-21, 23-24, and 26-30 provide illustrative, non-exclusive examples of neuromorphic architectures 10, neuromorphic actuators 70, and/or components thereof according to the present disclosure. Elements that serve a similar, or at least substantially similar, purpose are labeled with like numbers in each of FIGS. 1-18, 20-21, 23-24, and 26-30 and these elements may not be discussed in detail herein with reference to each of FIGS. 1-18, 20-21, 23-24, and 26-30. Similarly, all elements may not be labeled in each of FIGS. 1-18, 20-21, 23-24, and 26-30, but reference numerals associated therewith may be utilized herein for consistency. Elements, components, and/or features that are discussed herein with reference to one or more of FIGS. 1-18 may be included in and/or utilized with any of FIGS. 1-18, 20-21, 23-24, and 26-30 without departing from the scope of the present disclosure. In general, elements that are likely to be included in a given (i.e., a particular) example are illustrated in solid lines, while elements that are optional to a given example are illustrated in dashed lines. However, elements that are shown in solid lines are not essential to all examples, and an element shown in solid lines may be omitted from a particular example without departing from the scope of the present disclosure.

Figure 2:
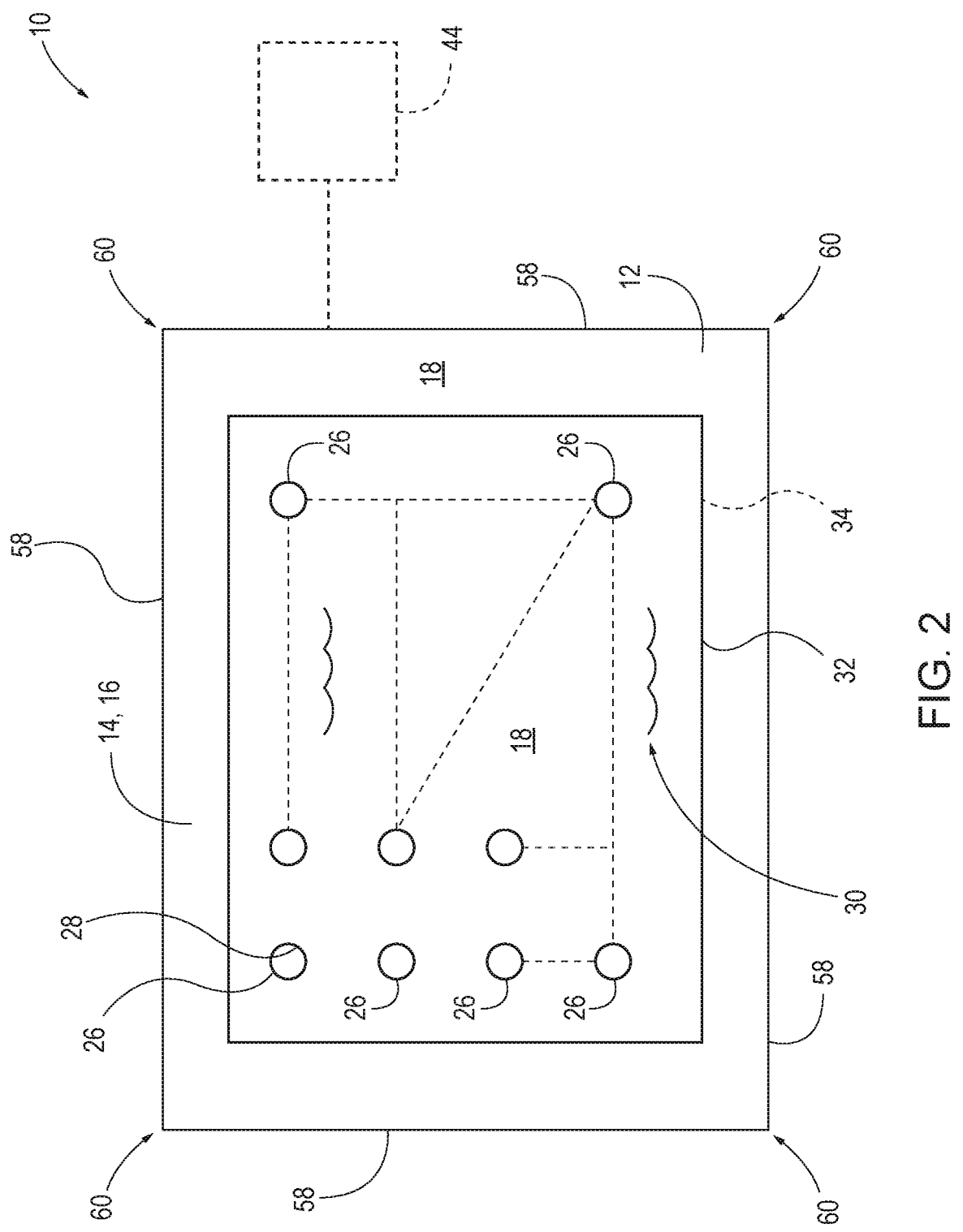
FIG. 2 is a schematic, plan view representation of non-exclusive examples of neuromorphic architectures according to the present disclosure.

FIGS. 1-2 schematically illustrate non-exclusive examples of a neuromorphic architecture 10 that includes a laminate 12 formed of a plurality of layers 14 of conductive fiber material, shown from a side cross-sectional view in FIG. 1, and from a top plan view in FIG. 2. An uppermost layer 16 of plurality of layers 14 forms an upper surface 18 of laminate 12, and a lowermost layer 20 of plurality of layers 14 forms a lower surface 22 of laminate 12. One or more intermediary layers 24 of plurality of layers 14 are sandwiched between uppermost layer 16 and lowermost layer 20. FIG. 1 illustrates three intermediary layers 24 sandwiched between uppermost layer 16 and lowermost layer 20, though other examples of neuromorphic architecture 10 may include more or fewer intermediary layers 24. For example, examples of neuromorphic architecture 10 may include one intermediary layer 24, two intermediary layers 24, three intermediary layers 24, four intermediary layers 24, at least five intermediary layers 24, at least 10 intermediary layers 24, at least 20 intermediary layers 24, and/or any desired number of intermediary layers 24. In some examples, laminate 12 includes at least five layers 14 of conductive fiber material (e.g., at least five layers of non-woven carbon fiber reinforced polymer material). As will be described in detail herein, neuromorphic architecture 10 is configured to perform neuromorphic processing and/or is configured to serve as hardware for embedded artificial intelligence-enabled applications. The conductive fiber material is a carbon fiber composite material in some examples of neuromorphic architecture 10, though other materials also may be suitable for other examples. Carbon fiber composites generally have an anisotropic conductivity, such that the fibers are electrically conductive along substantially one axis, or orientation. For example, carbon fiber composites generally are conductive in either direction along the length of the fibers. Furthermore, carbon fiber composite materials may be sensitive to fiber contacts at interfaces.

A plurality of distributed nodes 26 are formed through laminate 12. Each distributed node 26 comprises a void 28 that extends transversely from upper surface 18 of laminate 12 to lower surface 22 of laminate 12. Neuromorphic architecture 10 also includes an electrochemical fluid 30, which may be an electrochemical liquid, an electrochemical gel, and/or an electrochemical solution. Electrochemical fluid 30 includes a plurality of metal ions dissolved within electrochemical fluid 30. An encapsulant 32 encapsulates at least a portion of laminate 12, distributed nodes 26, and electrochemical fluid 30 such that electrochemical fluid 30 is free to flow within encapsulant 32 and into the plurality of distributed nodes 26. As shown in FIG. 1, encapsulant 32 may encapsulate the entire laminate 12 in some examples. In other examples, encapsulant 32 encapsulates only a portion of laminate 12. Encapsulant 32 may embody a singular body (e.g., an integral, monolithic reservoir or container) that encapsulates at least a portion of laminate 12. In other examples, encapsulant 32 may embody two or more independent bodies positioned with respect to laminate 12 to encapsulate electrochemical fluid 30. For example, a first portion 34 (FIG. 1) of encapsulant 32 may be positioned on upper surface 18 of laminate 12, while a separate, second portion 36 (FIG. 1) of encapsulant 32 may be positioned on lower surface 22 of laminate 12. In examples of neuromorphic architecture 10 that include such first portion 34 and second portion 36 of encapsulant 32, the two portions 34, 36 may be in contact with one another, or may be separated from each other so that they are not in contact. Encapsulant 32 is at least substantially impermeable to electrochemical fluid 30 such that electrochemical fluid 30 is contained within and may flow within encapsulant 32, and encapsulant 32 generally is hermetically sealed from the ambient environment. For example, encapsulant 32 may be a glass or polycarbonate seal or container, though many suitable examples of encapsulant 32 are within the scope of the present disclosure. Encapsulant 32 may be a three-sided structure with side walls in some examples. In some examples, encapsulant 32 may be formed by coating and/or chemically treating layers 14 near nodes 26 to form a hydrophobic barrier, while the fiber ends of fibers 38 may be free of said barrier, to preserve electrical connectivity. In some examples, encapsulant 32 may be formed of respective local end caps closing off each respective node 26.

Figure 3:
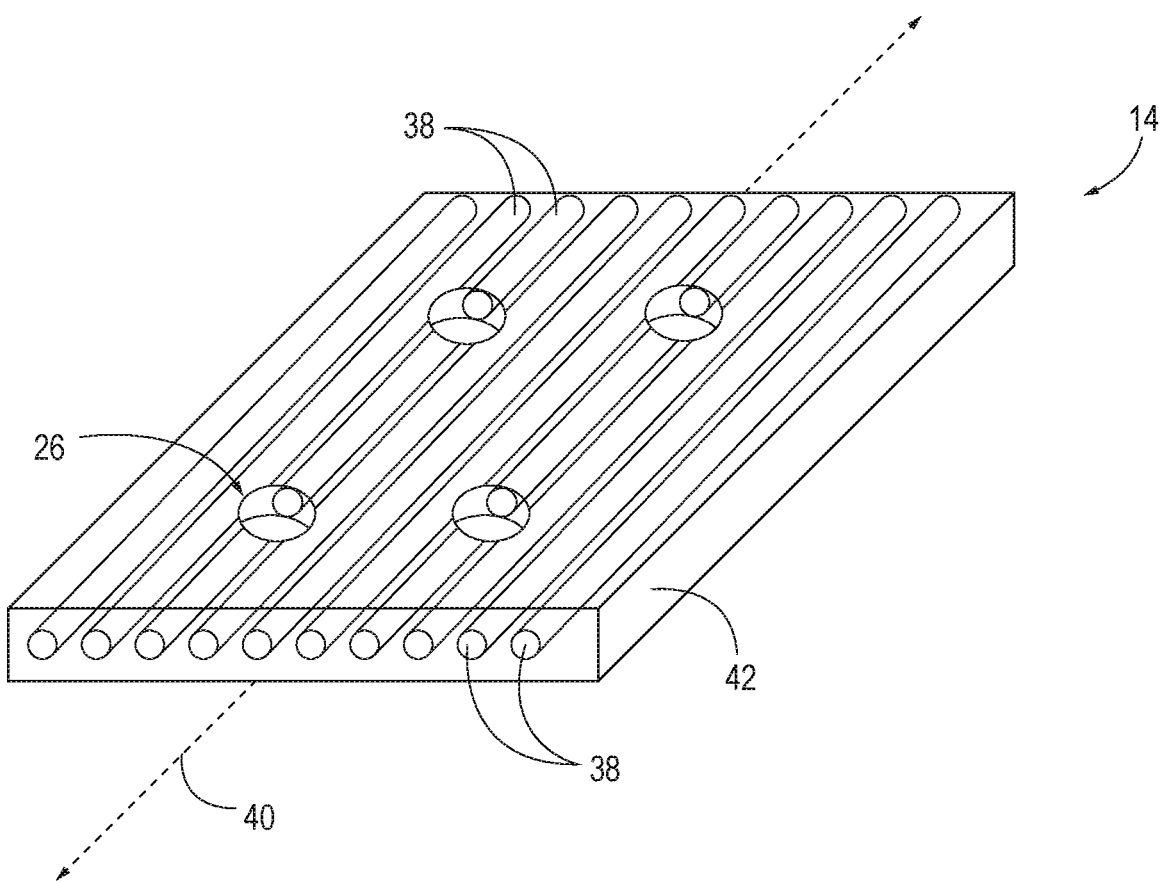
FIG. 3 is a schematic, perspective view of an example of a layer of material having fibers substantially aligned unidirectionally.

Each layer 14 of laminate 12 is generally formed of conductive fibers that are at least substantially unidirectional. For example, FIG. 3 schematically illustrates an example of layer 14, with fibers 38 arranged unidirectionally along a longitudinal axis 40. Conductive fibers 38 may be encased in, surrounded by, impregnated with, and/or coated with a polymer 42, such as a resin matrix, as shown in FIG. 3. Polymer 42 is generally a nonconductive and/or dielectric resin matrix. Each layer 14 may be electrically insulated, or isolated, from the other layers 14 of laminate 12, due to the presence of polymer 42 and/or due to insulating layers positioned between adjacent layers 14 of conductive fibers 38. In some examples, conductive fibers 38 of layer 14 are carbon fibers, with layer 14 being a carbon fiber reinforced polymer (CFRP) material. Other examples of layer 14 may be formed of other suitable materials (in other words, the conductive fibers of layer 14 may be any suitable fiber material). In various examples of neuromorphic architecture 10, laminate 12 may be formed of layers 14 of various conductive fibers, including inherently conductive fibers, fibers with conducting elements added during extrusion, fibers that are coated, embedded, or impregnated with conductive materials, silver nanowires, stainless steel fibers, aluminum fibers, graphene-coated textile fibers, conductive cotton fibers (ARACON®), carbon nanotubes, metallic fibers, and/or conductive yarns. In some examples, layers 14 of conductive fibers may be formed from substrates such as cotton fibers, polyester fibers, nylon fibers, aramid fibers, PBO fibers (e.g., Zylon®), Vectran®, polyamides, polypropylenes, and/or hybrids thereof, which may be coated, impregnated, and/or embedded with conductive materials such as copper, nickel, carbon, gold, silver, titanium, and/or PEDOT.

Laminates 12 of disclosed neuromorphic architectures 10 are formed of a plurality of such layers 14, which are generally stacked on top of one another and cured together, with each layer 14 being pressed together with the other layers 14 of laminate 12. Each respective layer 14 of laminate 12 is formed of the same material, in some examples of neuromorphic architecture 10. For example, each layer 14 of laminate 12 may be formed of CFRP material. In other examples of neuromorphic architecture 10, one or more layers 14 of laminate 12 may be formed of a different material than one or more other layers 14 of laminate 12. For example, alternating layers 14 may be formed of a different material, and/or some layers 14 may be formed of one material while other layers 14 are formed of a different material, in various examples.

Figure 4:
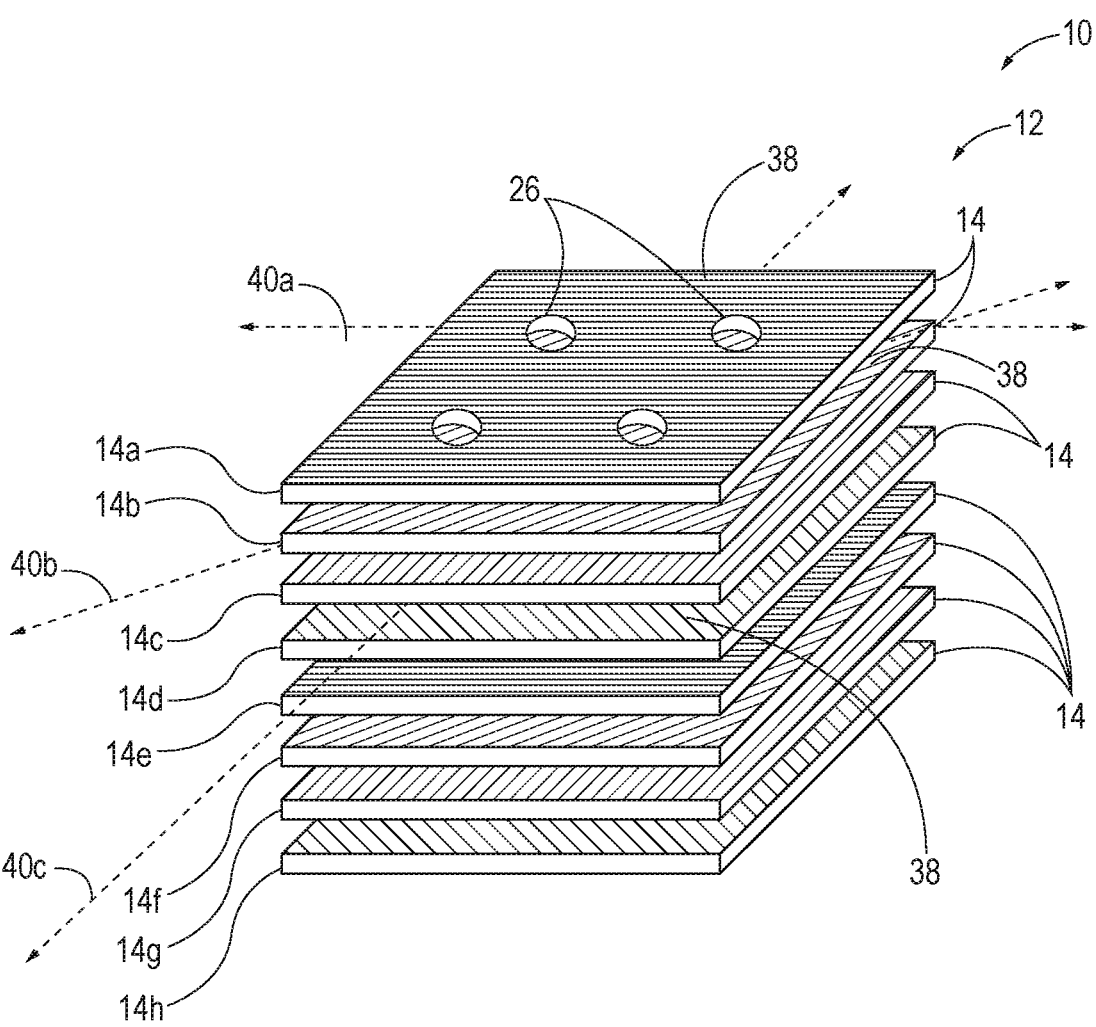
FIG. 4 is a schematic, exploded view of an example of a laminate used to form presently disclosed neuromorphic architectures.

In arranging layers 14 to form laminate 12, a respective orientation of the unidirectional fibers 38 of each respective layer 14 may be different from one or more other respective orientations of unidirectional fibers 38 in one or more other layers 14. For example, as shown in FIG. 4, unidirectional fibers 38 of each layer 14 are arranged in a different orientation from the respective orientations of adjacent layers 14. In some examples, every layer 14 of laminate 12 has fibers arranged in a different orientation from every other layer 14 of laminate 12. In some examples, orientations of respective layers 14 may be alternated. In some examples, orientations of respective layers 14 may be varied in a repeating pattern. For example, as shown in FIG. 4, a longitudinal axis 40a of layer 14a is oriented at 0 degrees. A second, adjacent, layer 14b has unidirectional fibers arranged along a longitudinal axis 40b that is oriented at 45 degrees with respect to longitudinal axis 40a. Thus, the unidirectional fibers of adjacent layers 14a and 14b are arranged in different respective orientations from each other. Similarly, the unidirectional fibers of layer 14c are arranged along a longitudinal axis 40c that is oriented at 90 degrees with respect to longitudinal axis 40a (and at 45 degrees with respect to longitudinal axis 40b). Thus, the unidirectional fibers of layer 14b are arranged at a different orientation than the fibers of adjacent layers 14a and 14c.

In the example shown in FIG. 4, each respective layer 14 is rotated 45 degrees with respect to each adjacent layer 14. For example, layer 14d has unidirectional fibers arranged along a direction that is oriented at 135 degrees with respect to layer 14a. Layer 14e has unidirectional fibers that are rotated another 45 degrees with respect to layer 14d, such that layer 14e is at least substantially parallel to layer 14a (at 180 degrees). Layer 14f is rotated 45 degrees with respect to layer 14e, such that the fibers of layer 14f are substantially parallel to the fibers of layer 14b. Similarly, layer 14g is rotated another 45 degrees with respect to layer 14f, such that the fibers of layer 14g are oriented at 270 degrees with respect to layer 14a, and thus layer 14g is at least substantially parallel to layer 14c. Finally, layer 14h is rotated 45 degrees with respect to layer 14g, and thus has unidirectional fibers oriented at least substantially parallel to those of layer 14d. While the example of FIG. 4 illustrates each respective layer 14 being rotated 45 degrees with respect to each adjacent respective layer 14 (e.g., layer 14g is oriented 45 degrees rotated from layer 14f and 45 degrees rotated (in the opposite direction) from layer 14h), other examples of laminate 12 may have adjacent layers 14 rotated to different extents with respect to each other. For example, other examples of laminate 12 may have the orientation of each respective layer 14 rotated 30 degrees with respect to adjacent layers (forming equilateral triangle-shaped unit cells), or may have the orientation of each respective layer 14 rotated 60 degrees with respect to adjacent layers (forming hexagonal unit cells). Of course, other degrees of rotation or orientations are also within the scope of the present disclosure.

With reference again to FIGS. 1-2, neuromorphic architecture 10 may include an electrical power source 44 (e.g., a current source and/or a voltage source) electrically coupled to laminate 12. For example, power source 44 may be electrically coupled to one or more respective layers 14 of laminate 12. Electrochemical fluid or gel 30 may be, for example, an electrolytic liquid or an electrolytic gel. In one specific example, electrochemical fluid or gel 30 is a copper sulfate solution, though other stable ionic solutions with conductive metal ions are also within the scope of the present disclosure. In other examples, electrochemical fluid or gel 30 may be other metallic salts, such as nickel sulfate. Electrochemical fluid or gel 30 may be any fluid or gel that contains metallic ions that may be deposited on a surface or substrate having an electrically opposite polarity. In some examples, electrochemical fluid or gel 30 may have a viscosity that is sufficiently high enough so as to prevent electrochemical fluid or gel 30 from penetrating layers 14 of laminate 12.

Figure 5:
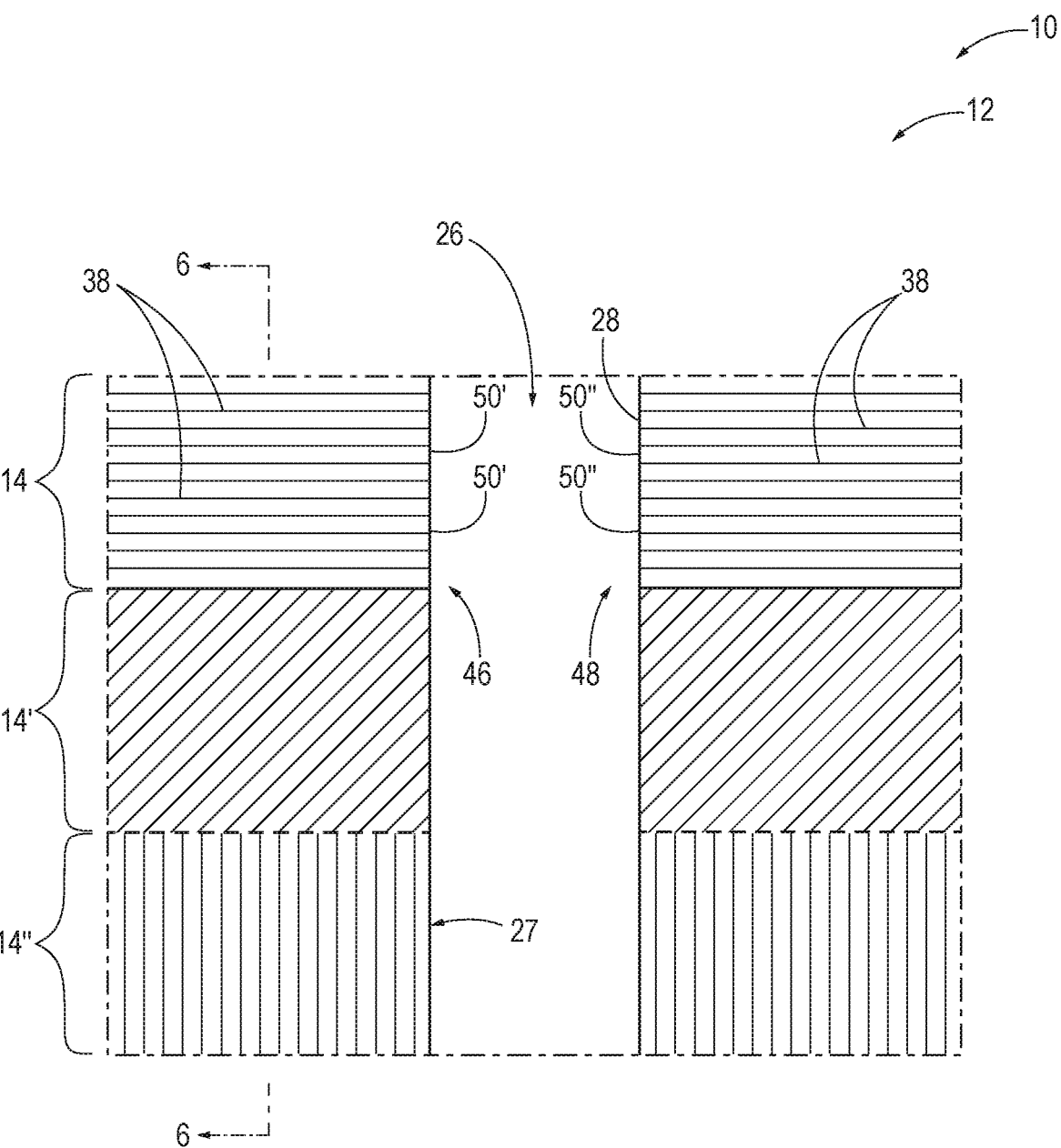
FIG. 5 is a schematic, cross-sectional representation of a portion of a node of presently disclosed neuromorphic architectures.
Figure 6:
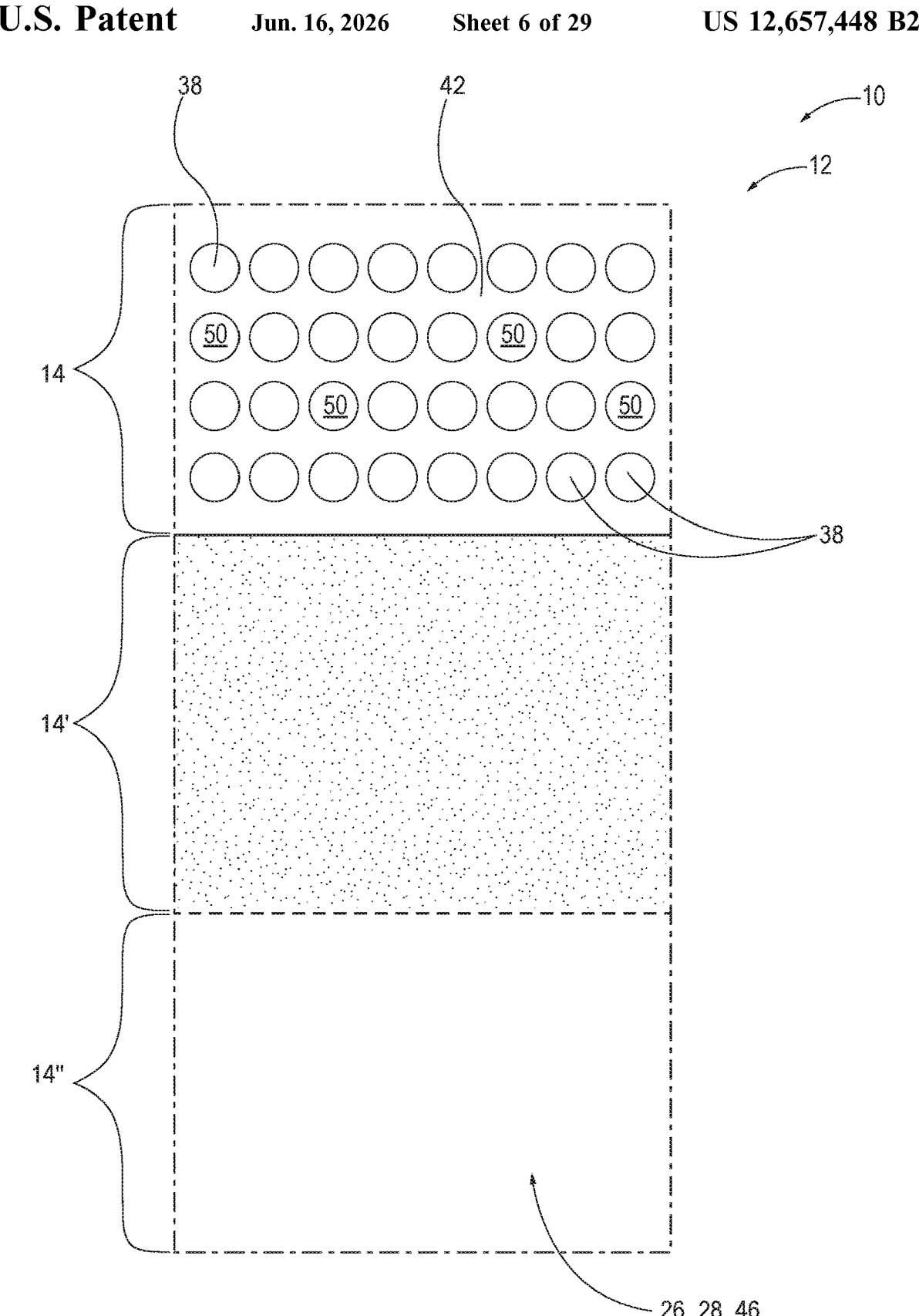
FIG. 6 is a schematic, cross-sectional representation of the portion of the node of FIG. 5, as viewed from within the node.

Because nodes 26 are effectively voids 28, or holes, formed through laminate 12, the unidirectional fibers of each layer 14 are essentially interrupted at each node 26, with fiber endings of each layer 14 facing each other on either side of each void 28. For example, FIG. 5 illustrates an elevation, cutaway view of a portion of laminate 12, with unidirectional fibers 38 schematically represented in layer 14. Layers 14' and 14" in FIG. 5 include unidirectional fibers in other orientations but are not illustrated in FIG. 5, for clarity. As shown in FIG. 5, fibers 38 are interrupted once they intersect node 26 at a first side 46 of node 26, and then fibers 38 continue at a second side 48 of node 26. This interruption, or gap, or segmentation of fibers 38 produces fiber ends 50 at node 26, as best seen in FIG. 6, which shows a cross-sectional view of the portion of laminate 12 from FIG. 5. Fiber endings 50 of each respective layer 14 of laminate may be arranged perpendicular to an interior surface 27 of each respective node 26. Because electrochemical fluid or gel 30 is free to flow into nodes 26, current that flows through fibers 38 creates a charge at fiber ends 50. Depending on the charge of metal ions within electrochemical fluid or gel 30 and the direction of current flow through fibers 38, metal ions may be deposited at fiber ends 50, due to a chemical reduction reaction as a result of the charge at fiber ends 50 (e.g., electroplating). Fiber density of fibers 38 within layers 14 of a given laminate 12 may vary, though in some examples, fiber density of at least 50%, at least 55%, at least 60%, at least 65%, at least 70%, at least 75%, at least 80%, and/or at least 85% may be preferred for neuromorphic architectures 10. Fibers 38 are typically very small, such as on the order of about 5 micrometers in diameter. In various examples, fibers 38 may be less than 1 micrometer in diameter, at least 1 micrometer in diameter, at least 2 micrometers in diameter, at least 3 micrometers in diameter, at least 4 micrometers in diameter, at least 5 micrometers in diameter, at least 6 micrometers in diameter, at least 7 micrometers in diameter, at least 8 micrometers in diameter, at least 9 micrometers in diameter, and/or at least 10 micrometers in diameter. In some specific examples, fibers 38 may be between about 5-7 micrometers in diameter.

The more current that flows through a given node 26, the more metal may be deposited onto fiber ends 50 within that node 26, and accordingly, the deposited metal may effectively "grow" across void 28, partially or fully bridging fiber ends 50 on opposite sides 46, 48 of void 28. For example, each respective fiber 38 may be said to have a first terminal end 50' (also referred to herein as first fiber end 50') on first side 46 of node 26 and a second terminal end 50" (also referred to herein as second fiber end 50") on second side 48 of node 26. In this manner, metal deposits may create an electrical connection between fibers 38 on either side of node 26. Reversing the direction of current flow can cause the deposited metal to be dissolved, or released back into electrochemical fluid or gel 30. In other words, metal deposition within each node 26 is reversible, though generally deposited metal will not dissolve back into electrochemical fluid or gel 30 without such a current flow change (e.g., polarity reversal), due to stoichiometric stability of the reaction. For example, metal ions from electrochemical fluid or gel 30 may be deposited on first terminal ends 50' of at least some of unidirectional fibers 38 when a current flows in a first direction with respect to unidirectional fibers 38, and metal ions from electrochemical fluid or gel 30 may be deposited on second terminal ends 50" of at least some of the unidirectional fibers when the current flows in a second direction with respect to unidirectional fibers 38.

When current flows through the fibers of layers 14 and through electrochemical fluid or gel 30, metal ions from electrochemical fluid or gel 30 may be deposited at one or more nodes 26, dependent on the amount of current flowing through that respective node 26. Generally, the amount of metal deposited on fiber endings at a given node 26 is proportional to the amount of current flowing through that respective node 26 and the duration of that current (e.g., the local time integral of the electric current, or the total electric charge that has been transferred through the respective node 26), with metal growth generally occurring at negative electrodes. Because nodes 26 extend through multiple layers 14 of laminate 12, the plurality of distributed nodes 26 may be configured to facilitate connections between layers 14 of laminate 12, as will be described in detail herein. As more current flows through a given node 26, metal depositions may grow, akin to a dendrite, from one side of a respective node 26 towards the other side of the respective node 26. The more current that flows through node 26, the more metal (e.g., copper) is deposited at that node 26. The pattern of metal growth may be unique to that particular node 26, due to the history of current flow through that node 26 and the connections to neighboring nodes 26.

Because the amount of metal deposited at a given node 26 is dependent on the amount and direction of current flowing though that node 26, disclosed neuromorphic architectures 10 may be said to have an effective residual memory from the respective cumulative amount of metal ions deposited at each respective node 26, with the memory being configured to be modified and/or erased by modifying and/or reversing the current flow with respect to laminate 12. The number of connections provided by disclosed neuromorphic architectures 10, along with the effective memory the hardware provides, can result in neuromorphic architectures 10 having the complexity of a neural network, such that neuromorphic architecture 10 may be configured to act as a processor, which may be autonomous and/or have a low wattage and/or power consumption. Advantageously, neuromorphic architecture 10 may be configured to provide local processing that is not reliant on a cloud network, and/or may be programmable via hardware, without a computer. Furthermore, neuromorphic architecture 10 is configured to provide decentralized processing due to the distributed and spaced apart nature of nodes 26. In various examples, neuromorphic architecture 10 may be configured to perform pattern recognition tasks, register a pattern via the plurality of nodes 26, and/or create a nodal memory. In some examples, neuromorphic architecture 10 provides a sufficient number of connections and layers to exhibit deep learning functionality. Because the neuromorphic processing tasks are distributed across the plurality of distributed nodes 26 of neuromorphic architecture 10, said neuromorphic architectures 10 may be said to exhibit decentralized processing, which may be configured to mimic the neuro-biological architecture of biological nervous systems, such as those distributed systems present in cephalopods.

With reference again to FIG. 1, laminate 12 may be used in construction of assemblies such as aircraft and other vehicles. For example, because carbon fiber materials are widely used in aircraft construction, neuromorphic architecture 10 may be created using existing structures and/or used to construct new aircraft or other vehicles or structures. In this manner, neuromorphic architectures 10 may make use of hidden complexities in carbon fiber materials commonly used in many industries. In some examples, upper surface 18 of laminate 12 may serve as an outer surface of an aircraft body or similar structure. In this manner, upper surface 18 of laminate 12 may be configured to serve as embedded neuromorphic intelligence that can be trained and/or that dynamically responds to environmental changes without an external central processing unit. Of course, the same may be true of lower surface 22 of laminate 12, as the terms "upper" and "lower" are used for convention and ease of description only, and do not limit the orientation of laminate 12 in use.

Neuromorphic architecture 10 may include at least one neural interface 52 electrically and/or physically coupled to at least one layer 14 of laminate 12, with the at least one neural interface 52 being configured to deliver electrical current to electrochemical fluid or gel 30 and/or being configured to receive an output from neuromorphic architecture 10. In some examples, neural interface 52 may include at least one neural input interface 54 configured to deliver electrical current to electrochemical fluid or gel 30, and/or at least one neural output interface 56 configured to receive the output from neuromorphic architecture 10. In some examples, neural interface 52 may include a first neural interface 52 configured to selectively deliver electrical current to electrochemical fluid or gel 30, or receive output from neuromorphic architecture 10, and a second neural interface 52 configured to selectively deliver electrical current to electrochemical fluid or gel 30, or receive the output, wherein functions of the first neural interface 52 and the second neural interface 52 may be selectively reversible. In other words, the functions performed by one or more neural interfaces 52 may be the same as each other, different from each other, include multiple functions, and/or be selectively changeable such that different neural interfaces 52 perform different functions at different times.

Neural interfaces 52 may be coupled to one or more layers 14 of laminate 12. In some examples, a first neural interface 52 may be coupled to a first layer 14 (e.g., uppermost layer 16) of laminate 12, while a different neural interface 52 may be coupled to a different layer 14 (e.g., lowermost layer 20) of laminate 12. In specific examples, one or more neural interfaces 52 may be an electrical connector having a plurality of micro-pads, with each respective micro-pad being electrically coupled to a respective bundle of fibers 38 of one layer 14 of laminate 12. In some examples, neural output from neuromorphic architecture 10 is fed back into neuromorphic architecture 10 (such as via neural input interface 54) to create a feedback loop for training and/or processing purposes, such as for a recurrent network. In some examples, neuromorphic architecture 10 may be configured to be a feed forward, supervised architecture. Additionally or alternatively, neuromorphic architecture 10 may be configured to be a self-learning, recurrent network. In some examples, neuromorphic architecture 10 is selectively configurable to be a feed-forward architecture or a feedback architecture.

Nodes 26 may be arranged in an array across laminate 12, as illustrated in FIG. 2. Any number of nodes 26 may be formed through laminate 12. In some examples, each node 26 may have a substantially uniform diameter, while in other examples, one or more nodes 26 may have a different diameter than one or more other nodes 26. The plurality of distributed nodes 26 may be configured to decentralize processing performed by neuromorphic architecture 10 and may be configured to form a number of potential, combinatorial connections with nonlinear multidimensionality. The number of potential connections may be at least 100, at least 1,000, at least 10,000, at least 100,000, at least 1,000,000, at least 10,000,000, at least 100,000,000, at least $10^9$, at least $10^{10}$, at least $10^{11}$, and/or at least $10^{12}$ in various examples. Neuromorphic architectures 10 may include at least 100, at least 1,000, and/or at least 10,000 distributed nodes 26. Nodes 26 may be configured to provide nonlinear, multidimensional connectivity between said nodes 26. Additionally or alternatively, nodes 26 may be configured to provide vertical fiber connectivity between different layers 14 of laminate 12 (which would otherwise be insulated from each other due to polymer matrix 42). The number of potential vertical node connections may be determined by multiplying a total number of nodes 26 by the number of layers 14 of laminate 12. The number of nodes 26 may be increased as the diameter of nodes 26 decreased. The total number of neural connections is directly related to the fiber density of layers 14 of laminate 12, per unit cross-section.

Figure 7:
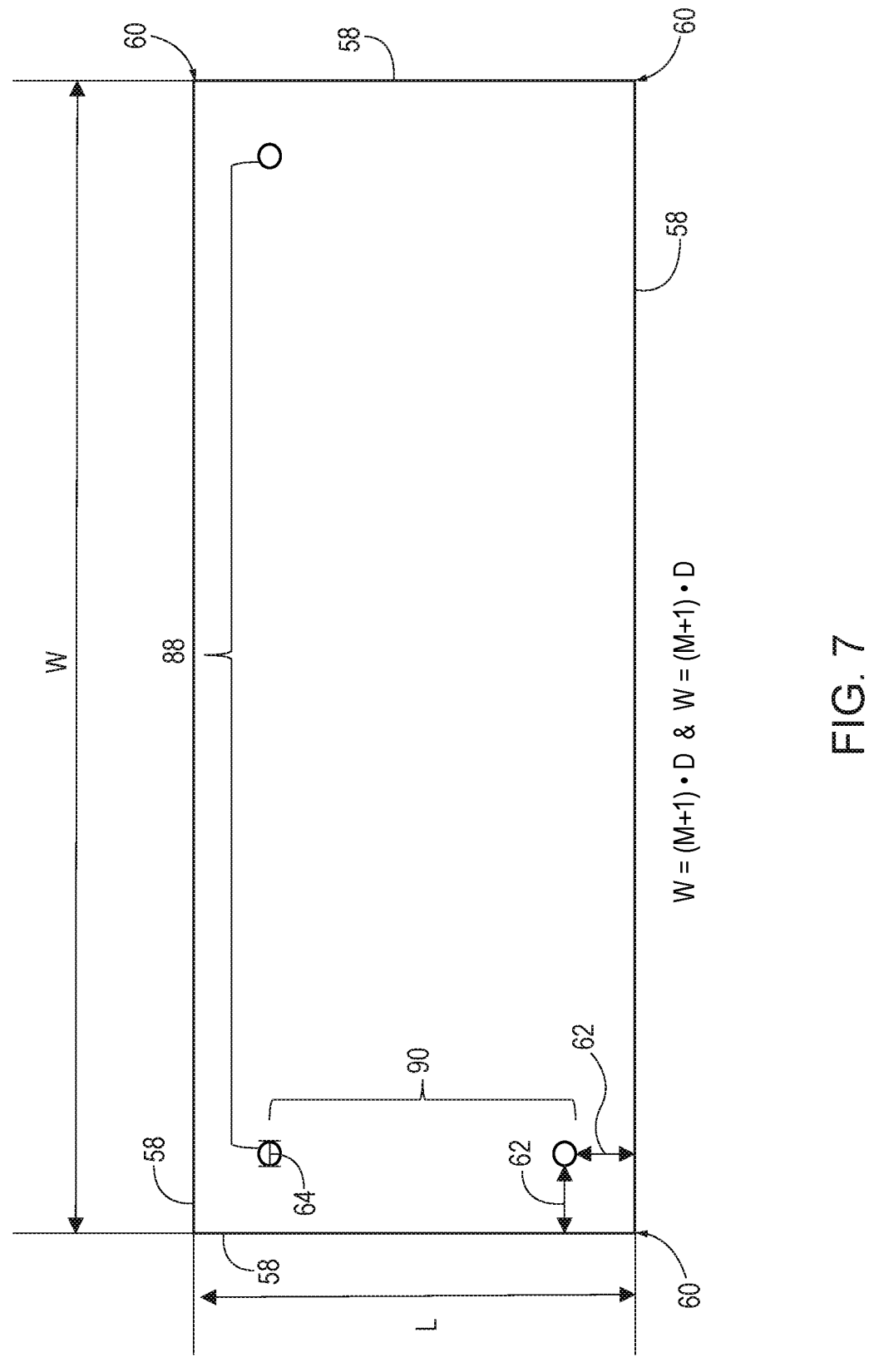
FIG. 7 is a schematic diagram representing examples of arrangements of arrays of nodes for presently disclosed neuromorphic architectures.

Nodes 26 may be spaced apart from each other by a minimum distance determined at least in part by a diameter of the distributed nodes 26. As shown in FIGS. 2 and FIG. 7, laminate 12 may be bounded by a plurality of edges 58, with each respective pair of adjacent edges 58 forming a respective intersection 60. Nodes 26 may be distanced from each edge 58 by a distance 62 sufficient to ensure that each node 26 is spaced apart from intersection 60 enough to be configured to accommodate connections between fibers in each layer 14 of laminate 12. In various examples, distance 62 may be at least as great as a diameter 64 of node 26, at least twice the size of diameter 64 of node 26, at least three times the size of diameter 64 of node 26, at least four times diameter 64 of the node 26, and/or at least five times diameter 64 of node 26. In some examples, spacing of nodes 26 with respect to edges 58 may be determined based on diameter 64 of nodes 26 and based on distancing nodes 26 from edges 58 sufficiently to maximize fiber connections by ensuring that fibers 38 do not get cut off before reaching node 26. Edges 58 of laminate 12 may form a perimeter that is square shaped, rectangular, triangular, hexagonal, octagonal, and/or any other desired shape. Within laminate 12, the plurality of nodes 26 also may be arranged in any suitable shape, such as a square-shaped array or a rectangular array.

Figure 32:
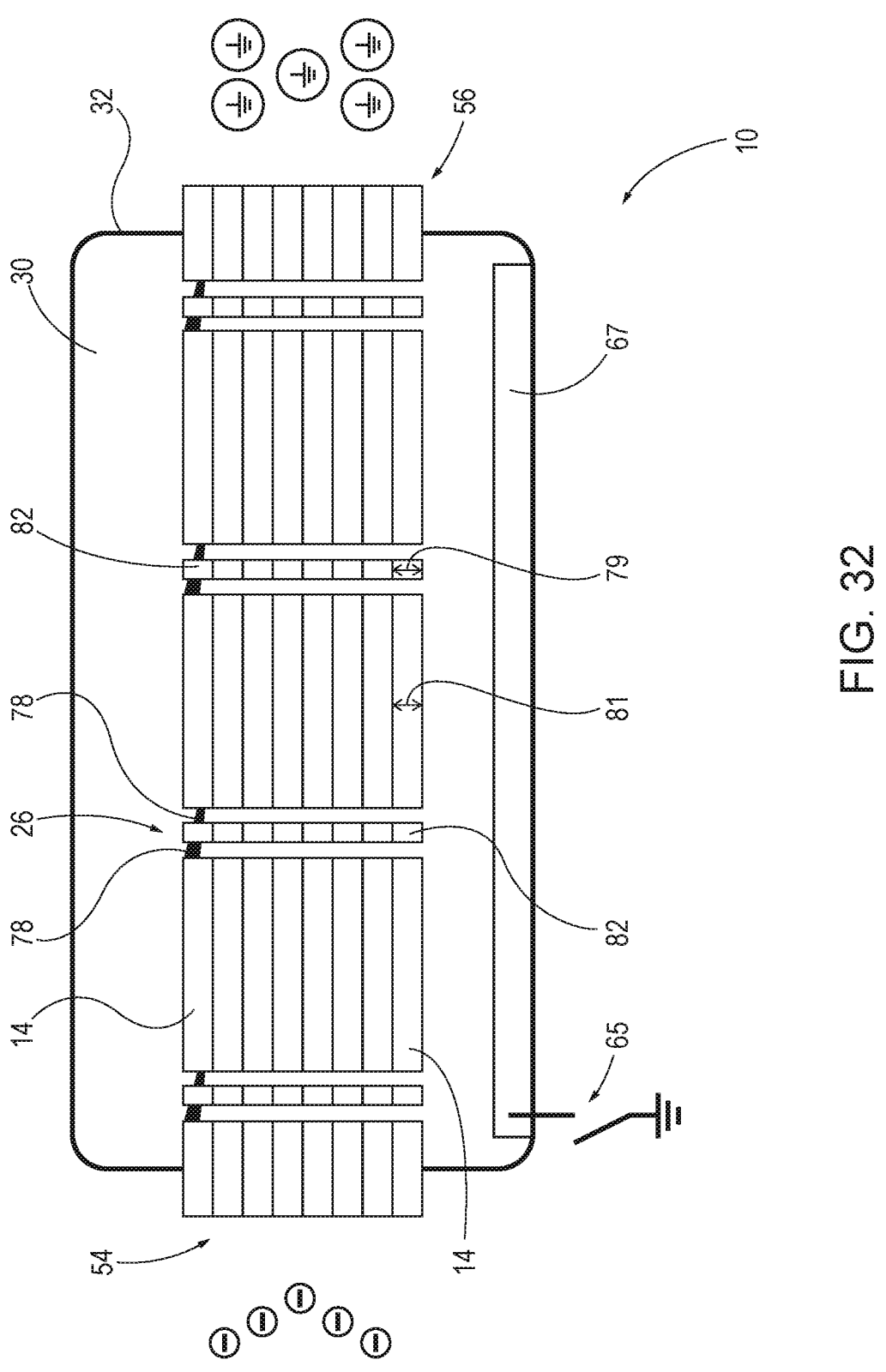
FIG. 32 is a schematic representation of an example of a neuromorphic architecture having a metal plate reservoir, and configured for writing to memory.
Figure 33:
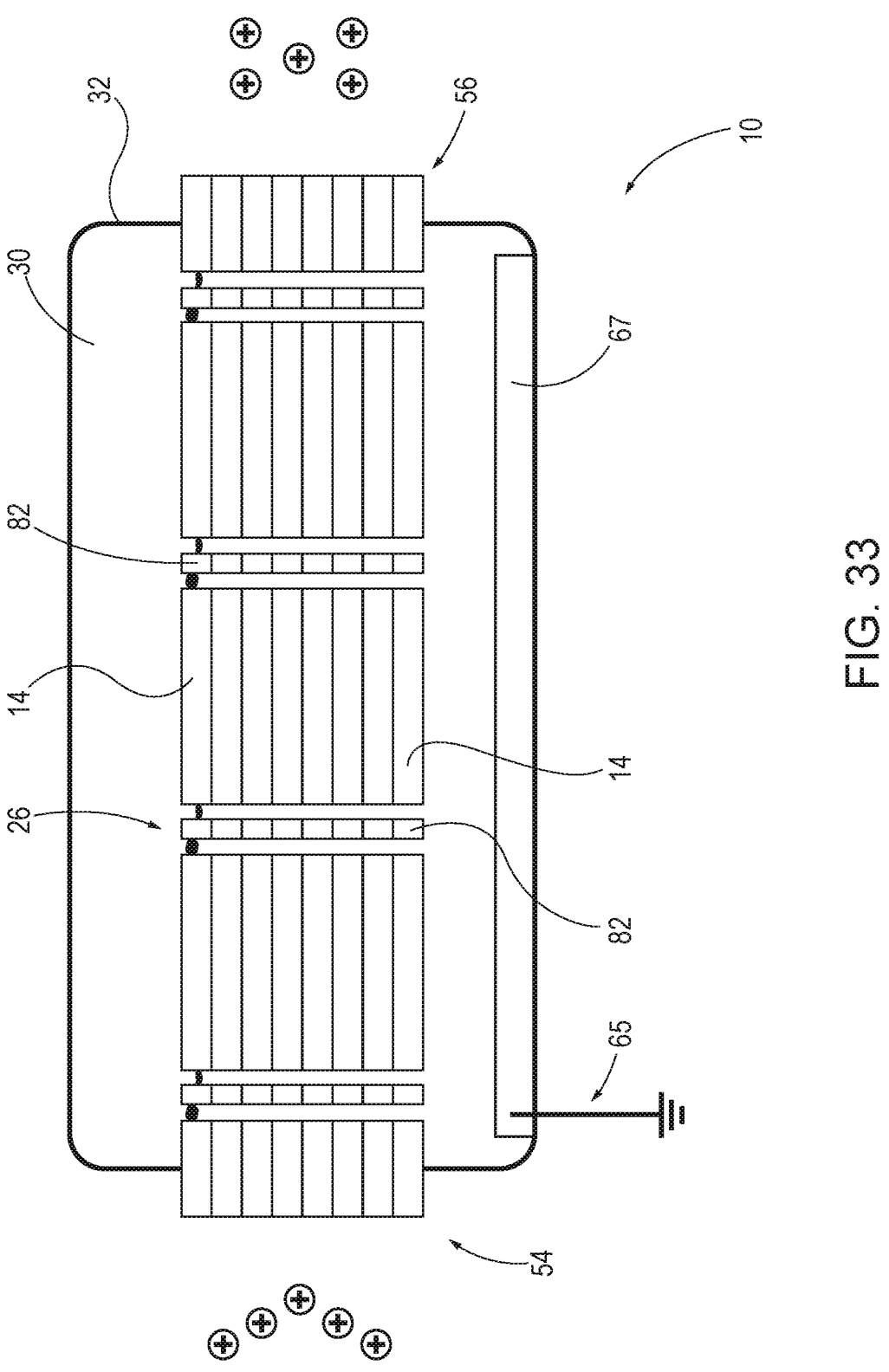
FIG. 33 is a schematic representation of an example of a neuromorphic architecture having a metal plate reservoir, and configured for memory erasure.

Some examples of neuromorphic architecture 10 include a metallic plate 67, as shown in FIGS. 32-33. Metallic plate 67 may effectively serve as a metal ion reservoir of sorts, such as a copper plate reservoir (e.g., in the case of electrochemical fluid 30 comprising copper sulfate), in some examples. Generally, metallic plate 67 may contain the metal of a metallic salt used as electrochemical fluid 30. FIG. 32 shows a portion of neuromorphic architecture 10, with electrochemical fluid 30 hermetically sealed within encapsulant 32. In this example, neuromorphic architecture 10 includes a floating nodal pin segment 82 for each layer 14 of laminate 12. In some examples, neuromorphic architecture 10 may include a respective floating nodal pin segment 82 for each group of layers 14 of a plurality of groups of layers within laminate 12. In other words, laminate 12 may be thought of as being composed of modular sets of one or more layers 14, with a respective pin segment 82 for each modular layer or layers 14. In general, a height 79 of pin segment 82 may substantially match that of a thickness 81 of layer or layers 14. In some examples, pin segments 82 may include a permeable material or a perforated material around each pin segment 82 that may be configured to maintain pin segment 82 within node 26.

Metal deposit 78 growth across nodes 26 may be aided by pin segments 82, as shown. A negatively charged input pattern may be provided to neuromorphic architecture 10, such as via neural input interface 54, while an output pattern may be produced by neuromorphic architecture 10, such as via neural output interface 56. In some examples, neural output interface 56 may be grounded. A switch 65 may be electrically coupled to metallic plate 67. When witch 65 is open, as shown in FIG. 32, metallic plate 67 may be floating, and neuromorphic architecture 10 may be configured to write to memory (e.g., experience growth of metal deposits 78 within nodes 26 according to established patterns). Metallic plate 67 may serve to provide additional metal ions into electrochemical fluid 30 to allow for further growth of metal deposits 78. Metallic plate 67 may be part of encapsulant 32, or may otherwise be coupled to encapsulant 32, though generally is contained within encapsulant 32 such that it is exposed to electrochemical fluid 30.

Closing switch 65 (e.g., grounding metallic plate 67) may result in configuring neuromorphic architecture 10 for erasing memory, or dissolving metal deposits 78 back into electrochemical solution 30. FIG. 33 shows such an example of neuromorphic architecture configured for erasing memory, with switch 65 in a closed position, thereby grounding metallic plate 67. In this configuration, the input pattern provided at neural input interface 54 and the output pattern produced at neural output interface 56 are both positively charged, as schematically represented in FIG. 33.

Figure 8:
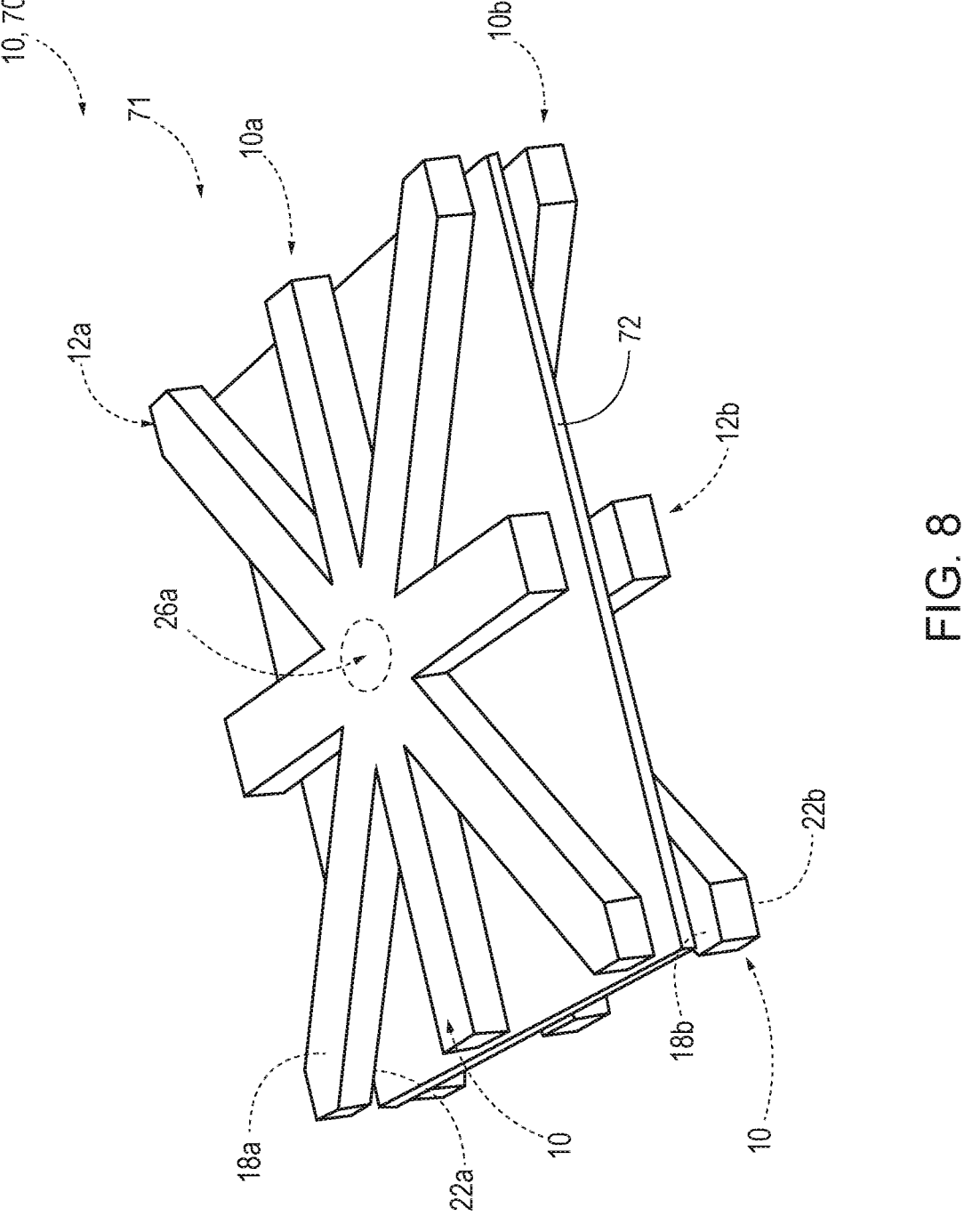
FIG. 8 is a schematic representation of an example of a neuromorphic architecture and neuromorphic actuator according to the present disclosure.

FIG. 8 schematically illustrates a unit cell 71, which may be a unit cell of an example of neuromorphic architecture 10 or a unit cell of a neuromorphic actuator 70. As used herein, the term "neuromorphic actuator" may include any neuromorphically controlled actuator. Unit cell 71 is formed from two laminates 12 (e.g., laminate 12a and laminate 12b) separated by a dielectric insulation layer 72 positioned therebetween. Such dielectric insulation layer 72 may effectively increase the number of combinatorial connections via distributed nodes 26 in a given neuromorphic architecture 10 formed by a plurality of unit cells 71. Additionally or alternatively, a plurality of unit cells 71 together may form a first neuromorphic architecture 10a separated from a second neuromorphic architecture 10b by dielectric insulation layer 72 to create neuromorphic actuator 70. In other words, a first neuromorphic architecture 10a may be positioned on one side of dielectric insulation layer 72, and a second neuromorphic architecture 10b may be positioned on the opposite side of dielectric insulation layer 72 to create neuromorphic actuator 70. Neuromorphic architectures 10a and 10b (or laminates 12a and 12b) are schematically represented by a series of arrows corresponding to the orientations of the unidirectional fibers of each layer of the laminate making up the respective neuromorphic architecture 10a, 10b, though it is to be understood that neuromorphic architectures 10a, 10b are neuromorphic architectures 10 as described in FIG. 1-7 (i.e., the layers of each neuromorphic architecture 10a, 10b overlap each other throughout the laminate rather than just in the middle of the laminate). Neuromorphic architecture 10a (or laminate 12a) may be described as having an upper surface 18a and a lower surface 22a, while neuromorphic architecture 10b (or laminate 12b) may be described as having an upper surface 18b and a lower surface 22b, with lower surface 22a being separated from upper surface 18b by dielectric insulation layer 72. Dielectric insulation layer 72 is generally configured to electrically insulate neuromorphic architecture 10a from neuromorphic architecture 10b (or to electrically insulate laminate 12a from laminate 12b).

Figure 9:
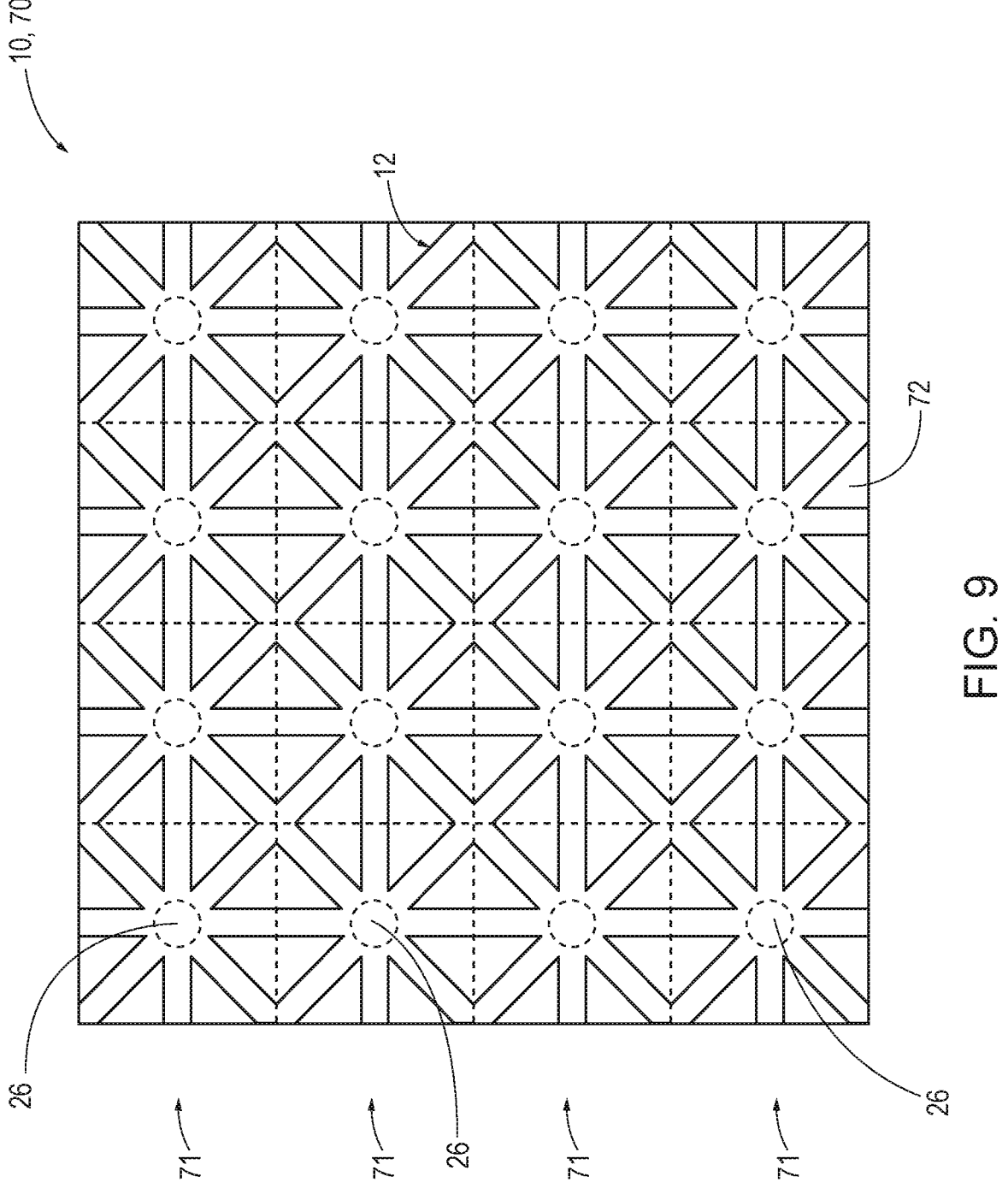
FIG. 9 is a schematic representation of a plurality of modular units of disclosed neuromorphic architectures or neuromorphic actuators.

Such a neuromorphic architecture 10 or neuromorphic actuator 70 may have a first plurality of distributed nodes 26 (e.g., node 26a) on one side of dielectric insulation layer 72, and a second plurality of distributed nodes 26 on the opposite side of dielectric insulation layer 72. Each node 26 (e.g., node 26a) of laminate 12a (or neuromorphic architecture 10a) generally consists of a void that extends transversely from upper surface 18a to lower surface 22a. Similarly, each node 26 of laminate 12b (or neuromorphic architecture 10b) generally consists of a void that extends transversely from upper surface 18b to lower surface 22b. In some examples, nodes 26 are discontinuous on either side of dielectric insulation layer 72, such that the nodes 26 do not extend through dielectric insulation layer 72. In some examples, one or more nodes 26 may extend through dielectric insulation layer 72. While not shown in FIG. 8, neuromorphic actuators 70 and neuromorphic architectures 10 include an electrochemical fluid (e.g., electrochemical fluid 30) that is contained with respect to the actuator or architecture such that the fluid is free to flow into the voids of nodes 26 as described herein. Neuromorphic architecture 10 may be formed of a plurality of such unit cells 71, as schematically represented in FIG. 9, and may or may not include dielectric insulation layer 72. Similarly, neuromorphic actuator 70 may be formed of a plurality of such unit cells 71, also as schematically represented in FIG. 9. Such unit cells 71 may be effectively formed of a single, continuous laminate 12 having a plurality of distributed nodes 26, or may be a plurality of laminates 12 coupled together. Unit cell 71 is typically a convention for discussing and analyzing neuromorphic actuator 70 or neuromorphic architecture 10, rather than the same being constructed of discrete modular pieces, though in some examples, unit cells 71 may represent discrete modular structures each having one or more nodes 26.

Figure 10:
FIG. 10 is a schematic, cross-sectional representation of a node of a neuromorphic actuator.
Figure 10:
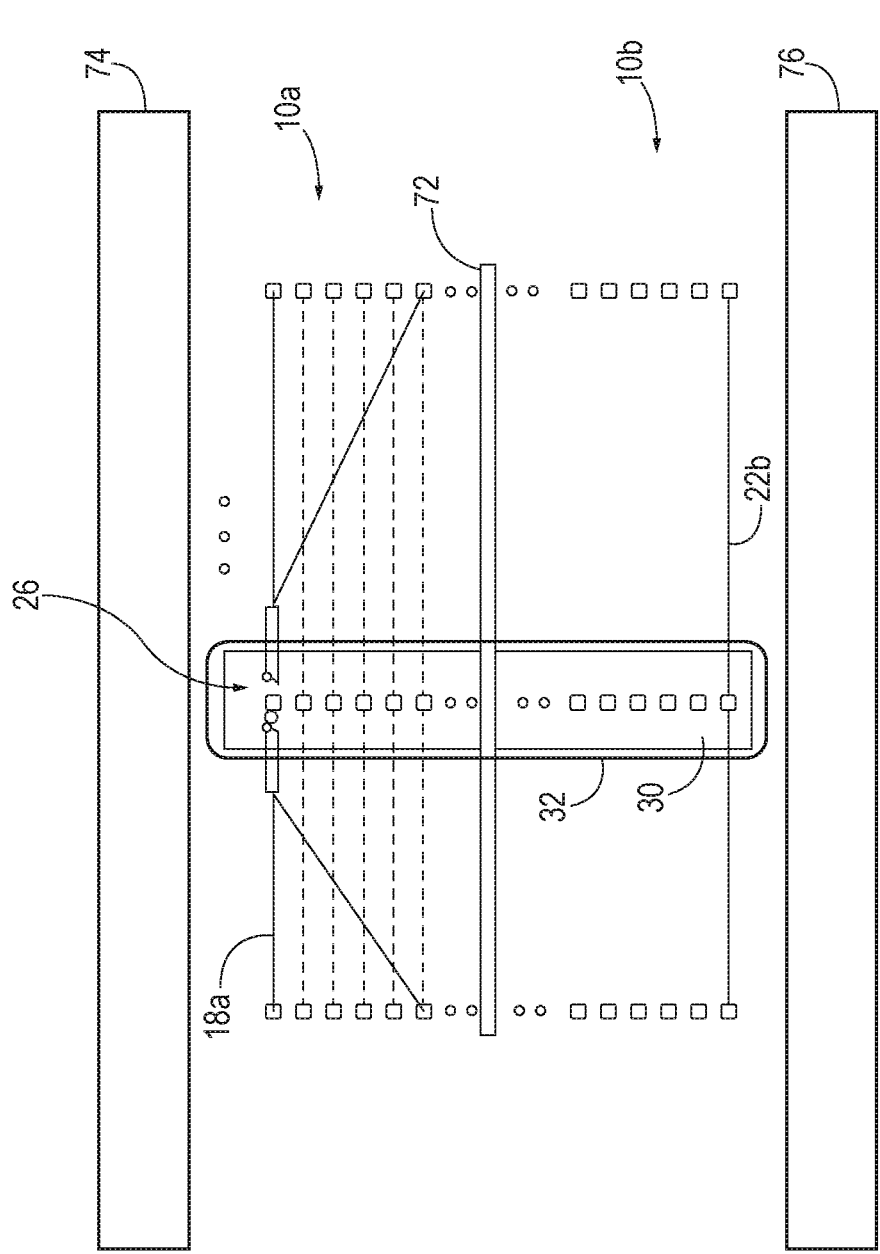

In some examples, neuromorphic actuator 70 may include a first shape memory alloy layer coupled to upper surface 18a and a second shape memory alloy layer coupled to lower surface 22b. For example, FIG. 10 schematically represents a portion of a non-exclusive example of neuromorphic actuator 70 having first neuromorphic architecture 10a and second neuromorphic architecture 10b separated by dielectric insulation layer 72, with first shape memory alloy (SMA) layer 74 coupled to upper surface 18a of first neuromorphic architecture 10a, and second SMA layer 76 coupled to lower surface 22b of second neuromorphic architecture 10b. SMA layers 74, 76 may be any metallic alloy where its morphology may be predetermined and selectively thermally modified. In other examples of neuromorphic actuator 70, other materials and/or mechanisms may be integrated with neuromorphic architecture 10, in addition to or instead of shape memory alloy layers 74, 76. For example, neuromorphic architecture 10 may be integrated with servo mechanisms, step motors, and/or hydraulic actuators.

In the schematic representation of FIG. 10, just one node 26 is illustrated for explanatory purposes, though it is to be understood that neuromorphic actuator 70 includes a plurality of nodes 26 distributed throughout neuromorphic architecture 10a and neuromorphic architecture 10b. Similarly, encapsulant 32 is schematically illustrated as enclosing just the single node 26 illustrated in FIG. 10. In some examples, neuromorphic architectures 10 or neuromorphic actuators 70 may include a plurality of encapsulants 32, such as an individual encapsulant 32 for each node 26, or a respective encapsulant 32 for each respective grouping of nodes 26. In other examples, neuromorphic architecture 10 or neuromorphic actuator 70 may include just one encapsulant 32 for all nodes 26, or one encapsulant 32 on each side of dielectric insulation layer 72. In some examples, encapsulant 32 may be configured to encapsulate first laminate 12a of neuromorphic architecture 10a, second laminate 12b of neuromorphic architecture 10b, nodes 26 of first neuromorphic architecture 10a, nodes 26 of second neuromorphic architecture 10b, and electrochemical fluid 30 such that electrochemical fluid 30 is free to flow within encapsulant 32.

First SMA layer 74 may be a continuous layer of SMA material, or may be discontinuous, or segmented. For example, first SMA layer 74 may consist of a plurality of sections of SMA material, such as by having a separate section of SMA material for each node 26 of neuromorphic architecture 10a. In other words, first neuromorphic architecture 10a may be, or include, a first plurality of modular units. Similarly, second SMA layer 76 may be a continuous layer of SMA material, or may be discontinuous, or segmented. For example, second SMA layer 76 may consist of a plurality of sections of SMA material, such as by having a separate section of SMA material for each node 26 of neuromorphic architecture 10b. In other words, second neuromorphic architecture 10b may be, or include, a second plurality of modular units.

First SMA layer 74 may be configured to create a differential with respect to second SMA layer 76. For example, first SMA layer 74 may have a first thermal expansion coefficient, while second SMA layer 76 may have a second, different thermal expansion coefficient. In some examples, neuromorphic actuator 70 may be configured to exhibit behavior conceptually similar to muscle memory. For example, neuromorphic actuator 70 may be configured to actuate in response to an applied current, via different movements of first SMA layer 74 and second SMA layer 76 due to formation of metal ion deposits at some locations, but not others, repeatedly over time. Additionally or alternatively, neuromorphic actuator 70 may be trained via external forces acting on first SMA layer 74 and/or second SMA layer 76. For example, external forces on first SMA layer 74 and/or second SMA layer 76 may result in changes in connectivity amongst first neuromorphic architecture 10a and second neuromorphic architecture 10b.

SMA layers 74, 76 may be modular in nature, with units of SMA layers 74, 76 being independently controllable from each other via neuromorphic actuator 70. In this manner, by controlling the extent and direction of bending of each unit of SMA layer 74 and/or SMA layer 76, complex warping or contours can be created in an overall surface created by the combination of the modular units of SMA layers 74, 76. Such control of the surface geometry can be selectively controlled by applying heat to SMA layer 74 and/or SMA layer 76, and/or by varying and controlling the current to different nodes 26 to create the desired bending and shape in different areas of neuromorphic actuator 70. In some examples, the shape-shifting in surfaces created by SMA layers 74, 76 may be simultaneously sensed by neuromorphic architecture 10 to complete a feedback loop. In some examples, neuromorphic architecture 10 may thereby be trained dynamically and respond to environmental changes without needing a CPU in some examples. Neuromorphic actuators 70 may be configured to provide real-time feedback regarding changes in surface shape, which may enable real-time responses to counteract or enhance movement.

Figure 11:
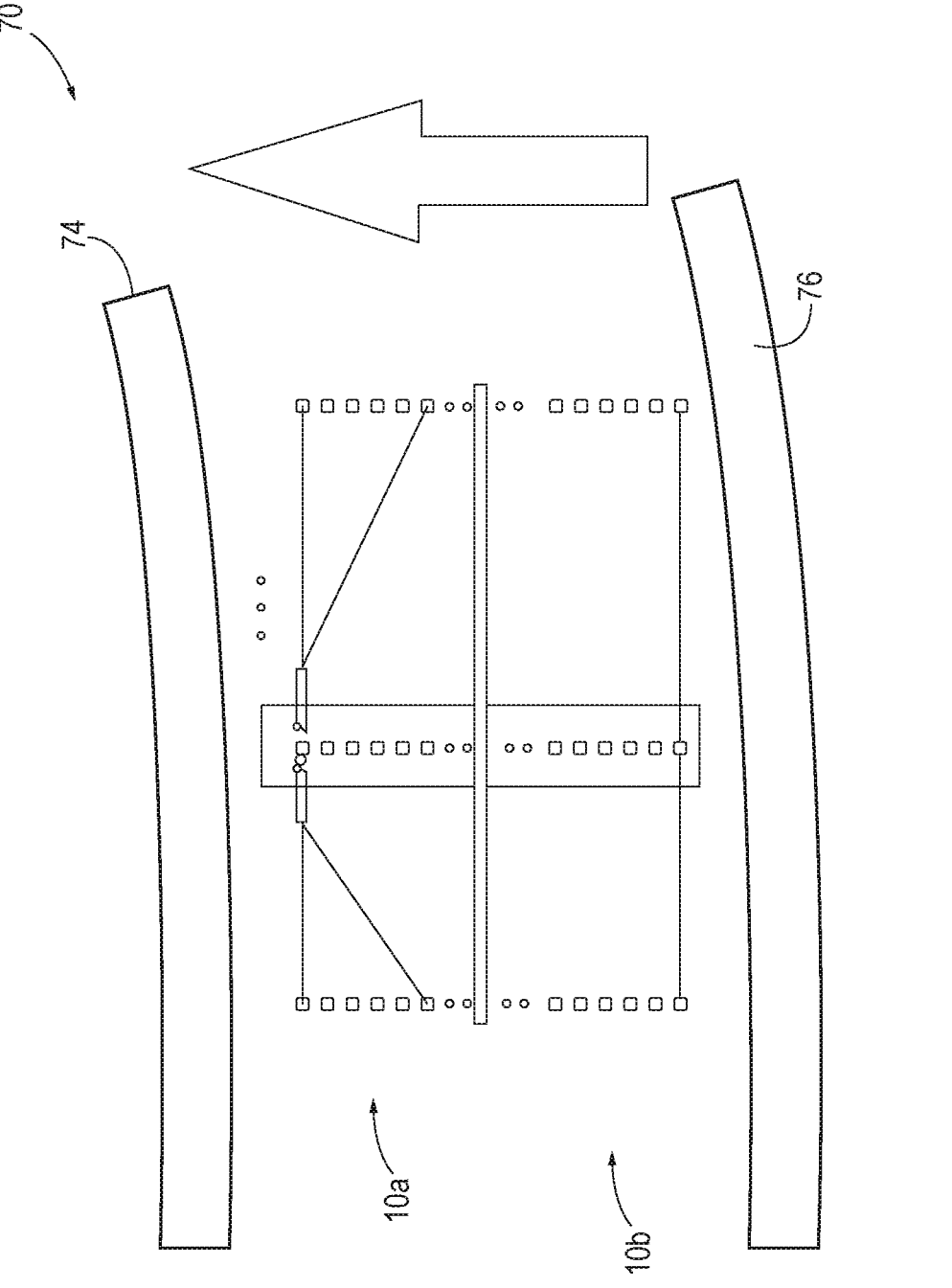
FIG. 11 is a schematic, cross-sectional representation of a node of a neuromorphic actuator undergoing bending.

As schematically illustrated in FIG. 11, for example, a change in current can produce an upward force due to first SMA layer 74 getting shorter, similar to behaviors of bimetals. Of course, in other examples, a change in current may produce a downward force due to second SMA layer 76 getting shorter, relative to first SMA layer 74. Additionally or alternatively, an external force on neuromorphic actuator 70 that causes first SMA layer 74 and second SMA layer 76 to bend upwards may affect current flow through neuromorphic architectures 10a, 10b, thereby allowing neuromorphic actuator 70 to act as a force sensor in some examples. For example, an upward bending movement as illustrated may cause first SMA layer 74 to be compressed, while second SMA layer 76 is expanded to accommodate the bending. Such bending may create incidental contacts in layers 14 of neuromorphic architecture 10 near first SMA layer 74, while also interrupting contacts in layers 14 of neuromorphic architecture 10 near second SMA layer 76. In such examples, the presence of external forces may be sensed by connectivity ratio change between neuromorphic architecture 10a and neuromorphic architecture 10b. In other words, first neuromorphic architecture 10a and second neuromorphic architecture 10b may be configured to sense movement of first SMA layer 74 and second SMA layer 76, respectively. Thus, neuromorphic actuator 70 may be configured for both processing and actuation.

Similar to neuromorphic architecture 10 in FIGS. 1-2, disclosed neuromorphic actuators 70 may include a power source (e.g., power source 44, which may be a current source and/or a voltage source). Said power source may be configured to supply a current and/or voltage to first neuromorphic architecture 10a and/or to second neuromorphic architecture 10b. In some examples, a single power source may provide current to both neuromorphic architectures 10a, 10b, while in other examples, neuromorphic actuator 70 may include a separate power source for each neuromorphic architecture 10. Said power sources may be configured to selectively alter the current, to reshape first SMA layer 74 and/or second SMA layer 76 according to connections in nodes 26 of first and/or second neuromorphic architectures 10a, 10b.

Figure 12:
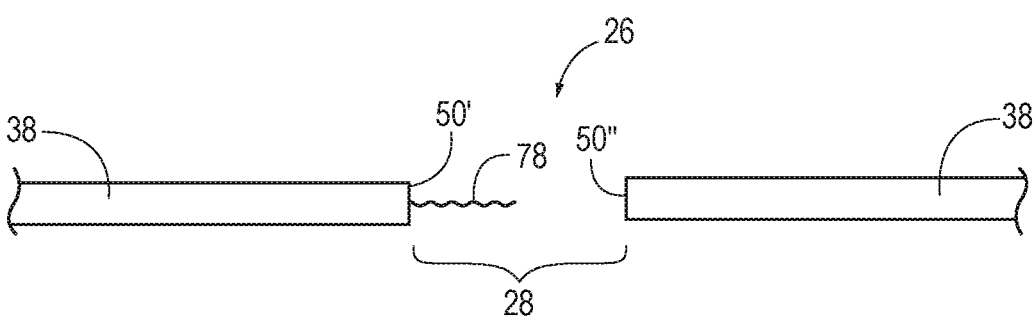
FIG. 12 is a schematic representation of metal deposition between two fiber ends, extending partially across a node.
Figure 13:
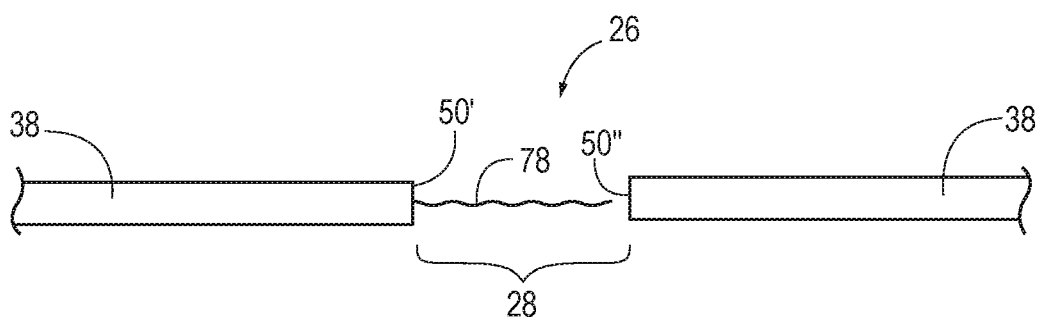
FIG. 13 is a schematic representation of additional metal deposition between two fiber ends, extending further across the node.

In some examples, conductivity within nodes 26 of neuromorphic architecture 10a and nodes 26 of neuromorphic architecture 10b has a sigmoidal response from metal deposits within the nodes. For example, as schematically represented in FIGS. 12-13, metal deposits 78 may be deposited on fiber end 50' and grow towards the opposite fiber end 50" as more metal deposits 78 are deposited. FIG. 12 illustrates metal deposits 78 that bridge part of void, or gap, 28 between ends 50', 50" of fiber 38. In some examples, metal deposits 78 may grow a significant way across void 28 without providing any (or very little) electrical connectivity between fiber end 50' and fiber end 50", while at some point a threshold may be reached where metal deposits 78 are close enough to the opposite fiber end that the connectivity between fiber end 50' and fiber end 50" is the same as or substantially the same as if they were in physical contact with each other, via metal deposit 78. For example, some conduction between fiber ends 50' and 50" may take place via ions traveling through encapsulant 32. FIG. 13 schematically illustrates an example of an arrangement that may produce such a sigmoidal response, where metal deposit 78 has grown across a substantial portion of void 28, but does not touch fiber end 50", yet may be close enough to electrically connect fiber end 50' to fiber end 50". As used herein, a "sigmoidal response" is one that resembles a "soft" step function that is fully continuous and differentiable at the transition point. In some examples, the electrical current spikes when metal deposit 78 grows across node 26 to the point that it makes contact with a pin 80 (FIG. 14) and/or with fibers 38 on the opposite side of node 26, according to the input/output pathways created during the training and/or processing of neuromorphic architecture 10.

Figure 14:
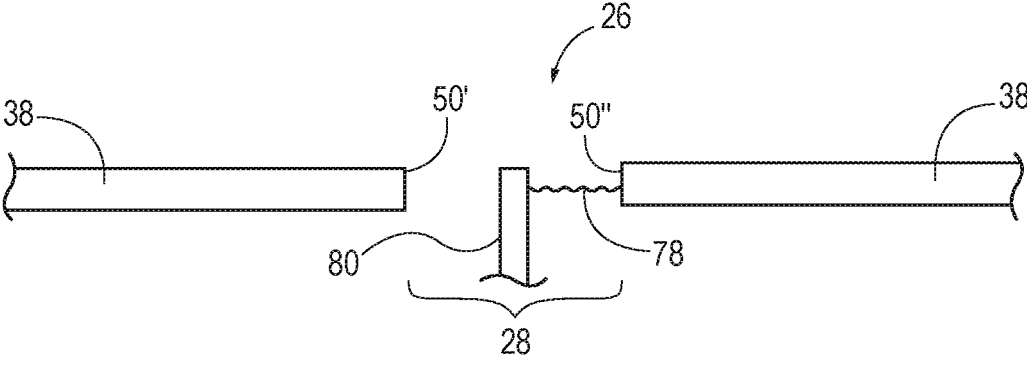
FIG. 14 is a schematic representation of metal deposition between two fiber ends, extending partially across a node that includes a pin.

Some examples of neuromorphic architectures 10 or neuromorphic actuators 70 may include a plurality of pins 80, with each respective pin 80 being positioned within a respective node 26. For example, FIG. 14 schematically illustrates pin 80 positioned within node 26 between fiber ends 50' and 50". Pins 80 may serve to facilitate growth of metal deposits 78 across node 26. For example, FIG. 14 illustrates metal deposit 78 growing from fiber end 50" towards pin 80. Additional metal deposits may continue to grow from pin 80 towards fiber end 50' as more current flows through fiber 38. In some examples, pins 80 are configured such that metal ions are deposited on pin 80 in a respective node 26 (from electrochemical fluid 30) when current flows through the respective node 26.

Figure 15:
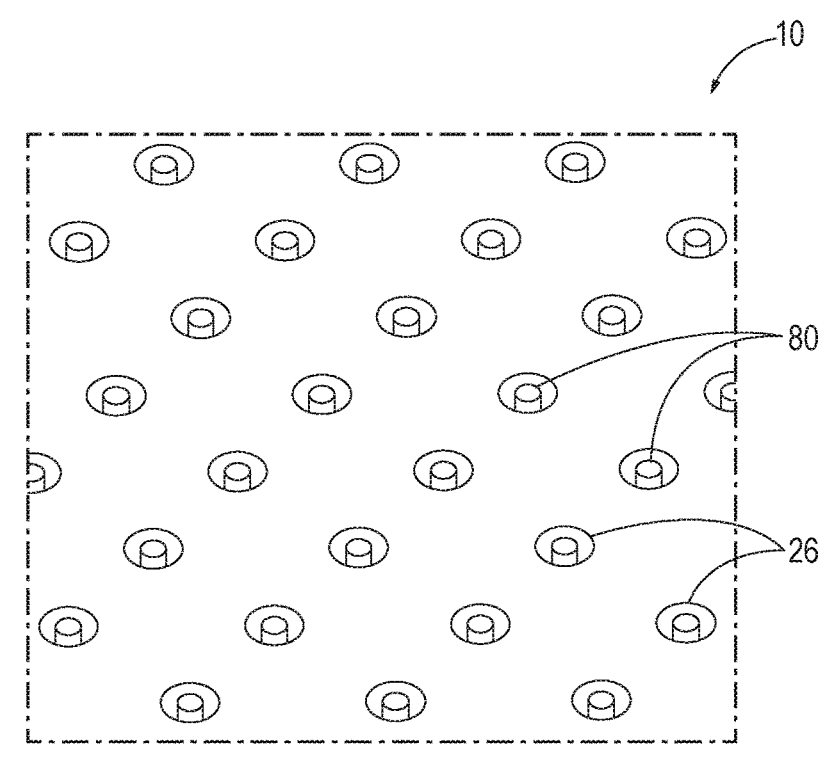
FIG. 15 is a perspective view of a plurality of distributed nodes of an example of a neuromorphic architecture, having a pin positioned within each node.
Figure 16:
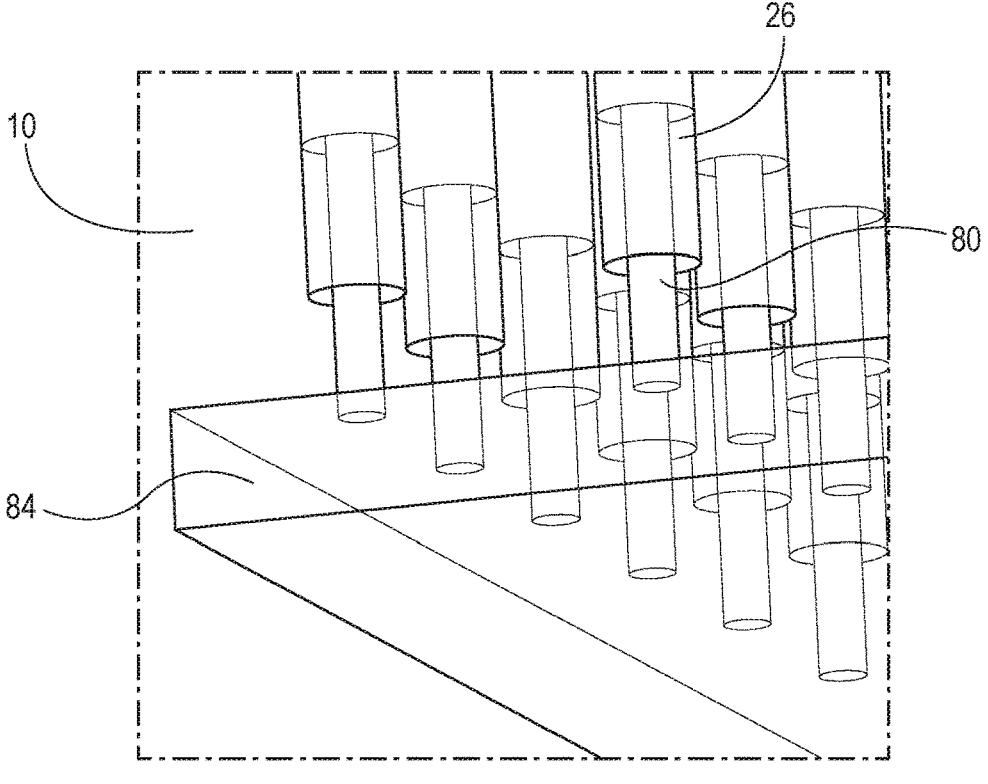
FIG. 16 is a perspective view of a plurality of distributed nodes of an example of a neuromorphic architecture, having a pin positioned within each node, where the pins are commonly coupled to a grounding plate.
Figure 17:
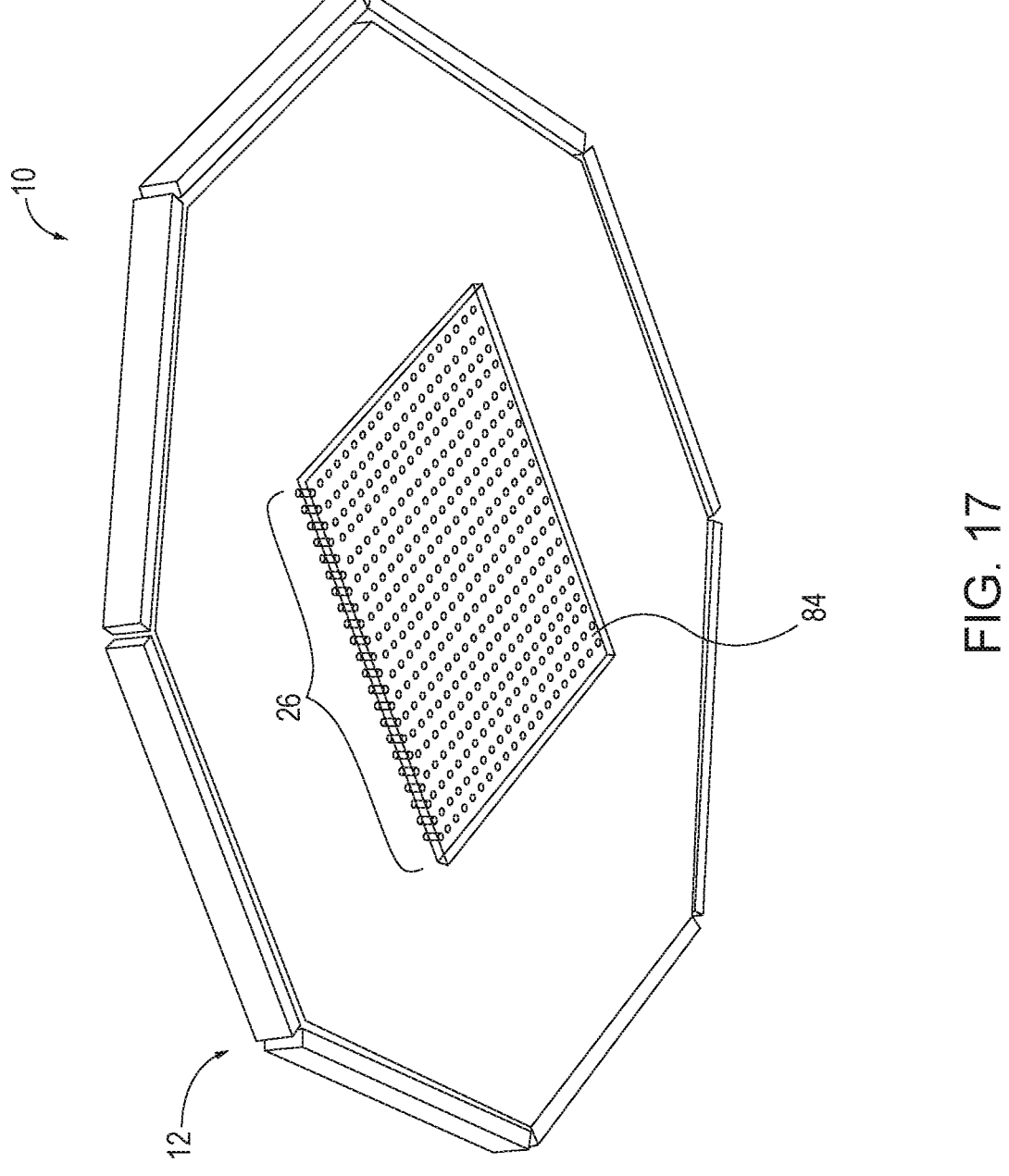
FIG. 17 is a perspective view of an example of an octagonal neuromorphic architecture.

In other words, pins 80 may be electrically conductive. FIG. 15 shows a portion of an example of neuromorphic architecture 10 with a respective pin 80 positioned within each respective node 26. In some examples, only a portion of nodes 26 within a given neuromorphic architecture 10 may include a respective pin 80, whereas in other examples, each node 26 may include a respective pin 80. Additionally or alternatively, some or all of pins 80 may be commonly grounded, as schematically shown in FIG. 16, where pins 80 extending through nodes 26 are electrically coupled to a common grounded back plate 84, effectively grounding pins 80. FIG. 17 illustrates an example of an octagonal neuromorphic architecture 10 that includes common grounded back plate 84 coupled to pins 80 extending through each node 26 of an array of nodes 26.

Figure 18:
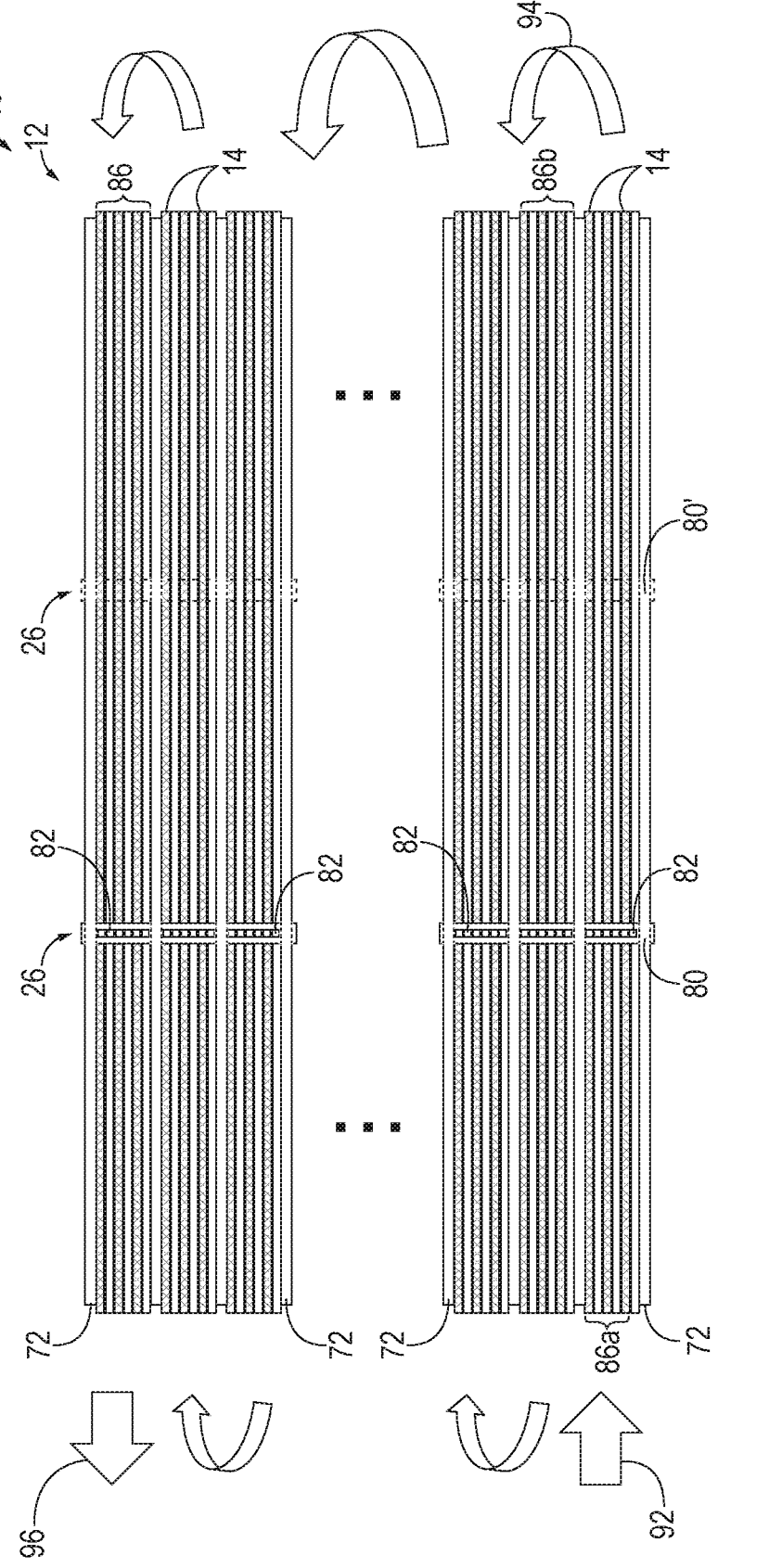
FIG. 18 is a schematic, cross-sectional representation of a neuromorphic architecture, illustrating recycling of a current through various layers of the laminate.

In some examples, pins 80 may extend longitudinally through the entire node 26. In other examples, one or more pins 80 may be segmented such that each pin 80 comprises a plurality of segments 82, as schematically represented in FIG. 18. FIG. 18 illustrates an example of neuromorphic architecture 10 formed of layers 14 making up laminate 12, with a plurality of dielectric insulation layers 72 insulating respective groups of layers 14 from each other. FIG. 18 illustrates an example of pin 80 being segmented into a plurality of segments 82. Each segment 82 may be electrically insulated from each of the other segments 82, such as shown with respect to pin 80. Additionally or alternatively, one or more pins 80 (e.g., pin 80') may extend longitudinally through node 26 without being segmented, as indicated on the right side of FIG. 18. In some examples, each respective segment 82 may correspond to a different respective layer 14 of laminate 12. In some examples, each respective segment 82 may correspond to a different respective group 86 of layers 14 of laminate 12. Segments 82 of pin 80 may be isolated floating nodal pins within each portion of node 26, in some examples.

FIG. 18 also schematically illustrates increasing the effective number of nodes 26 in a given neuromorphic architecture 10 by passing electrical current through laminate 12 multiple times. For example, if nodes 26 are arranged in an array along a width 88 and a length 90 (FIG. 7), the total number of nodes 26 may be calculated by multiplying the number of nodes 26 along width 88 by the number of nodes 26 along length 90. As shown in FIG. 18, however, the total number of nodes 26 may be further increased by multiplying this total by the number of groups 86 of layers 14 stacked together to form laminate 12, due to dielectric insulation layers 72 positioned between each group 86 (and assuming that pins 80 are segmented as described above). For example, an input pattern or current may be fed into neuromorphic architecture 10 at a first group 86a of layers 14, as indicated by arrow 92. The output from first group 86a may be fed into a second group 86b of layers 14, as indicated by arrow 94. Such recycling of the signal through laminate 12 may continue through each respective group 86 of layers 14 separated by a respective dielectric insulation layer 72, until an output signal is created at the last group 86 of layers 14, as indicated by arrow 96. This output may again be fed into neuromorphic architecture 10 a plurality of times, in some examples. In some examples, this feedback loop, or recycling of the signal, may be performed in different directions through laminate 12 and/or through different layers 14 or sublayers of laminate 12. This arrangement may increase the potential complexity of processing that neuromorphic architecture 10 is capable of performing, by effectively increasing the number of nodes 26. Each group 86 of layers 14 may be said to be a distinct laminate 12, such that neuromorphic architecture 10 may be said to include a plurality of laminates 12, with one dielectric insulation layer 72 positioned between each adjacent pair of laminates 12. Again, in this manner, neuromorphic architecture 10 may be configured for increased node density by virtue of each node 26 comprising multiple segments due to placement of dielectric insulation layers 72 intersecting each node 26 and effectively electrically isolating each respective laminate 12 from adjacent respective laminates 12.

Disclosed neuromorphic architectures 10 and/or neuromorphic actuators 70 may be integrated into and/or used to form many different structures or vehicles, such as aircraft, spacecraft, military vehicles and other applications, autonomous vehicles, ocean and marine vehicles or structures, and/or human-enhancing limbs or suits. Said neuromorphic architectures 10 and/or neuromorphic actuators 70 may be used to perform local processing tasks, control a surface contour and/or vary geometry of a structure, perform image recognition, control an autonomous vehicle, perform motion detection (e.g., force sensing), and/or control movements of an aircraft or other flying vehicle. Importantly, such processing and image recognition tasks are performed via hardware (e.g., neuromorphic architecture 10), rather than via software being run on a computing device. Laminates 12 may be scaled up or down to different desired sizes, and may have an area on the order of square inches, on the order of tens of square inches, or on the order of hundreds of square inches. In a specific example, laminate 12 may have dimensions of about 10 inches by 10 inches, and include at least 100 layers 14.

In some examples, neuromorphic architectures 10 and/or neuromorphic actuators 70 may be used to form a variable aero-surface of an aircraft or flying device (or other structure or vehicle), where the neural network hardware of neuromorphic architecture 10 may be configured to alter the shape of the variable aero-surface, thereby affecting and changing the aerodynamic properties, flight path, and etc., of the vehicle. As described herein, this neural network (i.e., neuromorphic architecture 10 and/or neuromorphic actuator 70) may be embedded in an aircraft or other structure or vehicle to provide distributed analog processing based on the conductivity properties of the materials used in forming the aircraft (e.g., carbon fiber composite materials). Neuromorphic architecture 10 and/or neuromorphic actuator 70 may be configured to provide feedback control via the matrix of distributed nodes 26, and thereby to shape or contour the aero-surface via SMA layers coupled to the grid of neuromorphic architecture 10. Conventional variable aero-surfaces are generally controlled by a central processing architecture, the bus line of which typically limits the functional capabilities and increases the vulnerability of such systems. Presently disclosed neuromorphic architectures 10 and neuromorphic actuators 70 effectively decentralize the processing unit to the plurality of distributed nodes 26, which may increase robustness and functionality, as compared to conventional central processing units.

Methods according to the present disclosure will be discussed with reference to additional schematic figures and flowcharts in FIGS. 19, 22, 25, and 31 that represent illustrative, non-exclusive examples of methods according to the present disclosure. In FIGS. 19, 22, 25, and 31, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIGS. 19, 22, 25, and 31 are not limiting and other methods and steps are within the scope of the present disclosure, including methods having greater than or fewer than the number of steps illustrated, as understood from the discussions herein.

Figure 19:
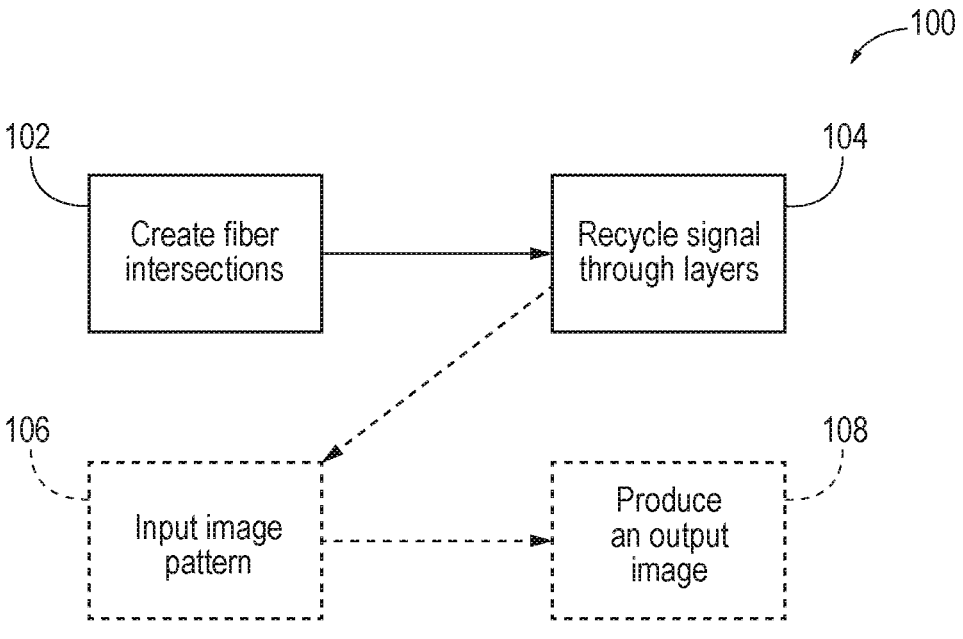
FIG. 19 is a schematic, flowchart diagram illustrating methods according to the present disclosure.

FIG. 19 illustrates methods 100 of performing local, hardware-based processing via a neuromorphic architecture (e.g., neuromorphic architecture 10). Methods 100 include creating intersections of fibers modulated by residual memory created by electroplating at the intersections (e.g., metal deposits 78 on fibers 38), at 102, and recycling signals among a plurality of groups of layers of a laminate (e.g., groups 86 of laminate 12) of the neuromorphic architecture, at 104. Recycling signals at 104 may include recycling signals along at least four different signal paths through the neuromorphic architecture. Recycling signals at 104 may include feeding an output signal from a first layer (or group of layers) of the laminate into a second layer (or second group of layers) of the laminate. In methods 100, the intersections have a complexity sufficient to perform as a neural network, such that each intersection is configured to serve as a plurality of different connection points within the neuromorphic architecture.

Figure 20:
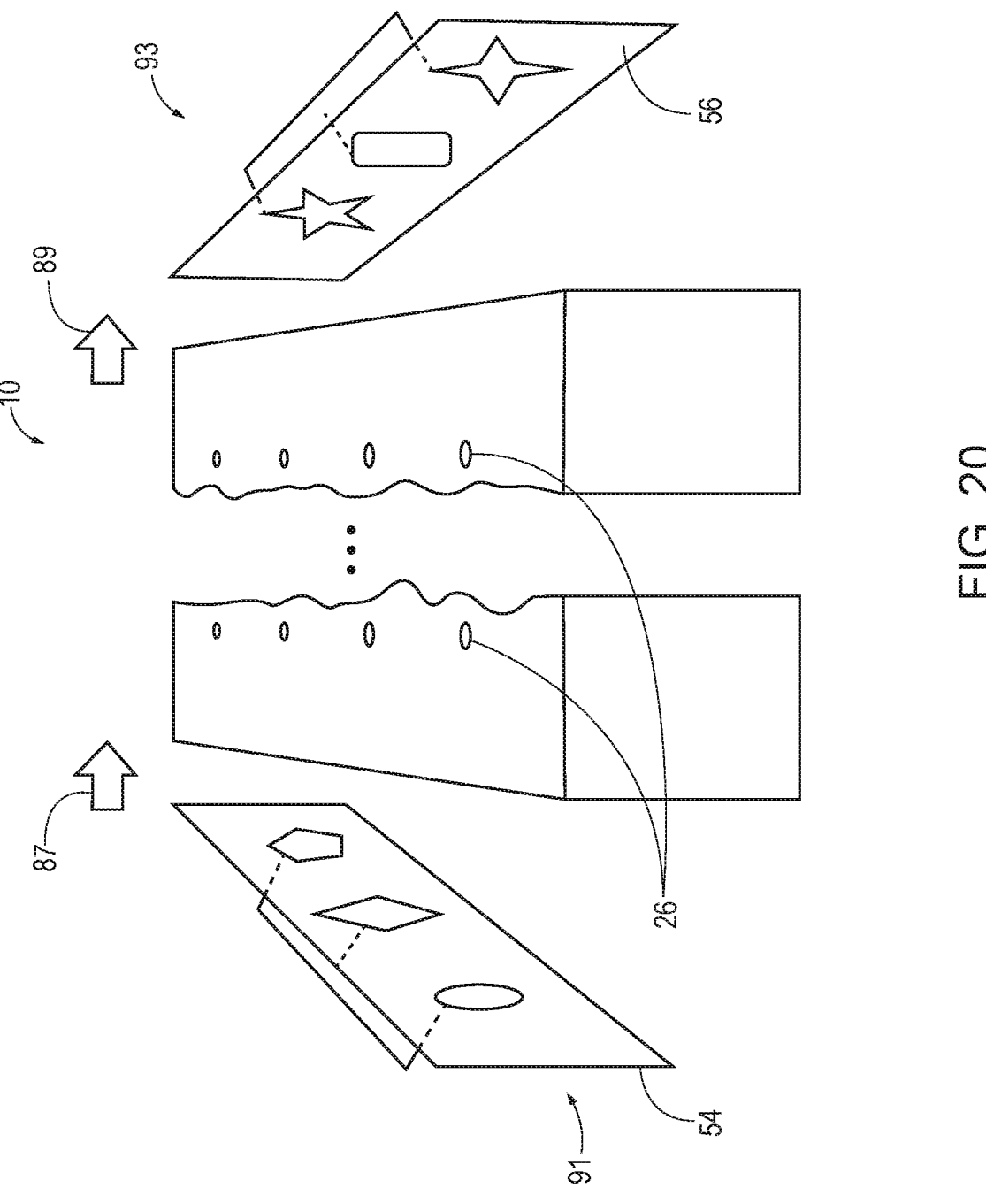
FIG. 20 is a schematic representation of a feed-forward training scheme for disclosed neuromorphic architectures.
Figure 21:
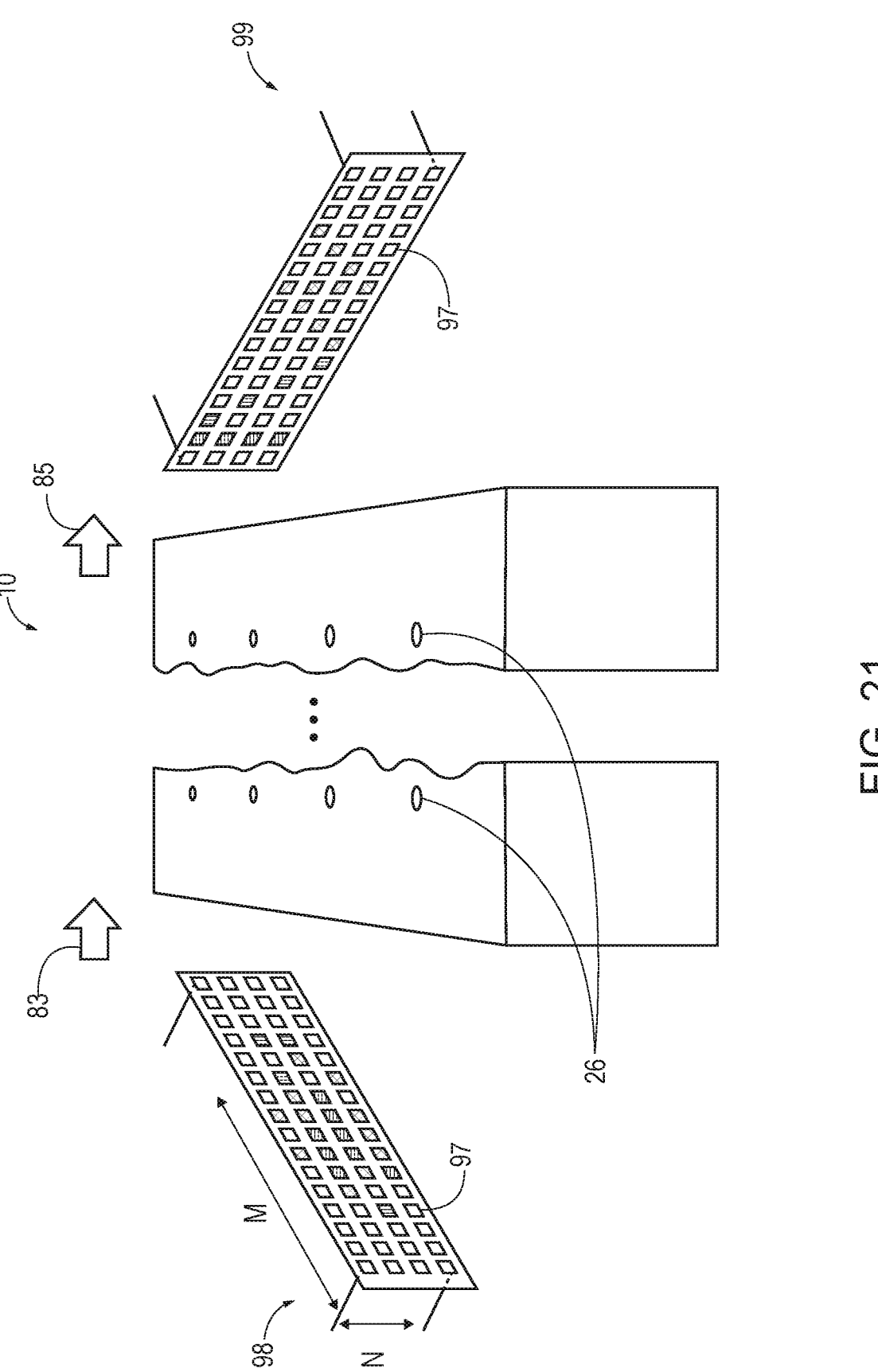
FIG. 21 is a schematic representation of a computer-controlled feed-forward training scheme for disclosed neuromorphic architectures.

Some methods 100 may include performing image recognition. For example, methods 100 may include inputting an image pattern to the neuromorphic architecture at 106 and training the neuromorphic architecture to produce an output image in response to the image pattern input to the neuromorphic architecture, at 108. For example, FIG. 20 schematically illustrates an input image pattern 91 and an output image pattern 93, each of which may be computer controlled. In other words, the input image pattern may be formed by a pattern of input current fed into neuromorphic architecture 10, while the output image pattern 93 is also dictated. For simplicity, only a portion of neuromorphic architecture 10 is represented in FIG. 20—any number of nodes 26 may be included between the two portions of neuromorphic architecture 10 illustrated. Input image pattern 91 may be fed into neuromorphic architecture 10, as indicated by arrow 87, such as via neural input interface 54. Similarly, output image pattern 93 may be output from neuromorphic architecture 10, as indicated by arrow 89, such as via neural output interface 56. In this manner, neuromorphic architecture 10 may be trained according to a feed-forward scheme to produce output image pattern 93 based on input image pattern 91, by forming connections via the nodes of the neuromorphic architecture. Once the neuromorphic architecture is trained, it may be configured to detect and/or recognize whether a different current input (e.g., a different input image pattern) matches a desired input image. FIG. 21 illustrates this concept similarly, using a computer controlled contact matrix input 98 that is fed into neuromorphic architecture 10 as indicated by arrow 83, and a computer controlled contact matrix output 99 that is output from neuromorphic architecture 10 as indicated by arrow 85. Each of matrix input 98 and matrix output 99 may include a plurality of contact pads 97 (e.g., M×N contact pads 97, as indicated in FIG. 21), each of which may be a micro-pad electrical connection that connects to a bundle of fibers of one or more layers of neuromorphic architecture 10. Different currents may be input or output at different contact pads 97 according to the desired pattern, as represented by the different illustrated texture patterns of contact pads 97.

Figure 22:
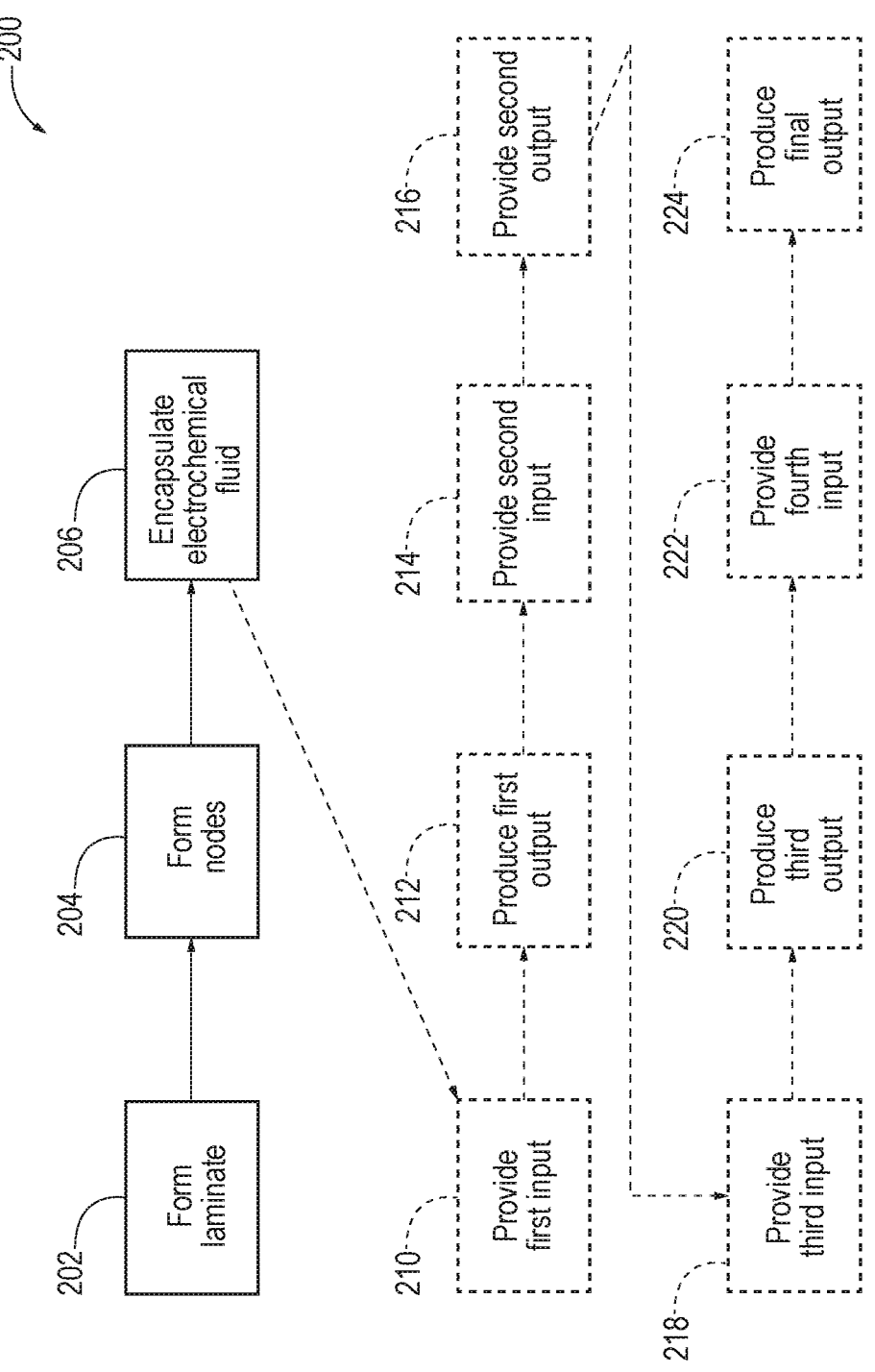
FIG. 22 is a schematic, flowchart diagram illustrating methods of forming disclosed neuromorphic architectures and/or neuromorphic actuators.

FIG. 22 represents methods 200 of forming a neuromorphic architecture such as neuromorphic architecture 10. Methods 200 include forming a laminate of a plurality of layers of unidirectional fiber material at 202, forming a plurality of distributed nodes through the laminate at 204, and encapsulating an electrochemical fluid with respect to the laminate and the plurality of distributed nodes such that the electrochemical fluid is free to flow about the laminate and into the voids, at 206. In forming the laminate at 202, a respective orientation of the unidirectional fibers of each respective layer of the plurality of layers is generally different from each other respective orientation of the unidirectional fibers of each other adjacent layer of the laminate (as discussed, for example, in connection with FIG. 4). Forming the plurality of distributed nodes through the laminate at 204 includes forming voids that extend transversely from an upper surface of the laminate to a lower surface of the laminate. For example, forming the nodes at 204 may include forming a plurality of micro-holes through the laminate, such as by drilling a plurality of holes through the laminate, forming the plurality of holes through the laminate via waterjet cutting, and/or forming the plurality of holes through the laminate via laser jet cutting. In some examples, forming the nodes at 204 includes forming a plurality of micro-holes arranged in an array. Additionally or alternatively, forming the nodes at 204 may include forming at least 10 distributed nodes, at least 100 distributed nodes, at least 1,000 distributed nodes, and/or at least 10,000 distributed nodes. Similarly, forming the nodes at 204 may include forming nodes at a particular density, such as at least 10 nodes per square centimeter, at least 100 nodes per square centimeter, and/or at least 1,000 nodes per square centimeter. In some methods 200, forming nodes at 204 includes maximizing the density of the nodes distributed throughout the laminate.

Figure 23:
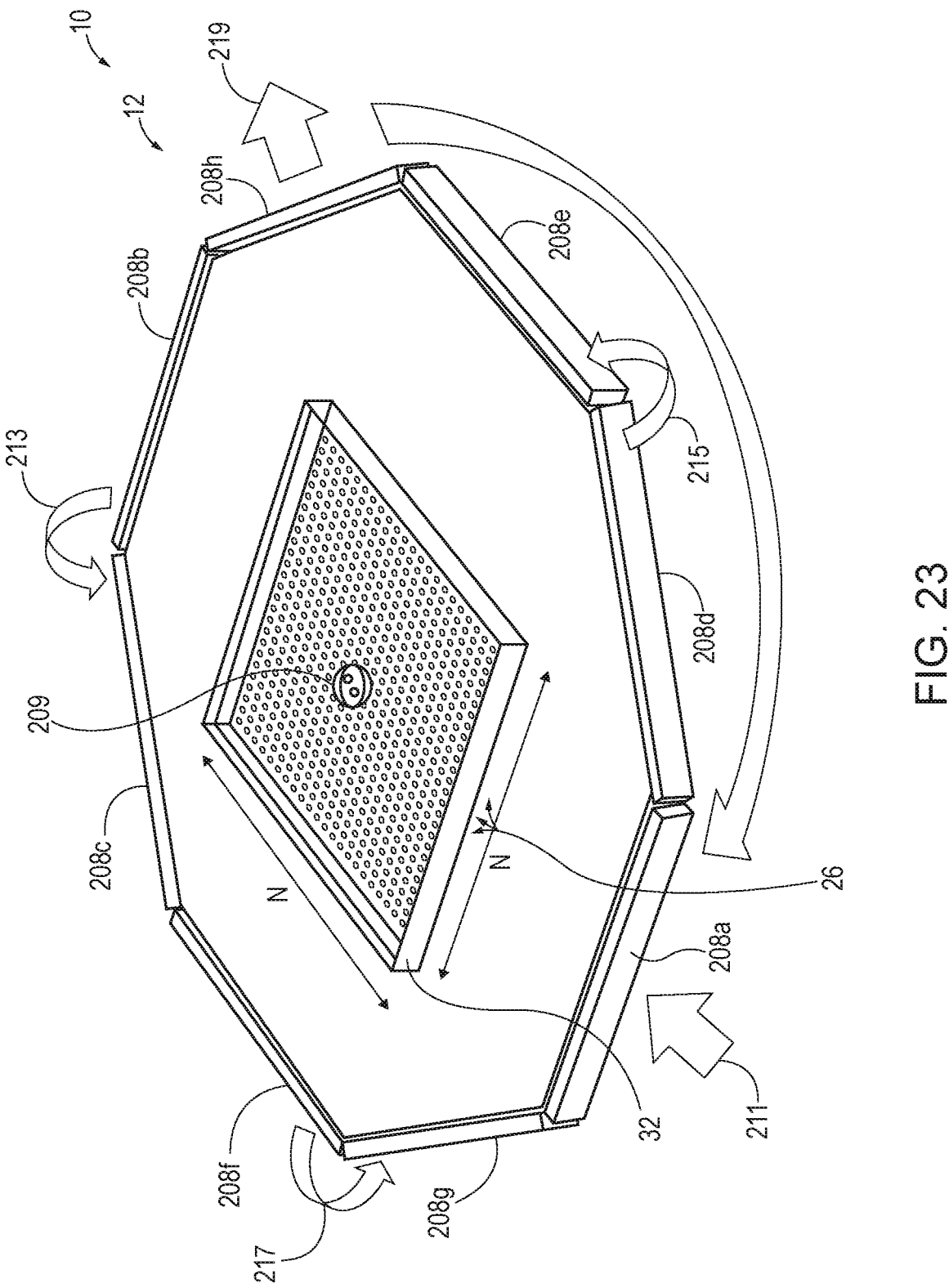
FIG. 23 is a perspective view of an example of a neuromorphic architecture, illustrating an example of signal recycling.

In some methods 200, forming the laminate at 202 includes stacking each respective layer of the laminate in a respective specific orientation with respect to orientations of the adjacent layers of the laminate. In one example, forming the laminate at 202 includes forming or cutting the laminate into an octagon shape (such as shown in FIG. 23). In such examples, and with reference to FIG. 23, the octagonal laminate 12 may have eight interface edges 208, with each respective interface edge 208 being arranged at a 45 degree angle with respect to each adjacent interface edge 208. With reference to FIGS. 22 and 23, methods 200 may further include providing a first input at 210 to a first interface edge 208 (e.g., first input indicated by arrow 211 at interface edge 208a) and producing (via the neuromorphic architecture) a first output at a second interface edge (e.g., first output indicated by arrow 213 at interface edge 208b), at 212, with the second interface edge being opposite the first interface edge, as shown in FIG. 23. Due to the octagonal shape of laminate 12 in FIG. 23, first and second interface edges 208a, 208b are at least substantially parallel, though other arrangements may be provided in various examples within the scope of the present disclosure. Also as shown in FIG. 23, neuromorphic architecture 10 may include a reservoir inlet 209 which may serve to allow for electrochemical fluid to be inserted into the encapsulant, and which may be sealed to encase the electrochemical fluid within the encapsulant.

Methods 200 may further include providing the first output as a second input to a third interface edge, at 214. For example, as shown in FIG. 23, the first output (arrow 213) may be fed into interface edge 208c, with interface edge 208c being rotated 45 degrees with respect to interface edge 208b. Put another way, interface edge 208c may be arranged at a 45 degree angle with respect to interface edge 208b. Put yet another way, interface edge 208c may form a 135 degree angle with interface edge 208b. Methods 200 may further include producing (via the neuromorphic architecture) a second output at a fourth interface edge, at 216. For example, a second output may be produced at interface edge 208d, as indicated by arrow 215, with interface edge 208d being opposite from and at least substantially parallel to interface edge 208c. Similarly, and also as indicated by arrow 215 in FIG. 23, the second output may be provided to a fifth interface edge 208e as a third input, at 218, with interface edge 208e being arranged at a 45 degree angle with respect to interface edge 208d. A third output may be produced via the neuromorphic architecture at 220, such as the third output indicated by arrow 217 at interface edge 208f (i.e., the sixth interface edge 208), which is generally opposite from and at least substantially parallel to interface edge 208e. Even further, methods 200 may include providing a fourth input at 222, such as by providing the third output from interface edge 208f as a fourth input to interface edge 208g, as indicated by arrow 217. Again, interface edge 208g may be arranged at a 45 degree angle with respect to adjacent interface edge 208f. Finally, methods 200 may include producing a final output (indicated by arrow 219 in FIG. 23), at 224, at an eight interface edge of the laminate (e.g., interface edge 208$h$, which is generally opposite from and at least substantially parallel to interface edge 208$g$.

Figure 24:
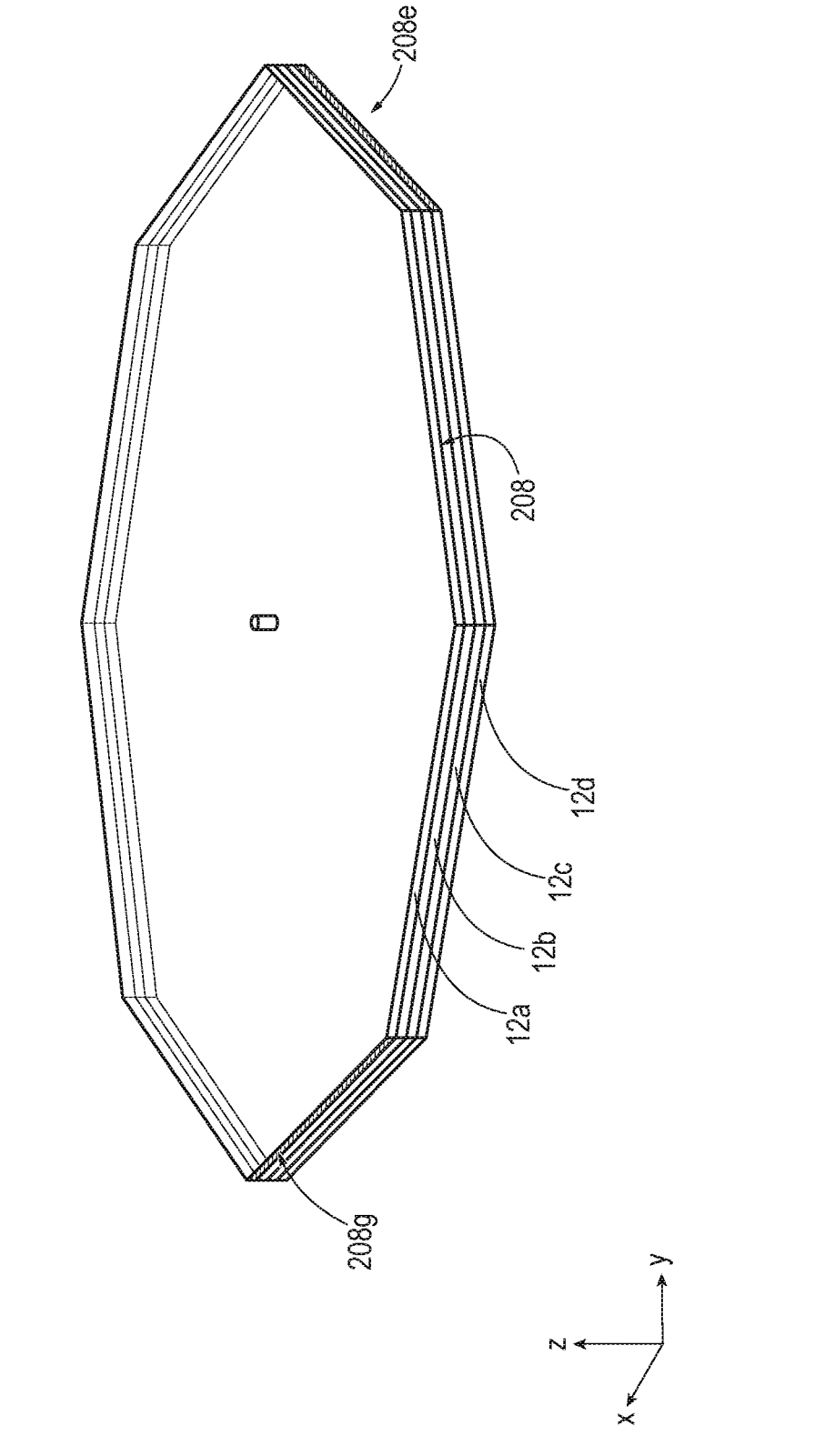
FIG. 24 is a perspective view of an example of a neuromorphic architecture, illustrating input and output occurring at different layers of the laminate.

In some specific methods 200, providing inputs to various interface edges of the laminate may include providing such inputs to different layers, different groups of layers, or different laminates of a plurality of laminates of the neuromorphic architecture. For example, providing the first input to the first interface edge at 210 may include providing the first input to a first layer of the laminate at the first interface edge. Alternatively, providing the first input to the first interface edge at 210 may include providing the first input to a first group of layers, or a first laminate of the neuromorphic architecture, such as at interface edge 208$a$. Similarly, providing the second input to the third interface edge at 214 may include providing the second input to a second layer (or group of layers, or second laminate) of neuromorphic architecture 10 at third interface edge 208$c$. Similarly, providing the third input to the fifth interface edge at 218 may include providing the third input to a third layer (or group of layers, or third laminate) of neuromorphic architecture 10 at fifth interface edge 208$e$. Similarly, providing the fourth input to the seventh interface edge at 222 may include providing the fourth input to a fourth layer (or group of layers, or fourth laminate) of neuromorphic architecture 10 at seventh interface edge 208$g$. For example, FIG. 24 shows a simplified octagonal neuromorphic architecture 10 for illustrative purposes, formed of four laminates 12$a$, 12$b$, 12$c$, and 12$d$ stacked together, with the laminates 12 being electrically isolated from each other via respective dielectric insulation layers positioned between each adjacent pair of laminates 12. For example, while not shown in FIG. 24, there may be a first dielectric insulation layer between laminates 12$a$ and 12$b$, a second dielectric insulation layer between laminates 12$b$ and 12$c$, and a third dielectric insulation layer between laminates 12$c$ and 12$d$. Input or output at various interface edges 208 may occur at various different layers or laminates. For example, input or output at interface edge 208$g$ may occur via laminate 12$b$, while input or output at interface edge 208 may occur via laminate 12$d$.

Figure 25:
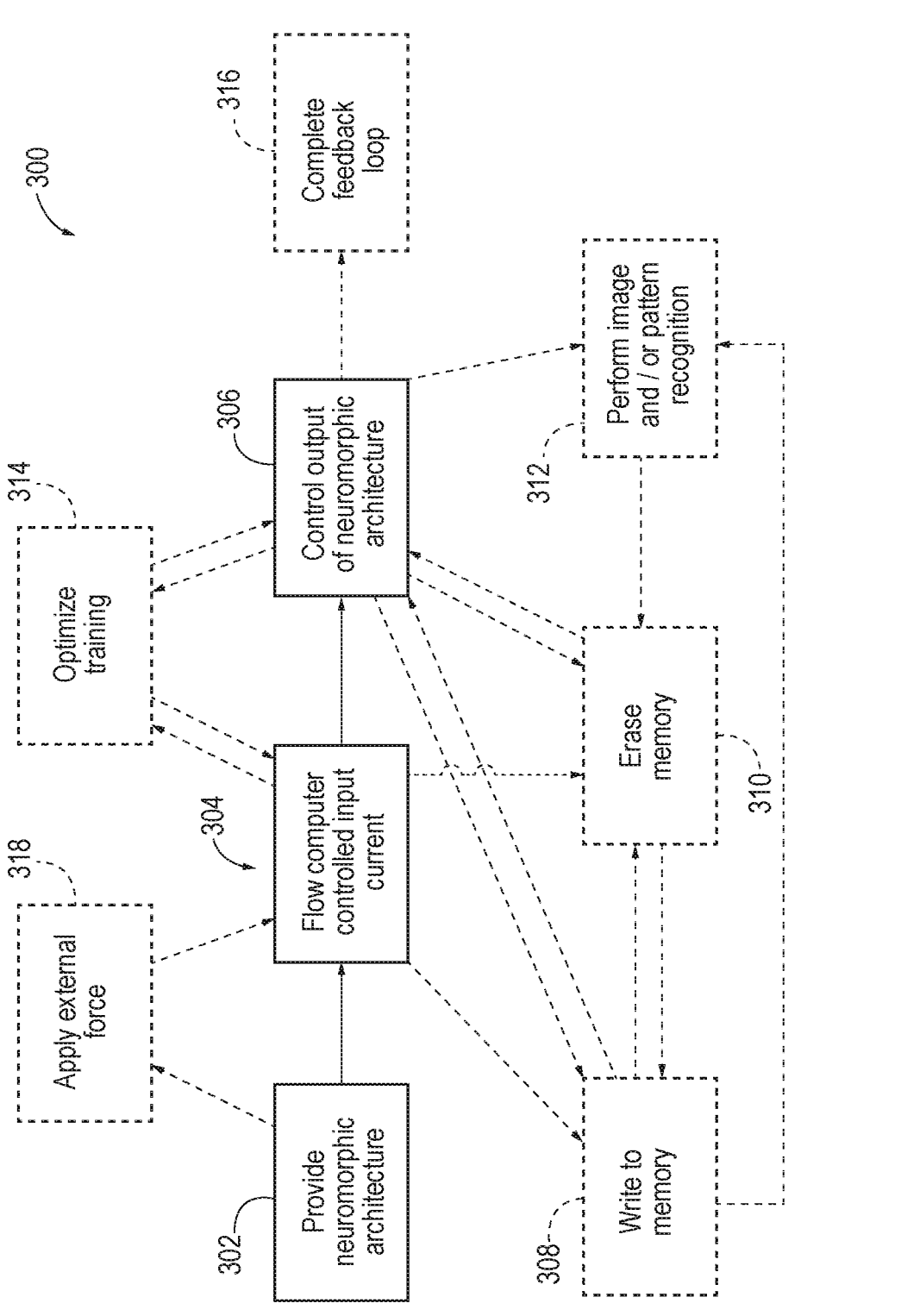
FIG. 25 is a schematic, flowchart diagram illustrating methods of training disclosed neuromorphic architectures and neuromorphic actuators.
Figures 26, 27, 28, 29:
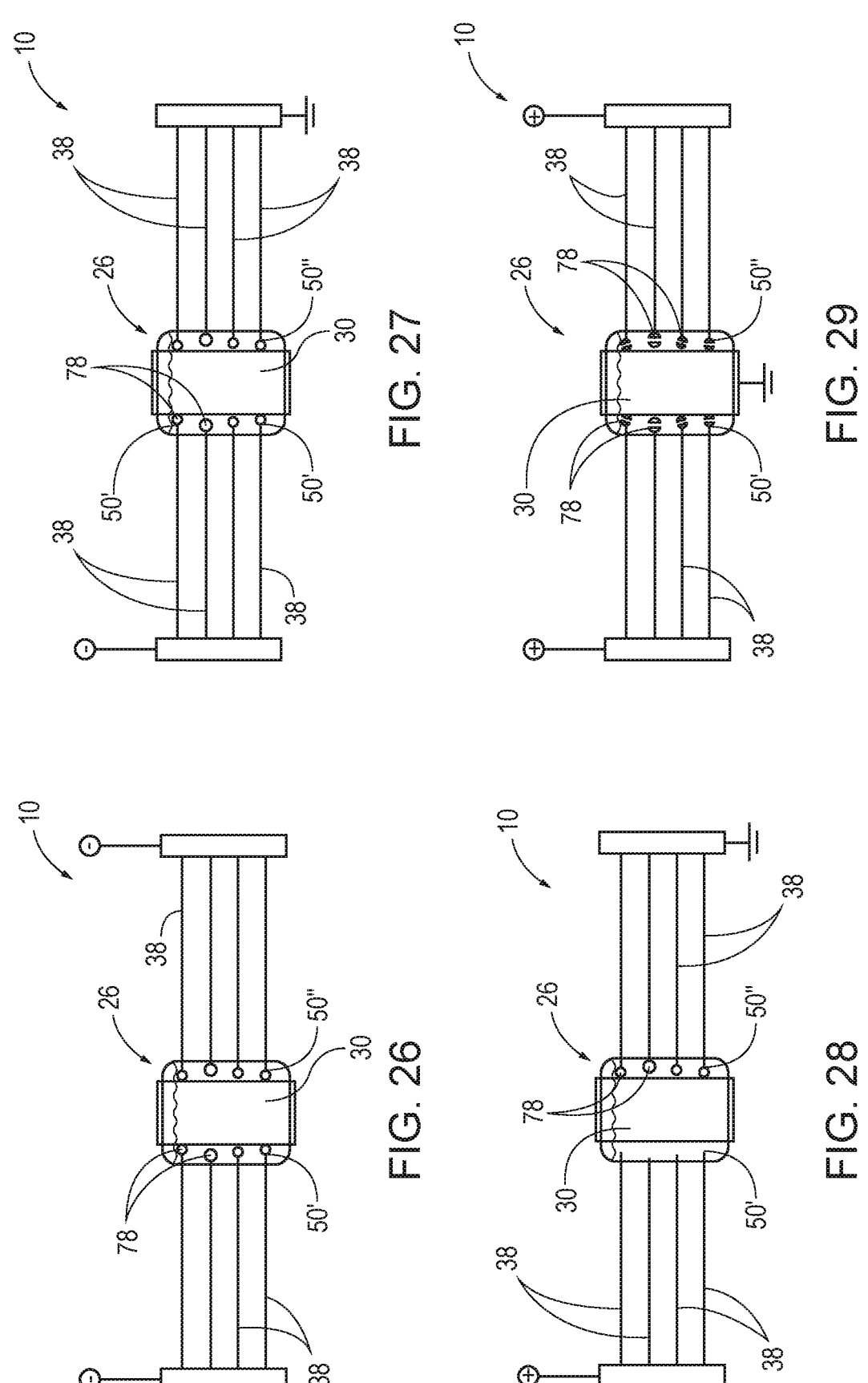
FIG. 26 is a schematic representation of an example of symmetric memory writing at a node of a neuromorphic architecture or neuromorphic actuator.
FIG. 27 is a schematic representation of an example of asymmetric memory writing and erasing at a node of a neuromorphic architecture or neuromorphic actuator.
FIG. 28 is a schematic representation of another example of symmetric memory writing and erasing at a node of a neuromorphic architecture or neuromorphic actuator.
FIG. 29 is a schematic representation of an example of symmetric memory erasing at a node of a neuromorphic architecture or neuromorphic actuator.

FIG. 25 schematically represents methods 300 of training a neuromorphic architecture (e.g., neuromorphic architecture 10), with said training methods 300 being supervised training (e.g., via preset weights) and/or unsupervised training (e.g., via an optimization-based scheme, such as conjugate gradients). Methods 300 include providing the neuromorphic architecture at 302, flowing a computer-controlled input current through the electrochemical fluid in a predetermined pattern relative to the laminate at 304, and controlling an output of the neuromorphic architecture at 306, thereby creating corresponding connections within some of the plurality of distributed nodes, such that the neuromorphic architecture is trained via a feed-forward scheme. Methods 300 also may include writing to a memory of the neuromorphic architecture, at 308, and/or erasing memory, at 310. For example, writing to the memory at 308 may be performed via a symmetric configuration, such that fiber ends of both sides of a respective node experience metal deposition of ions from the electrochemical fluid, an example of which is schematically illustrated in FIG. 26. In FIG. 26, fiber ends 50 are exposed to an electrical charge on each side of node 26, such that metal deposits 78 are deposited on fiber ends 50' of fibers 38 on one side of node 26, and also on fiber ends 50" on the other side of node 26. The metal deposition on fiber ends 50 effectively serves as a memory because the amount of metal deposits 78 deposited on fibers 38 is proportional to the amount of current that has passed through node 26.

Additionally or alternatively, writing to memory at 308 may be performed via an asymmetric configuration, such that metal is deposited at fiber ends on a first side of a respective node, but metal substantially is not deposited at fiber ends on a second side of the respective node, an example of which is schematically illustrated in FIG. 27. In FIG. 27, fibers 38 on one side of node 26 are grounded, while fibers 38 on the other side of node 26 experience an electrical charge, such that metal ions are deposited on fiber ends 50' on one side of node 26 only. In this configuration, it may be said that the memory of neuromorphic architecture 10 is being written to at fiber ends 50', while memory may be being erased at fiber ends 50" due to metal either not being deposited on fiber ends 50" and/or previously deposited metal at fiber ends 50" being dissolved by reversing the polarity. In this sense, the configuration of FIG. 27 may be said to be asymmetric, because metal deposits 78 are being deposited on one side of node 26, but not on the other, and thus illustrates an example of erasing memory at 310 asymmetrically, again because in this configuration, metal may be dissolved at fiber ends 50" on a first side of a respective node 26, but metal deposits 78 are substantially not dissolved at fiber ends 50' on a second side of the respective node 26. Similarly, FIG. 28 schematically illustrates an alternative asymmetric configuration for writing to memory at 308 and/or erasing memory at 310. In FIG. 28, fiber ends 50" on one side of node 26 are experiencing growth in metal deposition (e.g., writing to memory), whereas fiber ends 50' on the opposite side of node 26 are experiencing little to no metal deposition and/or erasure of memory by dissolving existing metal depositions.

In some examples, erasing memory at 310 may be performed in a symmetric configuration, an example of which is shown in FIG. 29. As shown in FIG. 29, fiber ends 50' and fiber ends 50" on both sides of node 26 may experience dissolution of previously deposited metal deposits 78.

Figure 34:
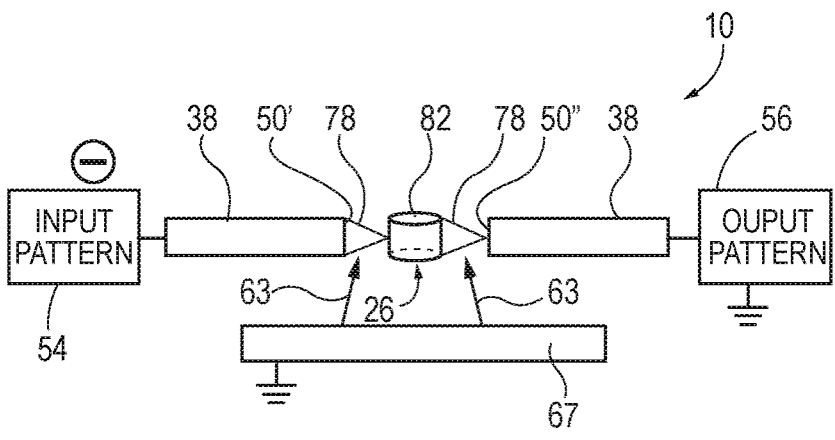
FIG. 34 is a schematic representation of an example of asymmetrically writing to memory to train a neuromorphic architecture.

Examples of these processes are illustrated another way in FIGS. 34-37. FIG. 34 schematically represents an example of writing to memory at 308, in the form of asymmetric writing to train a neuromorphic architecture. In FIG. 34, a negatively charged input pattern may be provided via neural input interface 54, which may cause metal deposit 78 to grow form fiber end 50' towards pin segment 82, and then followed by further growth of metal deposit 78 from pin segment 82 towards fiber end 50" on the opposite side of node 26. In this example, an output pattern may be provided by the user as a digital input matrix or an analog surface pattern, via neural output interface 56. Metallic plate 67 may provide metal ions for growth of metal deposits 78, as indicated by arrows 63. Asymmetric pattern reading and/or processing also may be performed using a similar configuration as shown in FIG. 34.

Figure 35:
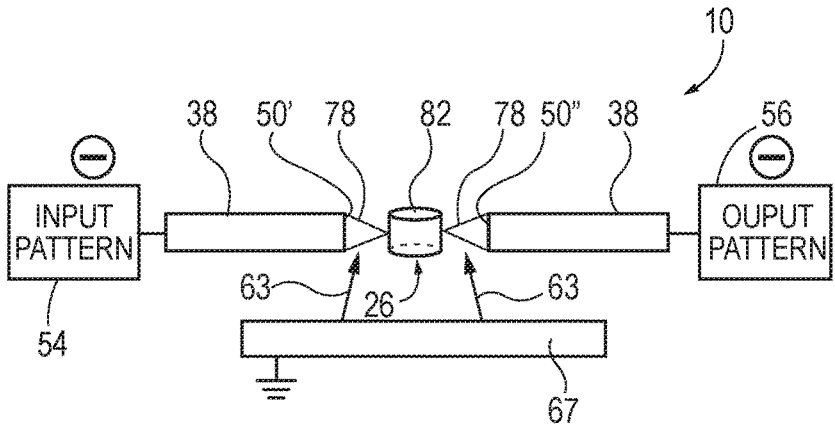
FIG. 35 is a schematic representation of an example of symmetrically writing to memory to train a neuromorphic architecture.

FIG. 35 schematically represents an example of writing to memory at 308, in the form of symmetric writing to train a neuromorphic architecture. In FIG. 35, a negatively charged input pattern may be provided via neural input interface 54, and a negatively charged output pattern may be provided via neural output interface 56, which may cause simultaneous metal deposit 78 growth form fiber end 50' and from fiber end 50", towards pin segment 82. This example illustrates a way to speed up training of the neuromorphic architecture, though it creates a different neural connectivity pattern than via the technique illustrated in FIG. 34. Again, metallic plate 67 may provide metal ions for growth of metal deposits 78, as indicated by arrows 63.

Figure 36:
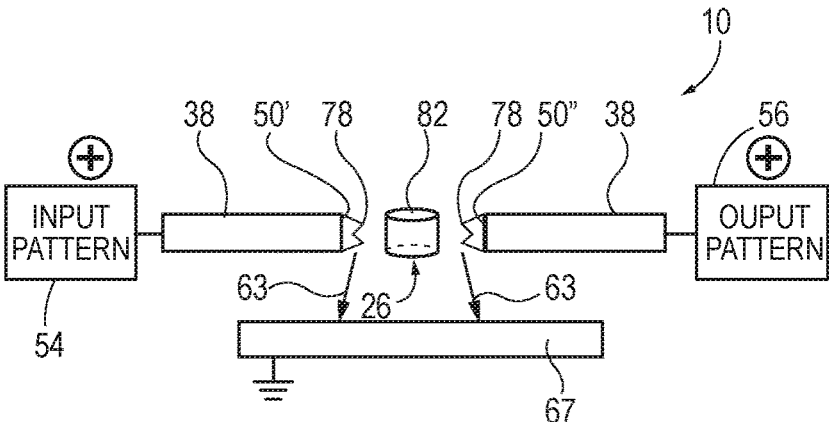
FIG. 36 is a schematic representation of an example of symmetrically erasing memory to reset a neuromorphic architecture.

FIG. 36 schematically represents an example of erasing memory at 310, in the form of symmetric erasing, or resetting a neuromorphic architecture. In FIG. 36, a positively charged input pattern may be provided via neural input interface 54, and a positively charged output pattern may be provided via neural output interface 56, which may cause simultaneous metal deposit 78 dissolution form fiber end 50' and from fiber end 50", away from pin segment 82. The dissolved metal ions released from the metal deposits 78 may be released back into the electrochemical fluid of the neuromorphic architecture, and/or may be plated back onto metallic plate 67, as indicated by arrows 63.

Figure 37:
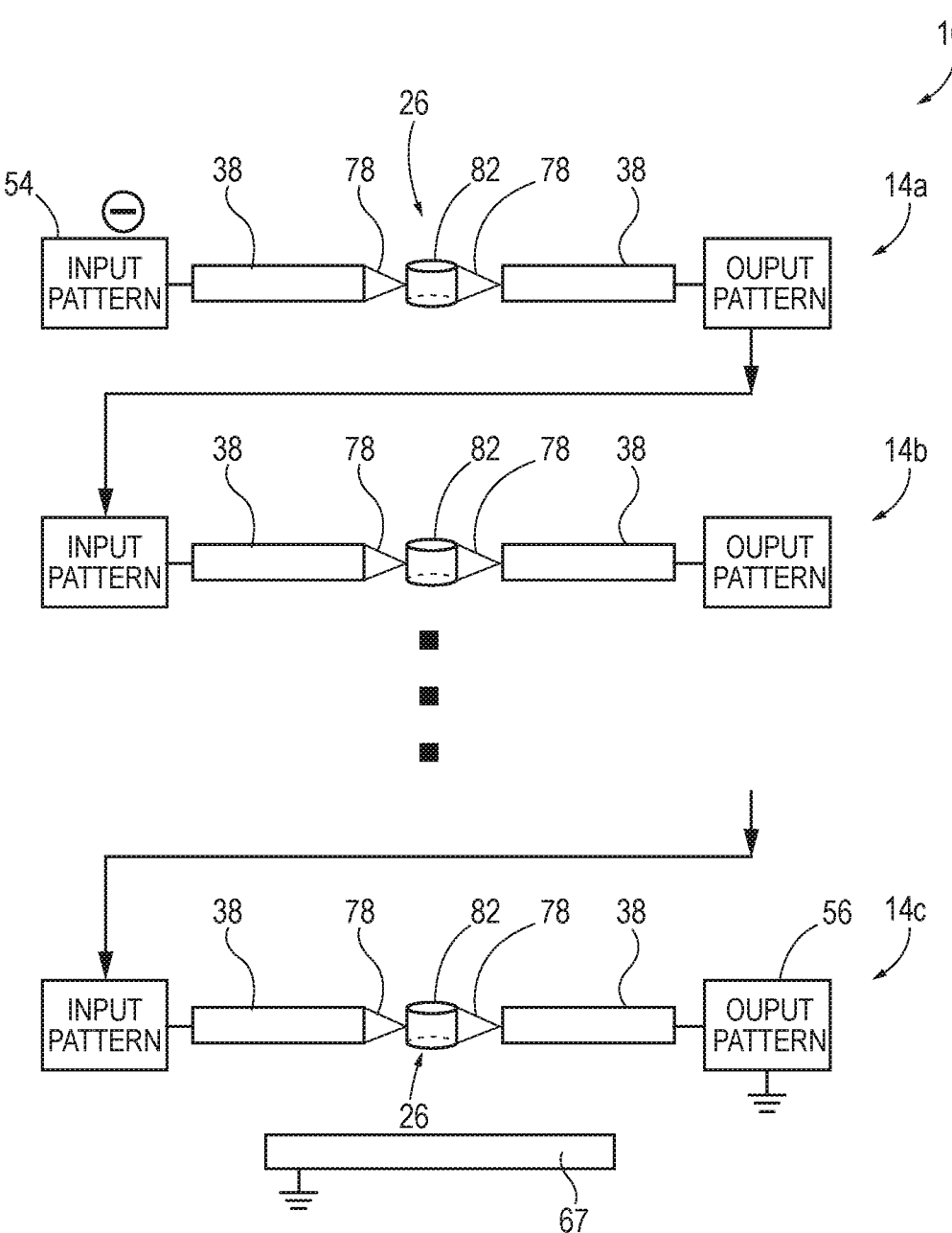
FIG. 37 is a schematic representation of an example of asymmetrically writing to memory to train a neuromorphic architecture via recurrent network.

FIG. 37 schematically represents an example of writing to memory at 308, which is similar to that shown in FIG. 34, but performed using a recurrent network, such as those shown in FIG. 18 or FIG. 23. As indicated in FIG. 37, a negatively charged input pattern may be provided via neural input interface 54, with the output produced at each layer being fed into a different layer of the neuromorphic architecture. For example, the output of layer 14a may be fed into layer 14b as an input, and so on, with the output of the layer preceding layer 14c being fed into layer 14c as an input. Thus, neuromorphic architecture is trained, in this example, with asymmetric Recurrent writing, or training by multiple loops passing through several stacked layers.

With continued reference to FIG. 25, methods 300 also may include performing pattern recognition and/or image recognition, at 312. For example, performing pattern and/or image recognition at 312 may include training the neuromorphic architecture to produce an output pattern in response to an input pattern provided to the neuromorphic architecture and then using the neuromorphic architecture to determine or recognize whether a new input image is the same or similar to the image used during training. Additionally or alternatively, performing pattern and/or image recognition at 312 may include performing pattern recognition which comprises training the neuromorphic architecture to determine whether a first image and a second image are correlated with each other.

Some methods 300 of training the neuromorphic architecture include optimizing training of the neuromorphic architecture at 314, based on load adjustment of conductivity within the plurality of distributed nodes to produce a desired shape-shifting response. For example, in the case of a neuromorphic actuator (e.g., neuromorphic actuator 70) formed of a neuromorphic architecture with shape memory alloy materials on either side of the neuromorphic architecture, the neuromorphic architecture may be trained to produce a desired shape or contour using the shape memory material layers. Additionally or alternatively, training of the neuromorphic architecture may be optimized at 314 based on pre-determined training with modified fiber connectivity. In other words, a network response to a stimulus can be duplicated once nodal fiber connectivity is developed based on the known and prior-developed connectivity. Thus, in some examples, systems may be duplicated without going through the same iterative training, which may be referred to as inheritance learning or memory transfer. In various examples of methods 300 of training the neuromorphic architecture, the neuromorphic architecture may be a fixed system subjected to continuous (analog) training. In other words, the flowing the computer-controlled current at 304 may be a continuous (analog) current. Additionally or alternatively, the neuromorphic architecture may be a programmable system subjected to digital training. In some examples, the flowing the computer-controlled current at 304 includes varying amounts of current fed to selective micro-pads of an interface to the neuromorphic architecture (e.g., neural input interface 54).

Some methods 300 include completing a feedback loop at 316, such as by feeding the output from the neuromorphic architecture back into the neuromorphic architecture as an input. Additionally or alternatively, some methods 300 include applying an external force at 318 to the laminate of the neuromorphic architecture (e.g., laminate 12) to train the neuromorphic architecture. For example, as described in connection with FIG. 11, physically bending the laminate can either bring fiber ends on either side of a given node closer together or farther apart (depending on the direction the laminate is bent via the external applied force), thereby changing the connectivity in the node and training the neuromorphic architecture.

Figure 30:
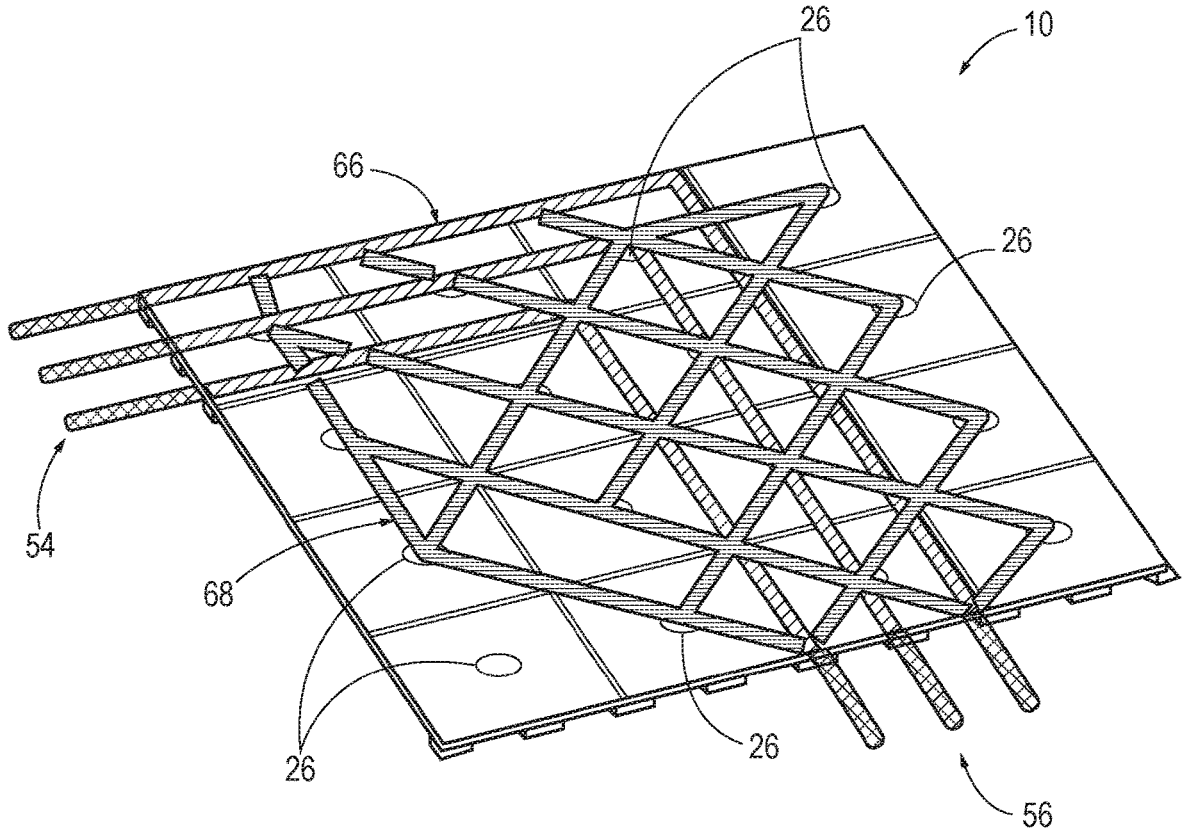
FIG. 30 is a schematic representation of examples of pathways of connections between nodes of a neuromorphic architecture or a neuromorphic actuator, between a neural interface input and a neural interface output.

FIG. 30 illustrates an example of training neuromorphic architecture 10, a small portion of which is represented in FIG. 30. As shown, an array of nodes 26 provide potential connections between neural input interface 54 and neural output interface 56, each of which may be computer-controlled, per methods described above. Many different pathways of connections of nodes 26 exist for current to travel from neural input interface 54 to neural output interface 56, though FIG. 30 illustrates an exemplary first set of pathways 66 through which current may flow to train neuromorphic architecture 10, along with an exemplary second set of pathways 68 through which current may flow to train neuromorphic architecture 10. The actual pathway of connections through the network depends on how neuromorphic architecture 10 is trained (e.g., the electrical current pattern fed to neuromorphic architecture 10).

Figure 31:
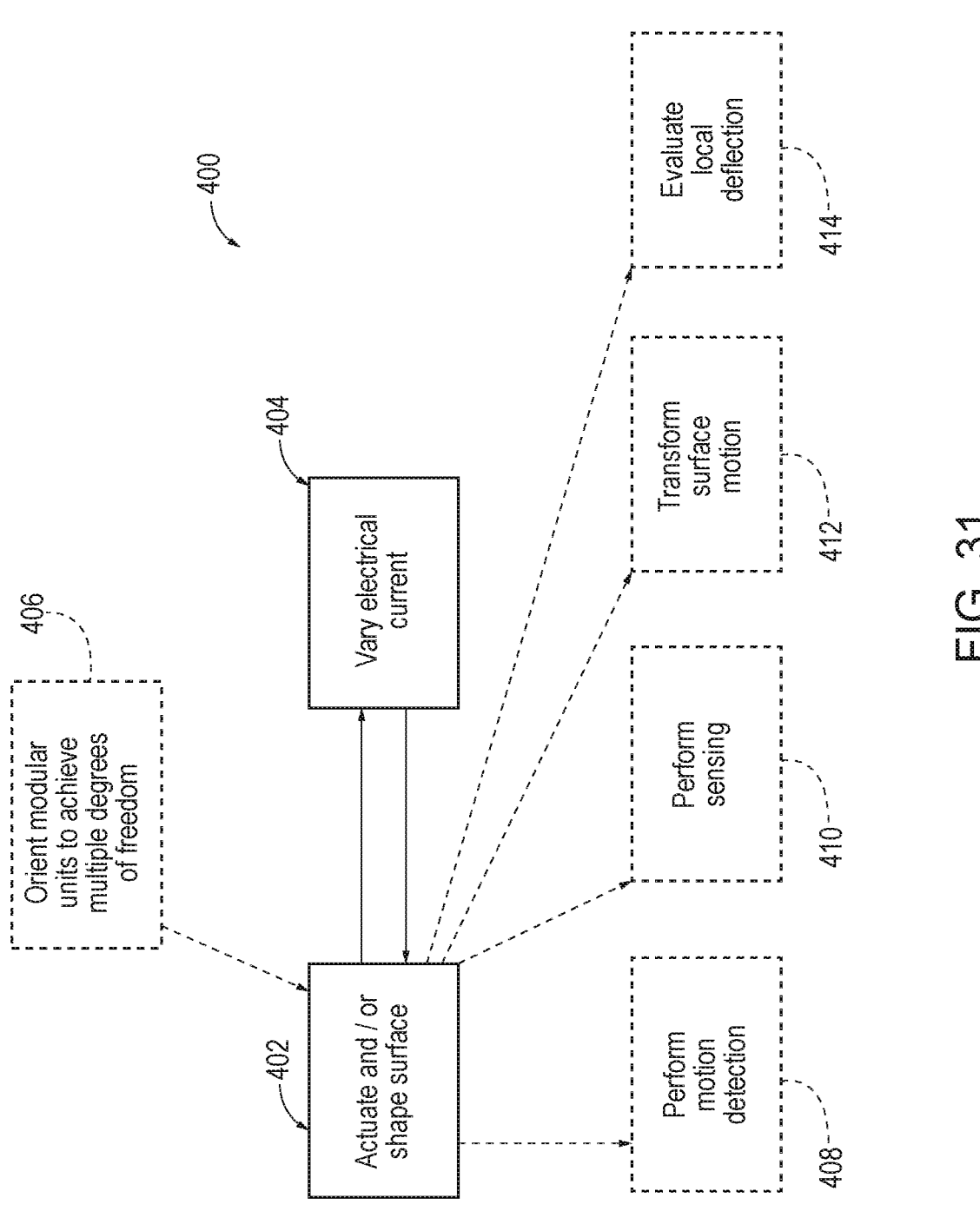
FIG. 31 is a schematic, flowchart diagram illustrating methods of actuating or shaping surfaces, via disclosed neuromorphic architectures.

FIG. 31 schematically illustrates methods 400 that include actuating and/or shaping a surface at 402 by applying an electrical current to a neuromorphic actuator and varying the electrical current to obtain a desired contour and/or a desired movement in the surface at 404. In some methods 400, the neuromorphic actuator has a plurality of modular units, with each modular unit having a respective single degree of freedom. Some methods 400 may include orienting the modular units with respect to one another to obtain a plurality of degrees of freedom of movement of the surface at 406.

In some examples, actuating or shaping the surface at 402 includes heating the surface. For example, heating a surface composed of one or more shape memory alloy (SMA) materials may cause movement of the shape memory materials, thereby shaping the surface or contour. Additionally or alternatively, actuating or shaping the surface at 402 may include bending or shaping the surface via an external force that results in changes in an output current of the neuromorphic actuator. Because such neuromorphic actuators may be configured to have their output currents altered when the shape of the surface is altered, methods 400 may include performing motion detection at 408 and/or performing sensing at 410 by effectively sensing when the shape of the surface (e.g., when the surface is bent) has been changed by external forces and/or heat. For example, performing motion detection at 408 and/or performing sensing at 410 may be performed by detecting changes in connections between nodes that occur as a result of movement or change in shape of the neuromorphic architecture or neuromorphic actuator. Similarly, methods 400 may include transforming motion of the surface into a code of connections of the plurality of distributed nodes at 412, and/or evaluating local deflection around one or more nodes of the plurality of distributed nodes at 414. For example, local deflection around a respective node of the plurality of distributed nodes may change its respective weight with respect to neural network pathways and/or change a current distribution at fibers ends within the respective node.

Illustrative, non-exclusive examples of inventive subject matter according to the present disclosure are described in the following enumerated paragraphs:

A1. A neuromorphic architecture (10), comprising:

a laminate (12) formed of a plurality of layers (14) of conductive fiber material, wherein each layer (14) of the plurality of layers (14) comprises substantially unidirectional fibers (38), wherein a respective orientation of the unidirectional fibers (38) of each respective layer (14) of the plurality of layers (14) is different from each other respective orientation of the unidirectional fibers (38) of adjacent respective layers (14) of the plurality of layers (14), wherein the plurality of layers (14) comprises:

an uppermost layer (16) of the plurality of layers (14) forming an upper surface (18) of the laminate (12);

a lowermost layer (20) of the plurality of layers (14) forming a lower surface (22) of the laminate (12); and one or more intermediary layers (24) of the plurality of layers (14) sandwiched between the uppermost layer (16) of the plurality of layers (14) and the lowermost layer (20) of the plurality of layers (14);

a plurality of distributed nodes (26) formed through the laminate (12), wherein each distributed node (26) comprises a void (28) that extends transversely from the upper surface (18) to the lower surface (22);

an electrochemical fluid (30) comprising a plurality of metal ions;

an encapsulant (32) configured to encapsulate at least a portion of the laminate (12), the plurality of distributed nodes (26), and the electrochemical fluid (30) such that the electrochemical fluid (30) is free to flow within the encapsulant (32) and into the plurality of distributed nodes (26), and wherein the neuromorphic architecture (10) is configured to perform neuromorphic processing.

A1.1. The neuromorphic architecture (10) of paragraph A1, wherein the conductive fiber material comprises nonwoven carbon fiber reinforced polymer (CFRP) material.

A2. The neuromorphic architecture (10) of paragraph A1 or A1.1, further comprising a current source and/or a voltage source electrically coupled to one respective layer (14) of the plurality of layers (14) of the laminate (12).

A3. The neuromorphic architecture (10) of any of paragraphs A1-A2, wherein each layer (14) of the plurality of layers (14) is electrically insulated from other layers (14) of the plurality of layers (14).

A4. The neuromorphic architecture (10) of any of paragraphs A1-A3, wherein the electrochemical fluid (30) comprises an electrolytic liquid or an electrolytic gel.

A5. The neuromorphic architecture (10) of any of paragraphs A1-A4, wherein unidirectional fibers (38) of a first layer (14) of the laminate (12) have a substantially 0 degree orientation, wherein unidirectional fibers (38) of a second layer (14) of the laminate (12) have a substantially 45 degree orientation, wherein unidirectional fibers (38) of a third layer (14) of the laminate (12) have a substantially 90 degree orientation, and wherein unidirectional fibers (38) of a fourth layer (14) of the laminate (12) have a substantially 135 degree orientation, using a longitudinal axis of the laminate (12) to define the 0 degree orientation.

A6. The neuromorphic architecture (10) of any of paragraphs A1-A5, wherein each node (26) of the plurality of distributed nodes (26) is configured to facilitate connections between layers (14) of the laminate (12) with electroplating gel.

A7. The neuromorphic architecture (10) of any of paragraphs A1-A6, wherein each fiber (38) of the unidirectional fibers (38) of each layer (14) of the plurality of layers (14) of the laminate (12) is interrupted at each distributed node (26), such that each respective fiber (38) has a first terminal end (50') on a first side (46) of each distributed node (26), and a second terminal end (50") on a second side (48) of each distributed node (26).

A8. The neuromorphic architecture (10) of paragraph A7, wherein metal ions from the electrochemical fluid (30) are deposited on the first terminal ends (50') of at least some of the unidirectional fibers (38) when a current flows in a first direction with respect to the unidirectional fibers (38).

A9. The neuromorphic architecture (10) of paragraph A8, wherein metal ions from the electrochemical fluid (30) are deposited on the second terminal ends (50") of at least some of the unidirectional fibers (38) when the current flows in a second direction with respect to the unidirectional fibers (38).

A10. The neuromorphic architecture (10) of any of paragraphs A1-A9, wherein the neuromorphic architecture (10) is configured such that the more current that flows through a particular node (26) of the plurality of distributed nodes (26), the more metal ions are deposited at that particular node (26).

A11. The neuromorphic architecture (10) of any of paragraphs A1-A10, wherein the neuromorphic architecture (10) has an effective memory from a respective amount of metal ions deposited at each respective node (26) of the plurality of distributed nodes (26).

A12. The neuromorphic architecture (10) of any of paragraphs A1-A11, wherein the neuromorphic architecture (10) is a low power processor.

A13. The neuromorphic architecture (10) of any of paragraphs A1-A12, wherein the neuromorphic architecture (10) is autonomous.

A14. The neuromorphic architecture (10) of any of paragraphs A1-A13, wherein the neuromorphic architecture (10) is configured to provide a local processing unit that is not reliant on a cloud network.

A15. The neuromorphic architecture (10) of any of paragraphs A1-A14, wherein the electrochemical fluid (30) comprises a copper sulfate solution.

A16. The neuromorphic architecture (10) of any of paragraphs A1-A15, wherein metal deposition within each node (26) of the plurality of distributed nodes (26) is reversible.

A16.1. The neuromorphic architecture (10) of paragraph A16, wherein the metal deposition within each node (26) is reversible by reversing a direction of electrical current passing through each node (26).

A16.2. The neuromorphic architecture (10) of any of paragraphs A16-A16.1, wherein a memory of the neuromorphic architecture (10) can be modified or erased by reversing a/the direction of electrical current with respect to the laminate (12).

A17. The neuromorphic architecture (10) of any of paragraphs A1-A16.2, wherein the neuromorphic architecture (10) is configured to decentralize processing.

A18. The neuromorphic architecture (10) of any of paragraphs A1-A17, wherein the plurality of distributed nodes (26) are configured to provide for vertical fiber connectivity between different layers (14) of the laminate (12).

A19. The neuromorphic architecture (10) of any of paragraphs A1-A18, wherein an amount of metal deposited at a respective node (26) of the plurality of distributed nodes (26) is proportional to a local time integral of electrical current that has passed through the respective node (26).

A20. The neuromorphic architecture (10) of any of paragraphs A1-A19, wherein the neuromorphic architecture (10) is configured to perform pattern recognition.

A21. The neuromorphic architecture (10) of any of paragraphs A1-A20, wherein the plurality of distributed nodes (26) are configured to register a pattern, thereby creating a nodal memory.

A22. The neuromorphic architecture (10) of any of paragraphs A1-A21, wherein the plurality of distributed nodes (26) are configured to provide nonlinear, multidimensional connectivity between the plurality of distributed nodes (26).

A23. The neuromorphic architecture (10) of any of paragraphs A1-A22, wherein the neuromorphic architecture (10) is configured to provide at least $10^9$ possible combinatorial connections, based on training of the neuromorphic architecture (10).

A24. The neuromorphic architecture (10) of any of paragraphs A1-A23, wherein the upper surface (18) of the laminate (12) is embedded neuromorphic intelligence that can be trained and that dynamically responds to environmental changes without an external central processing unit.

A25. The neuromorphic architecture (10) of any of paragraphs A1-A24, wherein the lower surface (22) of the laminate (12) is embedded neuromorphic intelligence that can be trained and that dynamically responds to environmental changes without an/the external central processing unit.

A26. The neuromorphic architecture (10) of any of paragraphs A1-A25, further comprising at least one neural interface (52) coupled to at least one layer (14) of the laminate (12), wherein the at least one neural interface (52) is configured to deliver electrical current to the electrochemical fluid (30) and/or receive an output from the neuromorphic architecture (10).

A27. The neuromorphic architecture (10) of paragraph A26, wherein the at least one neural interface (52) comprises:

a neural input interface (54) configured to deliver electrical current to the electrochemical fluid (30); and a neural output interface (56) configured to receive the output.

A27.1. The neuromorphic architecture (10) of paragraph A27, wherein the neural output interface (56) feeds back into the neural input interface (54), thereby creating a feedback loop.

A28. The neuromorphic architecture (10) of paragraph A26, wherein the at least one neural interface (52) comprises:

a first neural interface (52) configured to selectively deliver electrical current to the electrochemical fluid (30) or receive the output; and a second neural interface (52) configured to selectively deliver electrical current to the electrochemical fluid (30) or receive the output, wherein functions of the first neural interface (52) and the second neural interface (52) are selectively reversible.

A29. The neuromorphic architecture (10) of any of paragraphs A26-A28, wherein the at least one neural interface (52) comprises:

a/the first neural interface (52) coupled to a first layer (14) of the plurality of layers (14) of the laminate (12); and a/the second neural interface (52) coupled to a second layer (14) of the plurality of layers (14) of the laminate (12).

A30. The neuromorphic architecture (10) of any of paragraphs A26-A29, wherein the at least one neural interface (52) comprises a plurality of micro-pads, wherein each respective micro-pad of the plurality of micro-pads is configured to be electrically coupled to a respective bundle of fibers (38) of the unidirectional fibers (38) of one respective layer (14) of the plurality of layers (14).

A31. The neuromorphic architecture (10) of any of paragraphs A1-A30, wherein the plurality of distributed nodes (26) are arranged in an array.

A32. The neuromorphic architecture (10) of any of paragraphs A1-A31, wherein each node (26) of the plurality of distributed nodes (26) has a substantially uniform diameter (64).

A33. The neuromorphic architecture (10) of any of paragraphs A1-A32, comprising a plurality of laminates (12), wherein the neuromorphic architecture (10) comprises one or more dielectric insulation layers (72), with one dielectric insulation layer (72) positioned between each adjacent pair of laminates (12) of the plurality of laminates (12), such that the neuromorphic architecture (10) is configured for increased node (26) density by virtue of each node (26) comprising multiple segments (82) due to placement of the one or more dielectric insulation layers (72) intersecting each node (26).

A34. The neuromorphic architecture (10) of any of paragraphs A1-A33, wherein the plurality of distributed nodes (26) are configured to decentralize processing performed by the neuromorphic architecture (10).

A35. The neuromorphic architecture (10) of any of paragraphs A1-A34, wherein the plurality of layers (14) comprises at least five layers (14).

A36. The neuromorphic architecture (10) of any of paragraphs A1-A35, wherein the plurality of distributed nodes (26) are configured to form a number of potential connections, wherein the number of potential connections is at least 100, at least 1,000, at least 10,000, at least 100,000, at least 1,000,000, at least 10,000,000, at least 100,000,000, at least $10^9$, at least $10^{10}$, at least $10^{11}$, and/or at least $10^{12}$.

A36.1. The neuromorphic architecture (10) of paragraph A36, wherein the number of potential connections is determined by multiplying a total number of nodes (26) by the number of layers (14) in the plurality of layers (14) of the laminate (12).

A37. The neuromorphic architecture (10) of any of paragraphs A1-A36.1, wherein the neuromorphic architecture (10) is configured to be a feed forward, supervised architecture.

A38. The neuromorphic architecture (10) of any of paragraphs A1-A36, wherein the neuromorphic architecture (10) is configured to be a self-learning, recurrent network.

A39. The neuromorphic architecture (10) of any of paragraphs A1-A38, wherein the neuromorphic architecture (10) is selectively configurable to be a feed-forward architecture or a feedback architecture.

A40. The neuromorphic architecture (10) of any of paragraphs A1-A39, wherein the plurality of distributed nodes (26) comprises at least 100, at least 1,000, and/or at least 10,000 distributed nodes (26).

A41. The neuromorphic architecture (10) of any of paragraphs A1-A40, wherein the plurality of distributed nodes (26) are spaced apart from each other by a minimum distance determined at least in part by a diameter (64) of the distributed nodes (26).

A42. The neuromorphic architecture (10) of any of paragraphs A1-A41, wherein the laminate (12) is bounded by a plurality of edges (58), wherein each respective pair of adjacent edges (58) forms a respective intersection, and wherein the plurality of distributed nodes (26) are distanced from each respective intersection by a distance sufficient to ensure that each node (26) of the plurality of nodes (26) is configured to accommodate connections between fibers (38) in every layer (14) of the plurality of layers (14) of the laminate (12).

A43. The neuromorphic architecture (10) of any of paragraphs A1-A42, wherein the laminate (12) is bounded by a/the plurality of edges (58), wherein each respective pair of adjacent edges (58) forms a/the respective intersection, and wherein the plurality of distributed nodes (26) are distanced from each respective intersection by a distance that is at least five times a/the diameter (64) of the distributed nodes (26).

A44. The neuromorphic architecture (10) of any of paragraphs A1-A43, wherein the laminate (12) is octagon-shaped.

A45. The neuromorphic architecture (10) of any of paragraphs A1-A44, wherein the plurality of distributed nodes (26) are arranged in a square-shaped array.

A46. The neuromorphic architecture (10) of any of paragraphs A1-A44, wherein the plurality of distributed nodes (26) are arranged in a rectangular array.

A47. The neuromorphic architecture (10) of any of paragraphs A1-A46, further comprising a plurality of pins (80), wherein a respective pin (80) of the plurality of pins (80) is positioned in each respective node (26) of the plurality of distributed nodes (26).

A48. The neuromorphic architecture (10) of paragraph A47, wherein the plurality of pins (80) are configured such that ions are deposited on a respective pin (80) in a respective node (26) when current flows through the respective node (26).

A49. The neuromorphic architecture (10) of paragraph A47 or A48, wherein the plurality of pins (80) are electrically conductive.

A50. The neuromorphic architecture (10) of any of paragraphs A47-A49, wherein the plurality of pins (80) are segmented such that each pin (80) comprises a plurality of segments (82), with each segment (82) of the plurality of segments (82) being electrically insulated from each of the other segments (82) of the plurality of segments (82).

A51. The neuromorphic architecture (10) of paragraph A50, wherein each respective segment (82) corresponds to a different respective layer (14) of the plurality of layers (14) of the laminate (12).

A52. The neuromorphic architecture (10) of paragraph A50, wherein each respective segment (82) corresponds to a different respective group of layers (14) of the plurality of layers (14) of the laminate (12).

B1. A neuromorphic actuator (70), comprising:
a first neuromorphic architecture (10), comprising:
a first laminate (12) formed of a first plurality of layers (14) of conductive fiber material, the first laminate (12) having a first upper surface (18) and a first lower surface (22); and
a first plurality of distributed nodes (26) formed through the first laminate (12), wherein each node (26) of the first plurality of distributed nodes (26) comprises a void (28) that extends transversely from the first upper surface (18) to the first lower surface (22);
a second neuromorphic architecture (10), comprising:
a second laminate (12) formed of a second plurality of layers (14) of conductive fiber material, the second laminate (12) having a second upper surface (18) and a second lower surface (22); and a second plurality of distributed nodes (26) formed through the second laminate (12), wherein each node (26) of the second plurality of distributed nodes (26) comprises a void (28) that extends transversely from the second upper surface (18) to the second lower surface (22);
an electrochemical fluid (30) comprising a plurality of metal ions, wherein the electrochemical fluid (30) is free to flow into the voids (28) of the first plurality of distributed nodes (26) and into the voids (28) of the second plurality of distributed nodes (26);
a dielectric insulation layer (72) positioned between the first neuromorphic architecture (10) and the second neuromorphic architecture (10), separating the first lower surface (22) from the second upper surface (18), wherein the dielectric insulation layer (72) is configured to electrically insulate the first neuromorphic architecture (10) from the second neuromorphic architecture (10);
a first shape memory alloy (SMA) layer (74) coupled to the first upper surface (18) of the first neuromorphic architecture (10); and
a second SMA layer (76) coupled to the second lower surface (22) of the second neuromorphic architecture (10).

B1.1. The neuromorphic actuator (70) of paragraph B1, wherein the conductive fiber material comprises non-woven carbon fiber reinforced polymer (CFRP) material.

B2. The neuromorphic actuator (70) of paragraph B1 or B1.1, wherein the first neuromorphic architecture (10) is the neuromorphic architecture (10) of any of paragraphs A1-A52.

B3. The neuromorphic actuator (70) of any of paragraphs B1-B2, wherein the second neuromorphic architecture (10) is the neuromorphic architecture (10) of any of paragraphs A1-A52.

B4. The neuromorphic actuator (70) of any of paragraphs B1-B3, further comprising an/the encapsulant (32), wherein the encapsulant (32) is configured to encapsulate at least a portion of the first laminate (12), at least a second portion of the second laminate (12), the first plurality of distributed nodes (26), the second plurality of distributed nodes (26), and the electrochemical fluid (30) such that the electrochemical fluid (30) is free to flow within the encapsulant (32).

B5. The neuromorphic actuator (70) of any of paragraphs B1-B4, wherein the first neuromorphic architecture (10) comprises a first plurality of modular units, and wherein the second neuromorphic architecture (10) comprises a second plurality of modular units.

B6. The neuromorphic actuator (70) of any of paragraphs B1-B5, wherein the first SMA layer (74) is configured to create a differential with respect to the second SMA layer (76).

B7. The neuromorphic actuator (70) of any of paragraphs B1-B6, wherein the first SMA layer (74) has a first thermal expansion coefficient that is different from a second thermal expansion coefficient of the second SMA layer (76).

B8. The neuromorphic actuator (70) of any of paragraphs B1-B7, wherein the neuromorphic actuator (70) is configured to exhibit muscle memory.

B9. The neuromorphic actuator (70) of any of paragraphs B1-B8, wherein the neuromorphic actuator (70) is configured to actuate in response to an applied current, via different movements of the first SMA layer (74) and the second SMA layer (76).

B10. The neuromorphic actuator (70) of any of paragraphs B1-B8, wherein the neuromorphic actuator (70) is configured to be trained via external forces acting on the first SMA layer (74) and the second SMA layer (76).

B11. The neuromorphic actuator (70) of any of paragraphs B1-B10, wherein the neuromorphic actuator (70) is configured such that external forces on the first SMA layer (74) and/or the second SMA layer (76) results in changes in connectivity amongst the first neuromorphic architecture (10) and the second neuromorphic architecture (10).

B12. The neuromorphic actuator (70) of any of paragraphs B1-B11, further comprising a/the current source and/or a/the voltage source configured to supply a current to the first neuromorphic architecture (10) and the second neuromorphic architecture (10), wherein the current is selectively altered to reshape the first SMA layer (74) and/or the second SMA layer (76) according to connections in the first plurality of distributed nodes (26) and the second plurality of distributed nodes (26).

B13. The neuromorphic actuator (70) of any of paragraphs B1-B12, wherein the first neuromorphic architecture (10) and the second neuromorphic architecture (10) are configured to sense movement of the first SMA layer (74) and the second SMA layer (76).

B14. The neuromorphic actuator (70) of any of paragraphs B1-B13, wherein conductivity within the first plurality of distributed nodes (26) and the second plurality of distributed nodes (26) has a sigmoidal response from metal deposits within the first plurality of distributed nodes (26) and the second plurality of distributed nodes (26).

B15. The neuromorphic actuator (70) of any of paragraphs B1-B14, wherein the plurality of distributed nodes (26) are spaced apart from each other by a minimum distance determined at least in part by a diameter of the distributed nodes (26).

B16. The neuromorphic actuator (70) of any of paragraphs B1-B15, wherein the neuromorphic actuator (70) is configured for both processing and actuation.

C1. An aircraft comprising the neuromorphic architecture (10) of any of paragraphs A1-A52, and/or the neuromorphic actuator (70) of any of paragraphs B1-B16.

D1. A method (100) of performing local, hardware-based processing via a neuromorphic architecture (10), the method (100) comprising:

creating intersections (102) of fibers (38) modulated by residual memory created by electroplating at the intersections, wherein the intersections have a complexity sufficient to perform as a neural network; and recycling (104) signals among a plurality of groups of layers (14) of a laminate (12) of the neuromorphic architecture (10) such that each intersection is configured to serve as a plurality of different connection points within the neuromorphic architecture (10).

D2. The method (100) of paragraph D1, further comprising performing image recognition.

D3. The method (100) of any of paragraphs D1-D2, further comprising:

inputting (106) an image pattern to the neuromorphic architecture (10); and training (108) the neuromorphic architecture (10) to produce an output image in response to the image pattern input to the neuromorphic architecture (10).

D4. The method (100) of any of paragraphs D1-D3, wherein the neuromorphic architecture (10) is the neuromorphic architecture (10) of any of paragraphs A1-A52.

D5. The method (100) of any of paragraphs D1-D4, wherein the recycling (104) signals comprises recycling signals along at least four different signal paths through the neuromorphic architecture (10).

D6. The method (100) of any of paragraphs D1-D5, wherein the recycling (104) signals comprises feeding an output signal from a first layer (14) of the laminate (12) into a second layer (14) of the laminate (12).

E1. A method (200) of forming a neuromorphic architecture (10), the method (200) comprising:

Forming (202) a laminate (12) of a plurality of layers (14) of conductive fiber material, wherein each layer (14) of the plurality of layers (14) comprises substantially unidirectional fibers (38), wherein a respective orientation of the unidirectional fibers (38) of each respective layer (14) of the plurality of layers (14) is different from each other respective orientation of the unidirectional fibers (38) of adjacent respective layers (14) of the plurality of layers (14);

forming (204) a plurality of distributed nodes (26) through the laminate (12), wherein each distributed node (26) comprises a void (28) that extends transversely from an upper surface (18) of the laminate (12) to a lower surface (22) of the laminate (12); and encapsulating (206) an electrochemical fluid (30) with respect to the laminate (12) and the plurality of distributed nodes (26) such that the electrochemical fluid (30) is free to flow about the laminate (12) and into the voids (28), wherein the electrochemical fluid (30) comprises a plurality of metal ions.

E1.1. The method (200) of paragraph E1, wherein the conductive fiber material comprises non-woven carbon fiber reinforced polymer (CFRP) material.

E2. The method (200) of paragraph E1 or E1.1, wherein the forming (204) the plurality of distributed nodes (26) comprises forming a plurality of micro-holes through the laminate (12).

E3. The method (200) of any of paragraphs E1-E2, wherein the forming (204) the plurality of distributed nodes (26) comprises drilling a plurality of holes through the laminate (12), forming the plurality of holes through the laminate (12) via waterjet cutting, and/or forming the plurality of holes through the laminate (12) via laser jet cutting.

E4. The method (200) of any of paragraphs E1-E3, wherein the forming (204) the plurality of distributed nodes (26) comprises forming a/the plurality of micro-holes through the laminate (12), wherein the plurality of micro-holes are arranged in an array.

E5. The method (200) of any of paragraphs E1-E4, wherein the forming (206) the plurality of distributed nodes (26) comprises forming at least 10 distributed nodes (26), at least 100 distributed nodes (26), at least 1,000 distributed nodes (26), and/or at least 10,000 distributed nodes (26).

E6. The method (200) of any of paragraphs E1-E5, wherein the density of the plurality of distributed nodes (26) is at least 10 nodes (26) per square centimeter, at least 100 nodes (26) per square centimeter, and/or at least 1,000 nodes (26) per square centimeter.

E7. The method (200) of any of paragraphs E1-E6, wherein the neuromorphic architecture (10) is the neuromorphic architecture (10) of any of paragraphs A1-A52.

E8. The method (200) of any of paragraphs E1-E7, wherein the laminate (12) has an area on the order of square inches, on the order of tens of square inches, or on the order of hundreds of square inches.

E9. The method (200) of any of paragraphs E1-E8, further comprising maximizing density of nodes (26) distributed throughout the laminate (12).

E10. The method (200) of any of paragraphs E1-E9, wherein the forming the laminate (12) comprises stacking each respective layer (14) of the plurality of layers (14) of conductive fiber material in a respective specific orientation with respect to orientations of the other layers (14) of the plurality of layers (14) of conductive fiber material.

E11. The method (200) of any of paragraphs E1-E10, wherein fiber endings of each respective layer (14) of the laminate (12) are perpendicular to an interior surface of each respective node (26) of the plurality of distributed nodes (26).

E12. The method (200) of any of paragraphs E1-E11, further comprising cutting the laminate (12) into an octagon shape having eight interface edges (208), wherein each respective interface edge (208) is arranged at a 45 degree angle with respect to each adjacent interface edge (208).

E13. The method (200) of paragraph E12 further comprising:

providing (210) a first input to a first interface edge (208a) of the eight interface edges (208);

producing (212) a first output at a second interface edge (208b) of the eight interface edges (208), wherein the second interface edge (208b) is opposite from and parallel to the first interface edge (208a);

providing (214) the first output as a second input to a third interface edge (208c) of the eight interface edges (208), wherein the third interface edge (208c) is arranged at a 45 degree angle with respect to the second interface edge (208b);

producing (216) a second output at a fourth interface edge (208d) of the eight interface edges (208), wherein the fourth interface edge (208d) is opposite from and parallel to the third interface edge (208c);

providing (218) the second output as a third input to a fifth interface edge (208e) of the eight interface edges (208), wherein the fifth interface edge (208e) is arranged at a 45 degree angle with respect to the fourth interface edge (208d);

producing (220) a third output at a sixth interface edge (208f) of the eight interface edges (208), wherein the sixth interface edge (208f) is opposite from and parallel to the fifth interface edge (208e);

providing (222) the third output as a fourth input to a seventh interface edge (208g) of the eight interface edges (208), wherein the seventh interface edge (208g) is arranged at a 45 degree angle with respect to the sixth interface edge (208f); and producing (224) a final output at an eighth interface edge (208h) of the eight interface edges (208), wherein the eighth interface edge (208h) is opposite from and parallel to the seventh interface edge (208g).

E14. The method (200) of paragraph E13, wherein the providing (210) the first input to the first interface edge (208) comprises providing the first input to a first layer (14) of the laminate (12) at the first interface edge (208a), wherein the providing (214) the second input to the third interface edge (208c) comprises providing the second input to a second layer (14) of the laminate (12) at the third interface edge (208c), wherein the providing (218) the third input to the fifth interface edge (208e) comprises providing the third input to a third layer (14) of the laminate (12) at the fifth interface edge (208e), and wherein the providing (222) the fourth input to the seventh interface edge (208g) comprises providing the fourth input to a fourth layer (14) of the laminate (12) at the seventh interface edge (208g).

F1. A method (300) of training a neuromorphic architecture (10), comprising:

providing (302) the neuromorphic architecture (10), wherein the neuromorphic architecture (10) is configured to encapsulate an electrochemical fluid (30) within a plurality of nodes (26) distributed across a laminate (12), wherein the laminate (12) comprises a plurality of layers (14) of conductive fiber material, wherein each layer (14) of the plurality of layers (14) comprises substantially unidirectional fibers (38), wherein a respective orientation of the unidirectional fibers (38) of each respective layer (14) of the plurality of layers (14) is different from each other respective orientation of the unidirectional fibers (38) of adjacent respective layers (14) of the plurality of layers (14);

flowing (304) a computer-controlled input current through the electrochemical fluid (30) in a predetermined pattern relative to the laminate (12); and controlling (306) an output of the neuromorphic architecture (10), thereby creating corresponding connections within some of the plurality of distributed nodes (26) such that the neuromorphic architecture (10) is trained via a feed-forward scheme.

F1.1. The method (300) of paragraph F1, wherein the conductive fiber material comprises non-woven carbon fiber reinforced polymer (CFRP) material.

F2. The method (300) of paragraph F1 or F1.1, wherein the neuromorphic architecture (10) is the neuromorphic architecture (10) of any of paragraphs A1-A52.

F3. The method (300) of any of paragraphs F1-F2, further comprising writing (308) to memory via a symmetric configuration, such that fiber ends (50) of both sides of a respective node (26) experience metal deposition of ions from the electrochemical fluid (30).

F4. The method (300) of any of paragraphs F1-F3, further comprising erasing (310) memory via a/the symmetric configuration, such that fiber ends (50) on both sides of a respective node (26) experience dissolution of previously deposited metal ions.

F5. The method (300) of any of paragraphs F1-F4, further comprising writing (308) to memory asymmetrically, such that metal is deposited at fiber ends (50) on a first side (46) of a respective node (26), but metal substantially is not deposited at fiber ends (50) on a second side (48) of the respective node (26).

F6. The method (300) of any of paragraphs F1-F5, further comprising erasing (310) memory asymmetrically, such that metal is dissolved at fiber ends (50) on a first side (46) of a respective node (26), but metal is substantially not dissolved at fiber ends (50) on a second side (48) of the respective node (26).

F7. The method (300) of any of paragraphs F1-F6, further comprising performing (312) pattern recognition and/or image recognition via the neuromorphic architecture (10).

F7.1. The method (300) of paragraph F7, wherein the performing (312) the pattern recognition and/or the image recognition comprises training the neuromorphic architecture (10) to produce an output pattern in response to an input pattern provided to the neuromorphic architecture (10).

F7.2. The method (300) of paragraph F7 or F7.1, wherein the performing (312) the pattern recognition and/or the image recognition comprises training the neuromorphic architecture (10) to determine whether a first image and a second image are correlated with each other.

F8. The method (300) of any of paragraphs F1-F7.2, further comprising optimizing training (314) of the neuromorphic architecture (10) based on load adjustment of conductivity within the plurality of distributed nodes (26) to produce a desired shape-shifting response.

F9. The method (300) of any of paragraphs F1-F8, further comprising optimizing training (314) of the neuromorphic architecture (10) based on pre-determined training with modified fiber connectivity.

F10. The method (300) of any of paragraphs F1-F9, further comprising completing (316) a feedback loop by feeding the output back into the neuromorphic architecture (10).

F11. The method (300) of any of paragraphs F1-F10, wherein the neuromorphic architecture (10) is a fixed system subjected to continuous (analog) training.

F12. The method (300) of any of paragraphs F1-F11, wherein the neuromorphic architecture (10) is a programmable system subjected to digital training.

F13. The method (300) of any of paragraphs F1-F12, wherein the flowing (304) the computer-controlled input current comprises varying amounts of current fed to selective micro-pads of an interface to the neuromorphic architecture (10).

F14. The method (300) of any of paragraphs F1-F13, further comprising applying (314) an external force to the laminate (12) to train the neuromorphic architecture (10).

G1. A method (400), comprising:

actuating and/or shaping (402) a surface by applying an electrical current to a neuromorphic actuator (70); and varying (404) the electrical current to obtain a desired contour and/or a desired movement in the surface, wherein the neuromorphic actuator (70) is the neuromorphic actuator (70) of any of paragraphs B1-B16.

G2. The method (400) of paragraph G1, wherein the neuromorphic actuator (70) comprises a plurality of modular units, and wherein each modular unit has a respective single degree of freedom.

G3. The method (400) of any of paragraphs G1-G2, wherein the neuromorphic actuator (70) comprises a/the plurality of modular units, and wherein the plurality of modular units are oriented with respect to one another to obtain a plurality of degrees of freedom of movement of the surface.

G4. The method (400) of any of paragraphs G1-G3, wherein the actuating and/or shaping (402) the surface comprises heating the surface.

G5. The method (400) of any of paragraphs G1-G4, wherein the actuating and/or shaping (402) includes bending or shaping the surface via an external force results in changes in an output current of the neuromorphic actuator (70).

G6. The method (400) of any of paragraphs G1-G5, further comprising performing (408) motion detecting of the surface, via the neuromorphic actuator (70).

G7. The method (400) of any of paragraphs G1-G6, further comprising performing (410) sensing the bending of the surface, via the neuromorphic actuator (70).

G8. The method (400) of any of paragraphs G1-G7, further comprising transforming (412) motion of the surface into a code of connections of the plurality of distributed nodes (26).

G9. The method (400) of any of paragraphs G1-G8, further comprising evaluating (414) local deflection around one or more nodes (26) of the plurality of distributed nodes (26).

G10. The method (400) of any of paragraphs G1-G9, wherein the local deflection around a respective node (26) of the plurality of distributed nodes (26) changes its respective weight with respect to neural network pathways.

G11. The method (400) of any of paragraphs G1-G10, wherein the local deflection around a respective node (26) of the plurality of distributed nodes (26) changes a current distribution at fiber ends (50) within the respective node (26).

H1. The use of the neuromorphic architecture (10) of any of paragraphs A1-A52, and/or the neuromorphic actuator (70) of any of paragraphs B1-B16 to perform local processing tasks.

H2. The use of the neuromorphic architecture (10) of any of paragraphs A1-A52, and/or the neuromorphic actuator (70) of any of paragraphs B1-B16 to control a surface contour and/or vary geometry of a structure.

H3. The use of the neuromorphic architecture (10) of any of paragraphs A1-A52, and/or the neuromorphic actuator (70) of any of paragraphs B1-B16 to perform image recognition.

H4. The use of the neuromorphic architecture (10) of any of paragraphs A1-A52, and/or the neuromorphic actuator (70) of any of paragraphs B1-B16 to control an autonomous vehicle.

H5. The use of the neuromorphic architecture (10) of any of paragraphs A1-A52, and/or the neuromorphic actuator (70) of any of paragraphs B1-B16 to perform motion detection.

H6. The use of the neuromorphic architecture (10) of any of paragraphs A1-A52, and/or the neuromorphic actuator (70) of any of paragraphs B1-B16 to control movements of an aircraft or other flying vehicle.

As used herein, the terms "selective" and "selectively," when modifying an action, movement, configuration, or other activity of one or more components or characteristics of an apparatus, mean that the specific action, movement, configuration, or other activity is a direct or indirect result of dynamic processes and/or user manipulation of an aspect of, or one or more components of, the apparatus. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one example, to at least one, optionally including more than one, A, with no B present (and optionally including entities other than B); in another example, to at least one, optionally including more than one, B, with no A present (and optionally including entities other than A); in yet another example, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, or A, B, and C together, and optionally any of the above in combination with at least one other entity.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, examples, and/or methods according to the present disclosure, are intended to convey that the described component, feature, detail, structure, example, and/or method is an illustrative, non-exclusive example of components, features, details, structures, examples, and/or methods according to the present disclosure. Thus, the described component, feature, detail, structure, example, and/or method is not intended to be limiting, required, or exclusive/ exhaustive; and other components, features, details, structures, examples, and/or methods, including structurally and/ or functionally similar and/or equivalent components, features, details, structures, examples, and/or methods, are also within the scope of the present disclosure.

The invention claimed is:

1. A neuromorphic architecture, comprising:
a laminate formed of a plurality of layers of conductive fiber material, wherein each layer of the plurality of layers comprises substantially unidirectional fibers, wherein a respective orientation of the unidirectional fibers of each respective layer of the plurality of layers is different from each other respective orientation of the unidirectional fibers of adjacent respective layers of the plurality of layers, wherein the plurality of layers comprises:
an uppermost layer of the plurality of layers forming an upper surface of the laminate;
a lowermost layer of the plurality of layers forming a lower surface of the laminate; and
one or more intermediary layers of the plurality of layers sandwiched between the uppermost layer of the plurality of layers and the lowermost layer of the plurality of layers;
a plurality of distributed nodes formed through the laminate, wherein each distributed node comprises a void that extends transversely from the upper surface to the lower surface;
an electrochemical fluid comprising a plurality of metal ions;
an encapsulant configured to encapsulate at least a portion of the laminate, the plurality of distributed nodes, and the electrochemical fluid such that the electrochemical fluid is free to flow within the encapsulant and into the plurality of distributed nodes, and wherein the neuromorphic architecture is configured to perform neuromorphic processing.

2. The neuromorphic architecture according to claim 1, wherein the conductive fiber material comprises carbon fiber reinforced polymer material.

3. The neuromorphic architecture according to claim 1, wherein unidirectional fibers of a first layer of the laminate have a substantially 0 degree orientation, wherein unidirectional fibers of a second layer of the laminate have a substantially 45 degree orientation, wherein unidirectional fibers of a third layer of the laminate have a substantially 90 degree orientation, and wherein unidirectional fibers of a fourth layer of the laminate have a substantially 135 degree orientation, using a longitudinal axis of the laminate to define the 0 degree orientation.

4. The neuromorphic architecture according to claim 1, wherein each fiber of the unidirectional fibers of each layer of the plurality of layers of the laminate is interrupted at each distributed node, such that each respective fiber has a first terminal end on a first side of each distributed node, and a second terminal end on a second side of each distributed node, wherein metal ions from the electrochemical fluid are deposited on the first terminal ends of at least some of the unidirectional fibers when a current flows in a first direction with respect to the unidirectional fibers, and wherein metal ions from the electrochemical fluid are deposited on the second terminal ends of at least some of the unidirectional fibers when the current flows in a second direction with respect to the unidirectional fibers.

5. The neuromorphic architecture according to claim 1, wherein the neuromorphic architecture has an effective memory from a respective amount of metal ions deposited at each respective node of the plurality of distributed nodes, and wherein metal deposition within each node of the plurality of distributed nodes is reversible.

6. The neuromorphic architecture according to claim 1, wherein the plurality of distributed nodes are configured to provide nonlinear, multidimensional connectivity between the plurality of distributed nodes.

7. The neuromorphic architecture according to claim 1, wherein the upper surface of the laminate is embedded neuromorphic intelligence that can be trained and that dynamically responds to environmental changes without an external central processing unit, and wherein the lower surface of the laminate is embedded neuromorphic intelligence that can be trained and that dynamically responds to environmental changes without the external central processing unit.

8. The neuromorphic architecture according to claim 1, further comprising at least one neural interface coupled to at least one layer of the laminate, wherein the at least one neural interface comprises:

a neural input interface configured to deliver electrical current to the electrochemical fluid; and a neural output interface configured to receive an output from the neuromorphic architecture.

9. The neuromorphic architecture according to claim 8, wherein the neural output interface feeds back into the neural input interface, thereby creating a feedback loop.

10. The neuromorphic architecture according to claim 1, comprising a plurality of laminates, wherein the neuromorphic architecture comprises one or more dielectric insulation layers, with one dielectric insulation layer positioned between each adjacent pair of laminates of the plurality of laminates, such that the neuromorphic architecture is configured for increased node density by virtue of each node comprising multiple segments due to placement of the one or more dielectric insulation layers intersecting each node.

11. The neuromorphic architecture according to claim 1, wherein the neuromorphic architecture is selectively configurable to be a feed-forward architecture or a feedback architecture.

12. The neuromorphic architecture according to claim 1, further comprising a plurality of pins, wherein a respective pin of the plurality of pins is positioned in each respective node of the plurality of distributed nodes, wherein the plurality of pins are configured such that ions are deposited on a respective pin in a respective node when current flows through the respective node, and wherein the plurality of pins are segmented such that each pin comprises a plurality of segments, with each segment of the plurality of segments being electrically insulated from each of the other segments of the plurality of segments, and wherein each respective segment corresponds to a different respective layer of the plurality of layers of the laminate.

13. A neuromorphic actuator, comprising:

a first neuromorphic architecture, comprising:

a first laminate formed of a first plurality of layers of non-woven carbon fiber reinforced polymer (CFRP) material, the first laminate having a first upper surface and a first lower surface; and a first plurality of distributed nodes formed through the first laminate, wherein each node of the first plurality of distributed nodes comprises a void that extends transversely from the first upper surface to the first lower surface;

a second neuromorphic architecture, comprising:

a second laminate formed of a second plurality of layers of non-woven CFRP material, the second laminate having a second upper surface and a second lower surface; and a second plurality of distributed nodes formed through the second laminate, wherein each node of the second plurality of distributed nodes comprises a void that extends transversely from the second upper surface to the second lower surface;

an electrochemical fluid comprising a plurality of metal ions, wherein the electrochemical fluid is free to flow into the voids of the first plurality of distributed nodes and into the voids of the second plurality of distributed nodes;

a dielectric insulation layer positioned between the first neuromorphic architecture and the second neuromorphic architecture, separating the first lower surface from the second upper surface, wherein the dielectric insulation layer is configured to electrically insulate the first neuromorphic architecture from the second neuromorphic architecture;

a first shape memory alloy (SMA) layer coupled to the first upper surface of the first neuromorphic architecture; and a second SMA layer coupled to the second lower surface of the second neuromorphic architecture.

14. The neuromorphic actuator according to claim 13, wherein the neuromorphic actuator is configured to actuate in response to an applied current, via different movements of the first SMA layer and the second SMA layer.

15. The neuromorphic actuator according to claim 13, wherein the neuromorphic actuator is configured to be trained via external forces acting on the first SMA layer and the second SMA layer, wherein the neuromorphic actuator is configured such that external forces on the first SMA layer and/or the second SMA layer results in changes in connectivity amongst the first neuromorphic architecture and the second neuromorphic architecture.

16. A method, comprising:

actuating and/or shaping a surface by applying an electrical current to a neuromorphic actuator, wherein the neuromorphic actuator is the neuromorphic actuator according to claim 13;

varying the electrical current to obtain a desired contour and/or a desired movement in the surface; and evaluating local deflection around one or more nodes of the plurality of distributed nodes, wherein the local deflection around a respective node of the plurality of distributed nodes changes its respective weight with respect to neural network pathways, and wherein the local deflection around a respective node of the plurality of distributed nodes changes a current distribution at fibers ends within the respective node.

\* \* \* \* \*